US011214636B2

United States Patent
Emslie et al.

(10) Patent No.: US 11,214,636 B2
(45) Date of Patent: Jan. 4, 2022

(54) RIGID NON-CYCLOPENTADIENYL GROUP 4 TRANSITION METAL AND RARE EARTH METAL CATALYSTS FOR OLEFIN POLYMERIZATION

(71) Applicant: McMaster University, Hamilton (CA)

(72) Inventors: David Emslie, Dundas (CA); Kelly Williams, London (CA); Arthithiyan Vasanthakumar, Brampton (CA)

(73) Assignee: McMaster University, Hamilton (CA)

(*) Notice: Subject to any disclaimer, the term of this patent is extended or adjusted under 35 U.S.C. 154(b) by 0 days.

(21) Appl. No.: 16/623,246

(22) PCT Filed: Jun. 19, 2018

(86) PCT No.: PCT/CA2018/050742
§ 371 (c)(1),
(2) Date: Dec. 16, 2019

(87) PCT Pub. No.: WO2018/232503
PCT Pub. Date: Dec. 27, 2018

(65) Prior Publication Data
US 2020/0308322 A1    Oct. 1, 2020

Related U.S. Application Data

(60) Provisional application No. 62/521,830, filed on Jun. 19, 2017.

(51) Int. Cl.
*C08F 110/02* (2006.01)
*C08F 2/06* (2006.01)

(52) U.S. Cl.
CPC .............. *C08F 110/02* (2013.01); *C08F 2/06* (2013.01); *C08F 2500/02* (2013.01)

(58) Field of Classification Search
CPC ................ C08F 110/02; C08F 4/64141; C08F 4/64148; C08F 4/64186; C08F 4/64113;
(Continued)

(56) References Cited

U.S. PATENT DOCUMENTS 6,290,926 B1    9/2001  Haenel et al.
7,910,760 B2    3/2011  Hagadorn
2009/0259085 A1  10/2009 Hagadorn

FOREIGN PATENT DOCUMENTS

CN          101693754 A      4/2010

OTHER PUBLICATIONS

Porter et al., "Dimethylxanthene- and Dibenzofuran-Diamido Complexes of Titanium", Polyhedron 2006, 25, 859-863.*
(Continued)

*Primary Examiner* — William K Cheung
(74) *Attorney, Agent, or Firm* — Bereskin & Parr LLP/S.E.N.C.R.L., s.r.l.; Patricia Folkins

(57) ABSTRACT

The present application provides a catalyst component for alkene polymerization. The catalyst component contains: (a) a group 4 transition metal or rare earth metal, (b) a rigid non-cyclopentadienyl ligand with a tricyclic backbone composed of three ortho-fused 6-membered rings in a linear arrangement (as is the case in xanthene), with or without additional fused rings; the tricyclic backbone contains at least one donor atom within the central ring (as is the case for xanthene, oxanthrene, or acridan); furthermore, donor atoms/groups or aryl rings are attached directly (i.e. via the donor atom in the case of donor groups) to both of the bondable carbon atoms adjacent to at least one of the donor atoms within the central ring (e.g. xanthene with two donor groups, or two aryl rings, or one donor group and one aryl ring adjacent to oxygen), and (c) two or more activatable ligands, such as chloro, alkyl, aryl, allyl or hydride ligands, attached to the central metal if the complex is neutral or (Continued)

anionic, or one or more activatable ligand if the complex is monocationic or dicationic. The rigid non-cyclopentadienyl ligand has a charge of 0, 1- or 2- (considering all donor atoms of the ligand to have an octet of valence electrons). The catalyst component is optionally combined with an activator, typically for the purpose of generating a highly active monocationic or dicationic polymerization catalyst, and the catalyst and/or catalyst components may be in solution, precipitated from solution, or optionally carried on a support.

20 Claims, 4 Drawing Sheets

(58) Field of Classification Search
CPC ............... C08F 4/6411; C08F 4/64117; C08F 4/64182; C08F 4/545; C08F 4/65908; C08F 2/06; C08F 2500/02
USPC .......................................................... 526/134
See application file for complete search history.

(56) References Cited

OTHER PUBLICATIONS

Turculet et al., Mono-, Di-, and Trinuclear Complexes Featuring the New Bis(phosphido) Ligand 4,5-Bis(tert-butylphosphido)-9,9-dimethylxanthene ([POP]2'), Organometallics, 2007, 26, 6821-6826.*
International Search Report and Written Opinion of corresponding International Patent Application No. PCT/CA2018/050742 dated Sep. 19, 2018, 11 pages.
Porter et al., Dimethylxanthene- and Dibenzofuran-Diamido Complexes of Titanium, Polyhedron 2006, 25, pp. 859-863.
Turculet et al., Mono-, Di-, and Trinuclear Complexes Featuring the New Bis(phosphido) Ligand 4,5- Bis(tert-butylphosphido)-9,9-dimethylxanthene ([POP]2), Organometallics, 2007, 26, pp. 6821-6826.
Motolko et al., Rigid NON-Donor Pincer Ligand Complexes of Lutetium and Lanthanum: Synthesis and Hydroamination Catalysis, RSC Adv., 2017, 7, p. 27938-27945.
Chirinos et al., Synthesis and Catalytic Behavior in Ethene Polymerization of Half-Sandwich Amido Complexes Activated with MAO, Macromol. Chem. Phys. 2002, 203, pp. 1501-1505.
Van Leeuwen et al., The Bite Angle Makes the Catalyst, Pure Appln. Chem., vol. 71, No. 8, pp. 1443-1452, 1999.
Andreychuk et al., Thorium(iv) Alkyl and Allyl Complexes of a Rigid Non-donor Pincer Ligand with Flanking 1-adamantyl Substituents, Royal Society of Chemistry, Dalton Trans., 2018, 47, pp. 4866-4876.
Motolko et al., Potassium and Yttrium Complexes of a Rigid Bis-Phophido POP-Donor Ligand, Eur. J. Inorg. Chem., 2017, pp. 2920-2927.
Motolko et al., Yttrium and Aluminum Alkyl Complexes of a Rigid Bis-Anilido NON-Donor Ligand: Synthesis and Hydroamination Catalysis, Organometallics, 2017, 36, pp. 1601-1608.
Andreychuk et al., Potassium-Alkane Interactions within a Rigid Hydrophobic Pocket, Agnew. Chem. Int. Ed., 2013, 52, pp. 1696-1699.
Wong et al., Cyclometalation and Coupling of a Rigid 4,5-Bis(imino)acridanide Pincer Ligand on Yttrium, Royal Society of Chemistry, Dalton Trans., 2015, 44, p. 11601-11612.
Andreychuk et al., Cyclometallation following coordination of Anionic and neutral Lewis bases to a Uranium(IV) Dialkyl Complex, Journal of Organometallic Chemistry, 857, 2018, pp. 16-24.
Andreychuk et al., Uranium(IV) Alkyl complexes of a Rigid Dianionic NON-donor ligand: Synthesis and Quantitative Alkyl Exchange Reactions with Alkyllithium Reagents, Organometallics, 2013, 32, pp. 1466-1474.
Vidjayacoumar et al., Rigid NON-and NSN-ligand complexes of Tetravalent and Trivalent Uranium: Comparison of U-OAR2 and U-SAr2 bonding, Dalton Trans., 2012, 41, pp. 8175-8189.
Cruz et al., A thermally robust Di-n-butyl Throrium Complex with an Unstable Dimethyl Analogue, Dalton Trans., 2010, 39, pp. 6626-6628.
Cruz et al., Cationic Thorium Alkyl Complexes of Rigid NON- and NNN-Donor Ligands: #-Arene Coordination as a Persistent Structural Motif, Organometallics, 2009, 28(6), p. 1891-1899.
Cruz et al., Single and Double Alkyl Abstraction from a Bis(anilido) Xanthene Thorium(IV) Dibenzyl Complex: Isolation of an Organothorium Cation and a Thorium Dication, Organometallics, 2008, 27, pp. 15-17.
Cruz et al., Extremely Stable Thorium(IV) Dialkyl Complexes supported by Rigid Tridentate 4,5-Bis(anilido)xanthene and 2,6-Bis(anilidomethyl)pyridine Ligands, Organometallics, 2007, 26, pp. 692-701.
Motolko et al., Zirconium Complexes of a Rigid, Dianionic Pincer Ligand: Alkyl Cations, Arene Coordination, and Ethylene Polymerization, Organometallics, 2017, 36, pp. 3084-3093.
Hanawa et al., New Chiral Bis-Titanium(IV) Catalyst with Dibenzofuran Spacer for Catalytic Asymmetric Allylation of Aldehydes and Aryl Ketones, Adv. Synth. Catal., 2001, 343, No. 1, pp. 57-60.
Emslie et al. Cationic Uranium Alkyl Complexes of a Rigid NON-Donor Pincer Ligand: The Impact of Arene-Coordination on Ethylene Polymerization Activity, 28th Rare Earth Research Conference, Ames, IA, Jun. 18-22, 2017.
Emslie, et al. Rigid NON-Donor Pincer Ligands for Synthesis of Olefin Polymerization and Hydroamination Catalysts, CSC Conference, Edmonton, Alberta, May 30, 2018.
Motolko, Rare Earth and Group 4 Transition Metal Complexes of Rigid Dianionic Pincer Ligands, PhD Thesis, Published Nov. 2017.

* cited by examiner

RIGID NON-CYCLOPENTADIENYL GROUP 4 TRANSITION METAL AND RARE EARTH METAL CATALYSTS FOR OLEFIN POLYMERIZATION

CROSS-REFERENCE TO RELATED APPLICATIONS

This application is a National Stage of International Application No. PCT/CA2018/050742 filed on Jun. 19, 2018 which claims the benefit of priority from U.S. Provisional Patent Application No. 62/521,830 filed on Jun. 19, 2017, the contents of both of which are incorporated herein by reference in their entirety.

FIELD

This application is in the field of group 4 transition metal and rare earth metal non-cyclopentadienyl olefin polymerization catalysts, in particular, catalysts incorporating a rigid tricyclic ligand backbone; processes for polymerizing olefins using such catalysts; intermediates and processes for making such catalysts.

BACKGROUND

Synthetic polymers based on one or more alkene monomer such as ethylene, α-olefins, styrenes, dienes and substituted or unsubstituted hydrocarbylacrylates are produced in enormous quantities, and are the most common synthetic materials used world-wide. While many polyalkenes were originally synthesized for commercial use through radical polymerization processes, the development of Ziegler-Natta type polymerization catalysts shifted the focus of research in this area towards the use of metal catalysts. The development of well-defined single-site alkene polymerization catalysts (supported or unsupported) has since become a focus of intense study, with the development of many new polymerization catalysts over the last four decades. These advances, which initially focused primarily on cyclopentadienyl- or metallocene-type catalysts, have provided much greater control over polymer molecular weight, composition and microstructure, and the resulting polyalkenes have applications in a wide range of fields. The discovery that certain catalysts can effect coordination polymerization of a wide range of monomers including styrenes, dienes and methylmethacrylate, in addition to ethylene, also represents a major recent advance.

For alkene polymerization, the regiochemistry of the catalytic process will be determined by the symmetry, steric demands and electronic properties of each catalyst and catalyst component in the present application. For example, atactic, isotactic, syndiotactic and hemiisotactic poly-α-olefins or polystyrenes or poly-1,2-butadienes are typically accessed through the use of appropriate $C_{2v}$ or $C_s$(achiral), $C_2$, $C_s$(prochiral), and $C_1$ symmetric catalyst components.

A range of 4,5-bis(2,6-diisopropylanilido)-2,7-di-tert-butyl-9,9-dimethylxanthene ($XA_2$) thorium and uranium complexes, including cationic alkyl thorium and uranium complexes (see Scheme 1 below) have been disclosed (e.g. Organometallics, 2007, 26, 692-701, Organometallics, 2008, 27, 15-17, Organometallics, 2009, 28, 1891-1899, Dalton Trans. 2010, 39, 6626-6628, Dalton Trans., 2012, 41, 8175-8189, Organometallics, 2013, 32, 1466-1474, and J. Organomet. Chem., 2018, 857, 16-24, and the 2014 Rare Earth Research Conference in Squaw Valley, Calif., June 2014). The cationic trimethylsilylmethyl thorium and uranium complexes display poor or zero ethylene polymerization activity (1 atm ethylene, 25-70° C.) in benzene or toluene. By contrast, these cationic compounds display moderate ethylene polymerization activity (1 atm ethylene, 25-70° C.) in hexanes, fluorobenzene or 1,2-difluorobenzene solvent. This work does not describe non-radioactive catalysts such as rare earth or transition metal complexes.

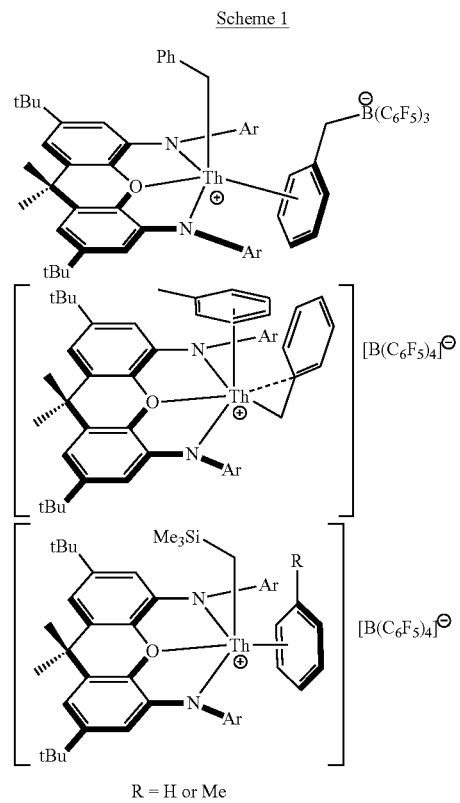

Scheme 1

R = H or Me

The complexes [($L^1$)Ti(NMe$_2$)$_2$], [($L^2$)Ti(NMe$_2$)$_2$] and [($L^2$)Ti(CH$_2$Ph)$_2$] {$L^1$=4,5-di(mesitylamido)-2,7-di-tert-butyl-9,9-dimethylxanthene, $L^2$=4,5-di-(cyclohexylamido)-2,7-di-tert-butyl-9,9-dimethylxanthene} were reported. Cationic derivatives or olefin polymerization studies were not described: R. M. Porter, A. A. Danopoulos, Dimethylxanthene- and dibenzofuran-diamido complexes of titanium, Polyhedron, 2006, 25, 859-863.

Asymmetric allylation of aldehydes and aryl ketones has also been reported using a mixture of Ti(O$^i$Pr)$_4$, S-binaphthol and 4,5-bis(triphenylmethylamino)-9,9-dimethylxanthene. However, the resulting in-situ generated catalysts are considered by Maruoka et al. to contain the neutral proligand rather than the 4,5-bis(triphenylmethylamido)-9,9-dimethylxanthene dianion, and this work does not describe cationic complexes or olefin polymerization: H. Hanawa, S. Kii and Keiji Maruoka, New Chiral Bis-Titanium(IV) catalyst with Dibenzofuran Spacer for Catalytic Asymmetric Allylation of Aldehydes and Aryl Ketones, Adv. Synth. Catal., 2001, 343, 57-60.

The patent US 2009/025.9085 A1, SEMI-RIGID LINKED DIAMINES, PRECURSORS THEREFOR, AND TRANSITION METAL DIAMIDO COMPLEXES AS CATALYSTS FOR OLEFIN POLYMERIZATION PROCESSES, by Hagadorn with ExxonMobil describes olefin polymerization catalysts bearing ligands with xanthene and related backbones. The flanking donor atoms (J1, J2, N1 and N2 in the figures below) are not attached directly to the rigid tricyclic backbone and provide a less rigid coordination environment at the metal centre.

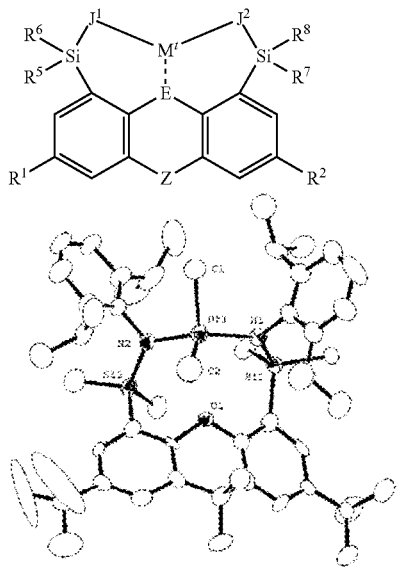

The acridan-backbone pro-ligand, 4,5-bis{(diphenylmethylene)amino}-2,7,9,9-tetramethylacridan (H[AIm$_2$]) was synthesized, deprotonation to form lithium 4,5-bis{(diphenylmethylene)amino}-2,7,9,9-tetramethylacridanide (Li[AIm$_2$]; a dimer in the solid state) was reported, and the reactivity of H[AIm$_2$] with [Y(CH$_2$SiMe$_3$)$_3$(THF)$_2$] was described. No stable alkyl derivatives, cationic complexes, or olefin polymerization studies were described: E. W. Y. Wong and D. J. H. Emslie, Cyclometalation and Coupling of a Rigid 4,5-Bis(imino)acridanide Pincer Ligand on Yttrium, Dalton Trans., 2015, 44, 11601-11612.

The extremely sterically hindered pro-ligand, 4,5-bis(2,6-dimesitylanilino)-2,7-di-tert-butyl-9,9-dimethylxanthene (H$_2$[XAT]) was synthesized, and deprotonation to form dipotassium salts was reported: N. R. Andreychuk, D. J. H. Emslie, Potassium-Alkane Interactions within a Rigid Hydrophobic Pocket, Angew. Chem. Int. Ed., 2013, 52, 1696-1699. No transition metal complexes, rare earth complexes, cationic complexes, or polymerization studies have been reported using this ligand.

The pro-ligand, 4,5-bis(2,4,6-triisopropylanilino)-2,7-di-tert-butyl-9,9-dimethylxanthene (H$_2$[XN$_2$]) was prepared, and the synthesis of a dipotassium salt of the XN$_2$ ligand, [(XN$_2$)Ln(CH$_2$SiMe$_3$)(THF)] (Ln=Y or Lu), [(XN$_2$)Y(AlMe$_4$)(THF)], [(XN$_2$)AlMe], [(XN$_2$)LaCl(THF)] and [Li(THF)$_x$][(XN$_2$)La(CH$_2$SiMe$_3$)$_2$] were reported: (i) K. S. A. Motolko and D. J. H. Emslie et al., Yttrium and Aluminum Alkyl Complexes of a Rigid Bis-Anilido NON-Donor Ligand: Synthesis and Hydroamination Catalysis, Organometallics, 2017, 1601-1608, and (ii) K. S. A. Motolko and D. J. H. Emslie et al., Rigid NON-Donor Pincer Ligand Complexes of Lutetium and Lanthanum: Synthesis and Hydroamination Catalysis, RSC Adv., 2017, 7, 27938-27945. The neutral yttrium and lutetium alkyl compounds were tested as ethylene polymerization catalysts but were inactive, and the anionic lanthanum compound was not tested as a polymerization catalyst precursor. No cationic rare earth alkyl complexes were described, and no neutral rare earth complexes with two or more activatable ligands were described.

[(L$^3$)Zr(NMe$_2$)$_2$], [(L$^3$)ZrCl(NMe$_2$)$_2${Rh(COD)}] and [(L$^3$)ZrCl$_2$(NMe$_2$)$_2${Rh(COD)}$_2$] (L$^3$=4,5-bis(tert-butylphosphido)-9,9-dimethylxanthene, COD=1,5-cyclooctadiene] have been reported, but no alkyl derivatives, cationic complexes, rare earth complexes, or olefin polymerization studies were described: L. Turculet and R. McDonald, Mono-, Di-, and Trinuclear Complexes Featuring the New Bis(phosphido) Ligand 4,5-Bis(tert-butylphosphido)-9,9-dimethylxanthene ([POP]$^{-2}$), Organometallics, 2007, 26, 6821-6826.

The pro-ligand, 4,5-bis(2,4,6-triisopropylphenylphosphino)-2,7-di-tert-butyl-9,9-dimethylxanthene (H$_2$[XP$_2$]) was prepared, and the synthesis of dipotassium salts and [(XP$_2$)Yl(THF)$_2$] was reported: K. S. A. Motolko and D. J. H. Emslie et al., Potassium and Yttrium Complexes of a Rigid Bis-Phosphido POP-Donor Ligand, Eur. J. Inorg. Chem., 2017, 2920-2927. However, no group 4 transition metal complexes, alkyl complexes, cationic complexes, or polymerization studies were reported using the XP$_2$ ligand, and no neutral rare earth complexes with two or more activatable ligands were discussed.

The xanthene-backbone pro-ligand 4,5-bis(1-adamantylamino)-2,7-di-tert-butyl-9,9-dimethylxanthene (H$_2$[XAd]) has been prepared and utilized to synthesize alkali metal and thorium(IV) derivatives of the XAd ligand (N. R. Andreychuk, T. Dickie, D. J. H. Emslie and H. A. Jenkins, Dalton Trans., 2018, 4866-4876). No transition metal complexes, rare earth complexes, cationic complexes, or polymerization studies have been reported using the XAd ligand.

A range of late transition metal complexes bearing neutral bis(phosphine) ligands featuring a rigid tricyclic backbone, such as Xantphos and Acriphos shown below, have been published and patented (for e.g. see: (1) P. W. N. M. van Leeuwen, P. C. J. Kamer and J. N. H. Reek, The bite angle makes the catalyst, Pure Appl. Chem., 1999, 71 (8), 1443-1452. (2) M. W. Haenel, S. Hillebrand, Mülheim an der Ruhr (DE), Catalysts Made from Transition Metal Compounds and 4,5-Diphosphinoacridine-Ligands, U.S. Pat. No. 6,290,926 B1). However, these neutral bis(phosphine) ligands would not be well suited for the development of group 4 or rare earth metal polymerization catalysts, and such complexes have not been reported.

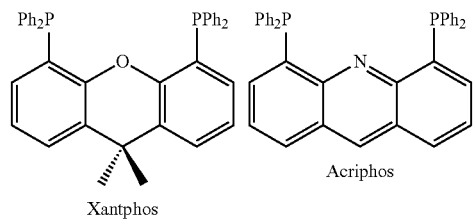

Xantphos       Acriphos

SUMMARY

The present application provides a catalyst component for alkene polymerization. The catalyst component comprises or contains: (a) a group 4 transition metal or rare earth metal, (b) a rigid non-cyclopentadienyl ligand (RL) with a tricyclic backbone composed of three ortho-fused 6-membered rings in a linear arrangement (as is the case in xanthene), with or without additional fused rings; this tricyclic backbone contains at least one donor atom within the central ring (as is the case for xanthene, oxanthrene, or acridan); furthermore, donor atoms/groups or aryl rings are attached directly (i.e. via the donor atom in the case of donor groups) to both of the bondable carbon atoms adjacent to at least one of the donor atoms within the central ring (e.g. xanthene with two donor groups, or two aryl rings, or one donor group and one aryl ring adjacent to oxygen), and (c) two or more activatable ligands (e.g. chloro, alkyl, aryl, allyl or hydride ligands) attached to the central metal.

In some embodiment, the present application includes a catalyst component for alkene polymerization comprising: a central metal selected from a group 4 transition metal and a rare earth metal; two or more activatable ligands attached to the central metal if the complex is neutral or anionic, or one or more activatable ligand attached to the central metal if the complex is monocationic or dicationic; and a rigid non-cyclopentadienyl ligand (RL) with a tricyclic backbone comprised of three ortho-fused 6-membered rings in a linear arrangement, with or without additional fused rings; the tricyclic backbone comprising at least two outer carbocyclic rings fused to a central ring, the central ring comprises at least one donor atom, and further donor atoms, donor groups or aryl rings are directly attached to both carbon atoms in the two outer carbocyclic rings that are adjacent to at least one of the donor atoms within the central ring.

In some embodiments, the rigid non-cyclopentadienyl ligand has a charge of 0, 1- or 2- (considering all donor atoms of the ligand to have an octet of valence electrons)

The catalyst component is typically neutral, and is optionally combined with one or more activator and/or scavenger. The resulting catalyst may be in solution, precipitated from solution, or optionally carried on a support. The catalyst component is defined by the formulae:

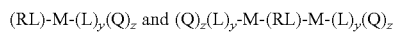
(RL)-M-(L)$_y$(Q)$_z$ and (Q)$_z$(L)$_y$-M-(RL)-M-(L)$_y$(Q)$_z$ wherein M is selected from a group 4 transition metal (Ti, Zr and Hf) or a rare earth metal (Sc, Y, Lu, La, Ce, Pr, Nd, Sm, Eu, Gd, Tb, Dy, Ho, Er, Tm, Yb); L is a non-cyclopentadienyl "activatable ligand"; y is 1, 2 or 3; Q is an "additional ligand" that is monodentate and bears a charge of 0; z is 0 or 1; the rigid non-cyclopentadienyl ligand (RL) is defined by the following formulae (most typically with two X groups yielding a single metal binding pocket):

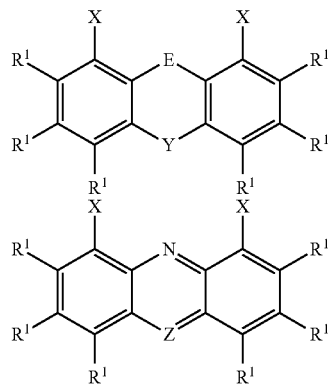

Within the same ligand:
X groups can be the same or different
R$^1$ groups can be the same or different

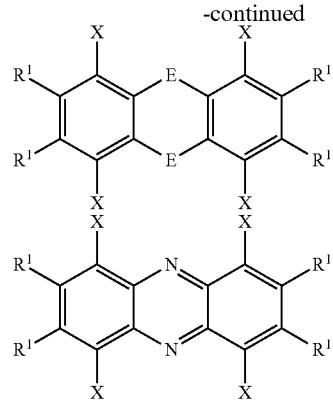

Within the same ligand:
X groups can be the same or different
R$^1$ groups can be the same or different wherein E is nitrogen, phosphorus, oxygen or sulphur; Z is nitrogen or a CR$^2$ group; Y is oxygen or sulphur, or is selected from the following formulae (dashed lines indicate points of attachment to the remainder of the ligand):

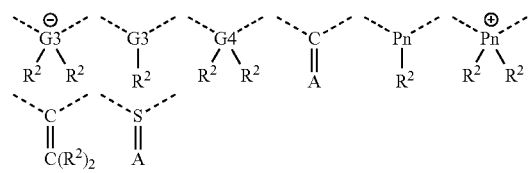

wherein G3 is boron, aluminum or gallium, G4 is carbon, silicon, germanium or tin, A is oxygen or an NR$^2$ group, and Pn is nitrogen or phosphorus; each X is independently selected from the group consisting of the following formulae (dashed lines indicate the point of attachment to the remainder of the ligand):

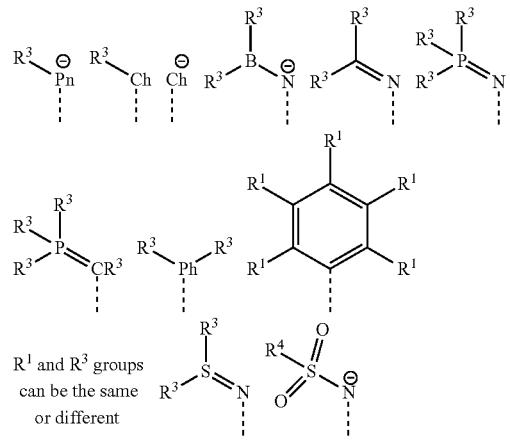

R$^1$ and R$^3$ groups
can be the same
or different wherein Ch is oxygen or sulphur, and Pn is as defined above; and each R$^1$, R$^2$ and R$^3$ substituent is independently selected from the group consisting of: (a) a hydrogen atom, (b) a halogen atom, (c) a hydrocarbyl radical, (d) an alkoxy, aryloxy, siloxy, germoxy or stannoxy radical, (e) an amino radical substituted by up to two hydrocarbyl, boryl, silyl, or amino radicals, (f) a silyl, germyl or stannyl radical substituted by up to three hydrocarbyl, silyl, germyl, stannyl, alkoxy, siloxy, germoxy, stannoxy, aryloxy or amino radicals, (g) a thioalkyl or thioaryl radical, (h) a phosphino radical substituted by up to two hydrocarbyl, silyl, alkoxy, siloxy, aryloxy or amino radicals, (i) a boryl radical substituted by up to two hydrocarbyl, silyl, alkoxy, siloxy, aryloxy or amino radicals; each $R^4$ is a hydrocarbyl or silyl radical; $R^3$ or $R^4$ groups may also contain a carbanion generated by cyclometallation during or subsequent to ligand attachment; optionally, adjacent $R^1$ substitutents ($R^1$ groups attached to carbon atoms that are either: (a) 1,2-disposed, or (b) 1,3-disposed with a quaternary carbon atom between them) may join together to form a substituted or unsubstituted, saturated, partially unsaturated or aromatic cyclic or polycyclic ring; optionally, $R^2$ substituents may join together to form a substituted or unsubstituted, saturated, partially unsaturated or fully unsaturated cyclic or polycyclic ring; optionally $R^3$ substituents may join together to form a substituted or unsubstituted, saturated, partially unsaturated or fully unsaturated cyclic or polycyclic ring (including where $CR^3_2$ or $SiR^3_2$=an N-heterocyclic carbene or N-heterocyclic silylene); optionally all three $R^3$ substituents in an $NPR^3_3$ group may join together to form a cage (e.g. $PR^3_3$=a phosphatrane); optionally, each $R^1$, $R^2$, $R^3$ and $R^4$ group may join together with an $R^1$, $R^2$, $R^3$ or $R^4$ group on a second catalyst component to form a substituted or unsubstituted, saturated, partially unsaturated, aromatic or polycyclic bridging group.

The present application also includes a catalyst system wherein a catalyst component of the application is combined with at least one activator.

The present application also includes a polymerization process characterized by contacting one or more monomers polymerizable by coordination polymerization under suitable coordination polymerization conditions with a catalyst system of the application. In some embodiments, the alkene monomer or monomers are selected from ethylene, propylene, 1-butene, 1-hexene, 1-octene, 1-decene, styrene, butadiene, and isoprene. In some embodiments, the alkene monomer or monomers are selected from ethylene, propylene, 1-butene, 1-hexene, 1-octene, 1-decene, styrene and isoprene.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

The present application will now be described in greater detail with reference to the drawings in which.

DETAILED DESCRIPTION

I. Definitions

Figure 1:
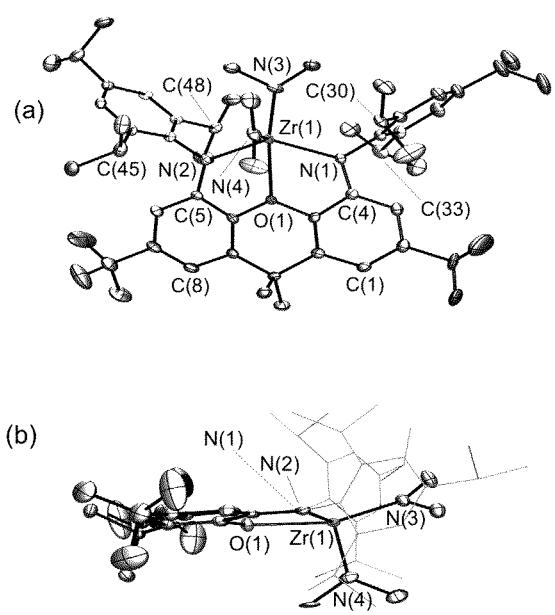
FIG. 1 shows the X-ray crystal structure for exemplary catalyst precursor molecule [(XN$_2$)Zr(NMe$_2$)$_2$]. The whole molecule is disordered over two positions, and only the major position (92%) is shown. Ellipsoids are set to 50%. Hydrogen atoms are omitted. In view a, the apical NMe$_2$ group points out of the page. In view b, N(1) is located behind N(2), and the 2,4,6-triisopropylphenyl groups are depicted in wire-frame format for clarity.

Unless otherwise indicated, the definitions and embodiments described in this and other sections are intended to be applicable to all embodiments and aspects of the present application herein described for which they are suitable, as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having", "containing" and their derivatives.

The term "consisting" and its derivatives, as used herein, are intended to be closed terms that specify the presence of the stated features, elements, components, groups, integers, and/or steps, but exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise. For example, an embodiment including "a catalyst" should be understood to present certain aspects with one catalyst or two or more additional catalysts.

In embodiments comprising an "additional" or "second" component, such as an additional or second catalyst, the second component as used herein is chemically different from the other components or first component. A "third"

component is different from the other, first, and second components, and further enumerated or "additional" components are similarly different.

In some embodiments of the present application, the compounds contain one or more asymmetric center. Where compounds possess more than one asymmetric center, they may exist as diastereomers. It is to be understood that all such isomers and mixtures thereof in any proportion are encompassed within the scope of the present application. It is to be further understood that while the stereochemistry of the compounds may be as shown in any given compound listed herein, such compounds may also contain certain amounts (for example, less than 20%, suitably less than 10%, more suitably less than 5%) of compounds of the present application having alternate stereochemistry. It is intended that any optical isomers, as separated, pure or partially purified optical isomers or racemic mixtures thereof are included within the scope of the present application.

The term "suitable" as used herein means that the selection of specific reagents or conditions will depend on the reaction being performed and the desired results, but none-the-less, can generally be made by a person skilled in the art once all relevant information is known.

The term "alkene" in this document refers to compounds containing a C=C double bond, including ethylene, α-olefins such as propylene, 1-hexene, 1-octene, 3-methyl-1-butene, vinylcyclohexane, styrenes, cyclic alkenes, dienes such as butadiene, isoprene, 1,3-cyclohexadiene, divinylbenzenes and dicyclopentadiene, multiply substituted alkenes such as 2-butene, stilbene, 2-methyl-2-butene and isobutylene, and substituted or unsubstituted hydrocarbylacrylates such as methylacrylate and methylmethacrylate.

As used herein, Ad is 1-adamantyl, $^i$Bu is isobutyl, $^n$Bu is n-butyl, $^s$Bu is sec-butyl, $^t$Bu is tert-butyl, Dipp is 2,6-diisopropylphenyl, dme is 1,2-dimethoxyethane, duryl is 2,3,5,6-tetramethylphenyl, $^n$Dec is n-decyl, Et is ethyl, $^n$Hex is n-hexyl, Me is methyl, Mes or Mesityl is 2,4,6-trimethylphenyl, $^n$Oct is n-octyl, Ph is phenyl, $^i$Pr is isopropyl, $^n$Pr is n-propyl, Terph or Terphenyl is 2,6-diphenylphenyl, THF is tetrahydrofuran, Tripp is 2,4,6-triisopropylphenyl, Xyl or Xylyl is 2,6-dimethylphenyl.

The term "bondable ring position" is a ring position that is capable of bearing a substituent. For example, anthracene has ten bondable ring positions. Adjacent substituents are defined as those on adjacent atoms, or adjacent bondable ring positions. Therefore, in anthracene, substituents in the 2- and 3-positions are adjacent, and substituents in the 4- and 10-positions are also adjacent, as illustrated in the structures below. Furthermore, the bondable carbon atoms adjacent to the oxygen donor of xanthene are those in the 4- and 5-positions, as illustrated in the figure below.

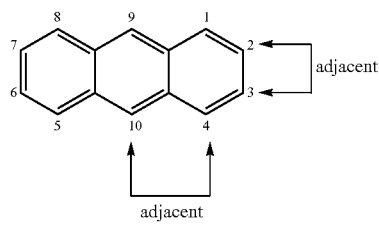

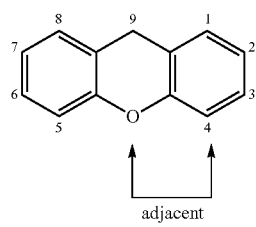

The rigid non-cyclopentadienyl ligands (RL) in this application contain a tricyclic backbone composed of three ortho-fused 6-membered rings in a linear arrangement (with or without additional fused rings), and this tricyclic backbone contains at least one donor atom within the central ring. Examples of simple tricyclic compounds that meet these criteria are acridine ($C_{13}H_9N$), phenazine ($C_{12}H_8N_2$), xanthene ($C_{13}H_8SO$), xanthone ($C_{13}H_8O_2$), thioxanthene ($C_{13}H_{10}S$), thioxanthone ($C_{13}H_8SO$), oxanthrene ($C_{12}H_8O_2$), thianthrene ($C_{12}H_8S_2$), phenoxathiine ($C_{12}H_8SO$), deprotonated acridan ($C_{13}H_{10}N^-$), deprotonated acridone ($C_{13}H_8ON^-$), deprotonated 9,10-dihydro-9-phosphaanthracene ($C_{13}H_{10}P^-$, where the 9- and 10-positions are the bondable positions of the central ring), doubly deprotonated 9,10-dihydrophenazine ($C_{12}H_8N_2^{2-}$, where the 9- and 10-positions are the bondable positions of the central ring), deprotonated phenoxazine ($C_{12}H_8ON^-$), deprotonated phenothiazine ($C_{12}H_8SN^-$), deprotonated phenoxaphosphinine ($C_{12}H_8OP^-$), and deprotonated phenothiaphosphine ($C_{12}H_8SP^-$); all of the aforementioned deprotonated heterocycles are deprotonated at nitrogen or phosphorus to generate an amido or phosphido monoanion.

For the purposes of this application, the term "cyclopentadienyl" applies to unsubstituted and substituted cyclopentadienyl anions, including indenyl and fluorenyl anions.

The term "activatable ligand" refers to: (a) a ligand which may be activated by a cocatalyst (also known as an "activator") to facilitate olefin polymerization, and/or (b) a ligand which may be directly involved in the first insertion step of a polymerization reaction. For the purpose of this application, activatable ligands are typically hydrocarbyl or hydride ligands, or halide and related ligands such as triflate and tosylate which may be converted by an activator (or scavenger) into a hydrocarbyl or hydride ligand, and they are not cyclopentadienyl ligands.

The term "additional ligand" refers to a neutral ligand which is neither the primary ancillary ligand (the rigid non-cyclopentadienyl ligand) or an "activatable ligand". This "additional ligand" (Q) may be an arene, a 1,2-dialkoxyethane ligand, or any monodentate ligand with an overall charge of 0 in its stable form. Examples include $OEt_2$, THF, dme, a tertiary amine, pyridine or an N-heterocyclic carbene.

The "binding pocket" of a rigid non-cyclopentadienyl ligand is defined as the pocket between the two X groups and an E or N donor in the central ring of the tricyclic ligand backbone, as shown the Figure below. The group 4 transition metal will bind in this pocket, typically via interactions with all anionic donor groups (X or E), optionally supplemented by interactions with neutral donor group(s) of the rigid ligand (X, E or N).

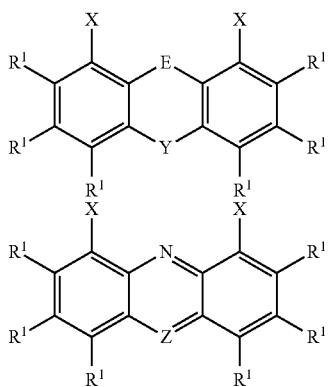

Within the same ligand:
X groups can be the same or different
R¹ groups can be the same or different

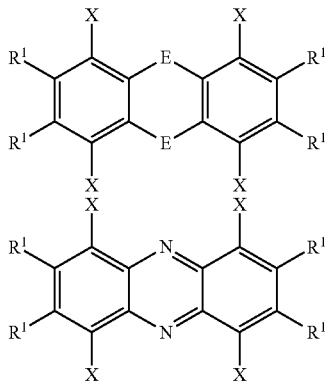

Within the same ligand:
X groups can be the same or different
R¹ groups can be the same or different An "activator" is a compound that is typically added to convert a neutral or anionic catalyst component into a more catalytically active monocationic or dicationic species. This may or may not involve conversion of a halide (or related) ligand to hydrocarbyl or hydride (preferably alkyl) ligand. The terms "activator" or co-catalyst" are used interchangeably. A "scavenger" is a compound that is typically added to facilitate polymerization by removing impurities (e.g. Al"Oct$_3$ or Al$^i$Bu$_3$). In some cases, an activator may also act as a scavenger, or a scavenger may also act as an activator.

When a charge is specifically assigned to an RL ligand, an activatable ligand (L), or an additional ligand (Q), it is assumed that the ligand donor atom(s) have a full octet of valence electrons, except in the case of N-heterocyclic carbenes or other Fischer carbenes, which are considered to be neutral. For example, amines, ethers, thioethers, phosphines, ylides and N-heterocyclic carbenes are assigned a charge of zero, and chloride, triflate, amido, phosphido, alkyl, aryl, vinyl, allyl and hydride donors are assigned a charge of 1-. Starting from a metal complex, the aforementioned ligand charges are obtained by conceptual bond heterolysis where electrons in the bond between a ligand and a metal are assigned to the ligand (e.g. bond heterolysis in Zr(CH$_2$SiMe$_3$)$_4$ yields Zr$^{4+}$ and four CH$_2$SiMe$_3$-anions).

The terms "hydrocarbyl radical" and "hydrocarbyl group" are used interchangeably throughout this document. Likewise, the terms "group", "radical" and "substitutent" are used interchangeably in this document. Where radicals are referred to, these are the result of conceptual bond homolysis in the compound under discussion (e.g. bond homolysis in Zr(CH$_2$SiMe$_3$)$_4$ yields a neutral Zr atom and four CH$_2$SiMe$_3$ radicals, and homolysis of the C—H bond in CHCl$_3$ yields a hydrogen radical and a CCl$_3$ radical).

A transition metal-containing catalyst component is often referred to as a "catalyst precursor", "precatalyst", "precatalyst", "catalyst", "metal complex" and "metal compound". These words are used interchangeably.

For the purposes of this application, "hydrocarbyl radical" is defined to be a C$_1$-C$_{30}$ radical which may be unsubstituted or further substituted by one or more halogen atoms, silyl, germyl or stannyl radicals, alkoxy, siloxy, germoxy, stannoxy or aryloxy radicals, thioalkyl or thioaryl radicals, or amino radicals, and the like, or where at least one CR*=CR* or C≡C group, has been inserted within the hydrocarbyl radical, wherein R* is independently a hydrogen atom, a hydrocarbyl radical (suitably an unsubstituted C$_1$-C$_{20}$ alkyl chain), a silyl radical an alkoxy radical or an aryloxyradical; typical hydrocarbyl radicals may include singly and multiply branched carbon atoms, and any number of cyclic, aromatic and cage (polyhedral) regions. Among the most common choices are methyl, benzyl, neopentyl, neophyl (CH$_2$CMe$_2$Ph), trimethylsilylmethyl, bis(trimethylsilyl)methyl, phenyldimethylsilylmethyl, phenyl, allyl, and 2-methylallyl radicals.

The term "silyl" and "silyloxy" as used herein refers to SiR'R"R'" groups and O—SiR'R"R'", respectively, wherein R', R" and R'" are independently heteroatom-free hydrocarbyl groups.

The term "germyl" and "germoxy" as used herein refers to GeR'R"R'" groups and O—GeR'R"R'", respectively, wherein R', R" and R'" are independently heteroatom-free hydrocarbyl groups.

The term "stannyl" and "stannoxy" as used herein refers to SNR'R"R'" groups and O—GeR'R"R'", respectively, wherein R', R" and R'" are independently heteroatom-free hydrocarbyl groups.

The term "amino radicals" as used herein refers to NR'R" groups wherein R' and R" are independently selected from trialkyllsilyl (such as trimethylsilyl) or heteroatom-free hydrocarbyl groups.

II. Description of Catalyst Component

The following application relates to catalysts used for alkene polymerization. The catalyst component comprises a complex consisting of: (a) a group 4 transition metal or rare earth metal, (b) a rigid non-cyclopentadienyl ligand with a tricyclic backbone composed of three ortho-fused 6-membered rings in a linear arrangement (as is the case in xanthene), with or without additional fused rings; this tricyclic backbone contains at least one donor atom within the central ring (as is the case for xanthene, oxanthrene, or acridan); furthermore, donor atoms/groups or aryl rings are attached directly (i.e. via the donor atom in the case of donor groups) to both of the bondable carbon atoms adjacent to at least one of the donor atoms within the central ring (e.g. xanthene with two donor groups, or two aryl rings, or one donor group and one aryl ring adjacent to oxygen), and (c) two or more activatable ligands (e.g. chloro, alkyl, aryl, allyl or hydride ligands) attached to the central metal.

In some embodiments, the applicant includes a catalyst component for alkene polymerization comprising: a central metal selected from a group 4 transition metal and a rare earth metal; two or more activatable ligands attached to the central metal if the complex is neutral or anionic, or one or more activatable ligand attached to the central metal if the complex is monocationic or dicationic; and a rigid non-cyclopentadienyl ligand (RL) with a tricyclic backbone comprised of three ortho-fused 6-membered rings in a linear arrangement, with or without additional fused rings; the tricyclic backbone comprising at least two outer carbocyclic rings fused to a central ring, the central ring comprises at least one donor atom, and further donor atoms, donor groups or aryl rings are directly attached to both carbon atoms in the two outer carbocyclic rings that are adjacent to at least one of the donor atoms within the central ring.

The rigid non-cyclopentadienyl ligand has a charge of 0, 1- or 2- (considering all donor atoms of the ligand to have an octet of valence electrons). The catalyst component is optionally combined with an activator, typically for the purpose of generating a highly active monocationic or dicationic polymerization catalyst, and the catalyst and/or catalyst components may be in solution, precipitated from solution, or optionally carried on a support.

The catalyst components in this application (a) do not contain a cyclopentadienyl anion, and (b) feature a rigid tricyclic ligand backbone with donor atoms/groups (or aryl rings) attached directly to both of the bondable carbon atoms that are adjacent to at least one of the donor atoms within the central ring. While not wishing to be limited by theory, the latter feature endows the RL ligands of this application with high rigidity (although the tricyclic ligand backbone is not necessarily planar), which maximizes the effectiveness of steric bulk in the ligand, thereby providing a mechanism to exert greater control over (a) interactions between the catalyst component(s) and each other, activators, scavengers, anions, substrates and solvents, (b) polymerization reactivity, selectivity and regiochemistry, and (c) thermal stability. Furthermore, the tightly controlled metal binding environment provided by the RL ligands of this application positions coordinated metals in close proximity to the central donor of the tricyclic backbone (E or N) and the donor atoms of both X groups, regardless of the nature of the donor atoms involved, yielding catalyst components featuring unusual or unique metal binding environments.

Typical metal-RL ligand bonding modes in the catalysts and catalyst components of this application are illustrated in the non-limiting diagrams in the structures below; the symbols M, L, y, Q, z, E, Y, X, and $R^1$ are defined in sections III.-VIII below. Dashed lines between the metal and an arene indicate one possible bonding scenario; arenes within the RL ligand may be $\eta^n$-coordinated (n=1–6) to the metal, or may not interact with the metal.

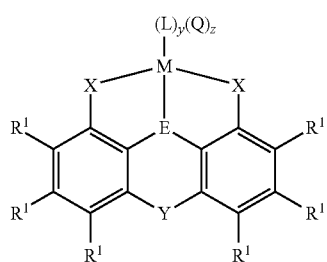

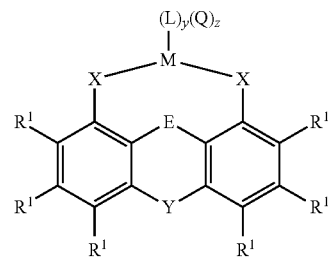

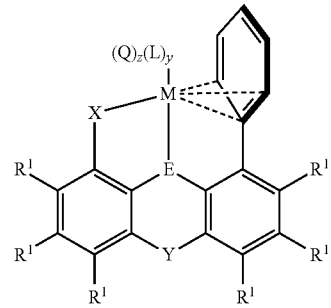

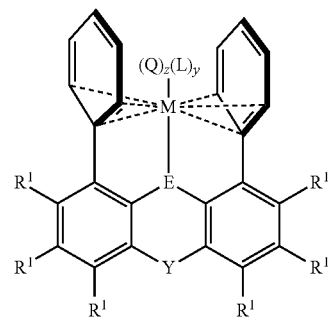

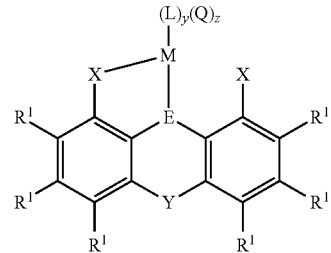

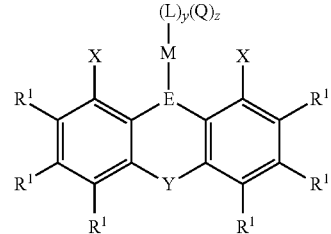

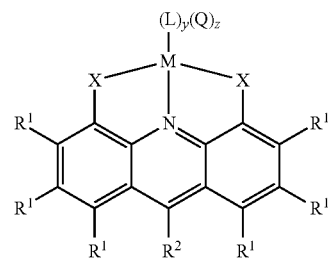

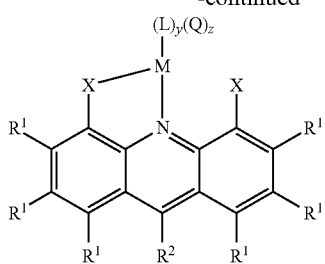

III. Metals

The catalyst component of this application is a complex containing a group 4 transition metal or a rare earth metal. In some embodiments the group 4 transition metal is selected from Ti, Zr and Hf and the rare earth metals is selected from Sc, Y, Lu, La, Ce, Pr, Nd, Sm, Eu, Gd, Tb, Dy, Ho, Er, Tm and Yb. In some embodiments, the metal is Zr or Y.

IV. RL ligand

In some embodiments, the catalyst component of this application contains a rigid non-cyclopentadienyl ligand with a tricyclic backbone composed of three ortho-fused 6-membered rings in a linear arrangement (as is the case in xanthene), with or without additional fused rings; this tricyclic backbone contains at least one donor atom within the central ring (as is the case for xanthene, oxanthrene, or acridan); furthermore, donor atoms/groups or aryl rings are attached directly (i.e. via the donor atom in the case of donor groups) to both of the bondable carbon atoms adjacent to at least one of the donor atoms within the central ring (e.g. xanthene with two donor groups, or two aryl rings, or one donor group and one aryl ring adjacent to oxygen).

In some embodiments, the applicant includes a contains a rigid non-cyclopentadienyl ligand (RL) with a tricyclic backbone comprised of three ortho-fused 6-membered rings in a linear arrangement, with or without additional fused rings; the tricyclic backbone comprising at least two outer carbocyclic rings fused to a central ring, the central ring comprises at least one donor atom, and further donor atoms, donor groups or aryl rings are directly attached to both carbon atoms in the two outer carbocyclic rings that are adjacent to at least one of the donor atoms within the central ring.

The rigid non-cyclopentadienyl ligand has a charge of 0, 1- or 2- (considering all donor atoms of the ligand to have an octet of valence electrons).

The RL ligand is directly bound to the metal, and is defined by the following formulae (in some embodiments, with only two X groups yielding a single metal binding pocket):

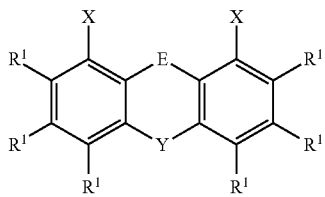

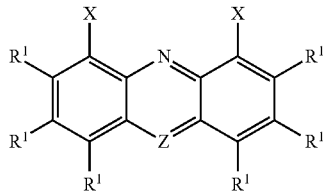

Within the same ligand:
X groups can be the same or different
$R^1$ groups can be the same or different

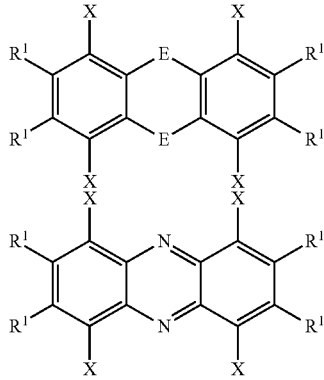

Within the same ligand:
X groups can be the same or different
$R^1$ groups can be the same or different wherein E is nitrogen, phosphorus, oxygen or sulphur; Z is nitrogen or a $CR^2$ group; Y is oxygen or sulphur, or is selected from the following formulae (dashed lines indicate points of attachment to the remainder of the ligand):

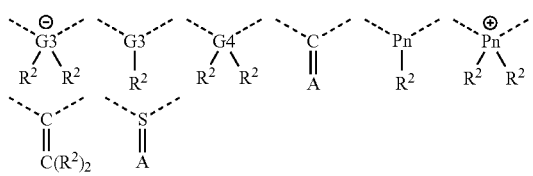

wherein G3 is boron, aluminum or gallium, G4 is carbon, silicon, germanium or tin, A is oxygen or an $NR^2$ group, and Pn is nitrogen or phosphorus; each X is independently selected from the group consisting of the following formulae (dashed lines indicate the point of attachment to the remainder of the ligand):

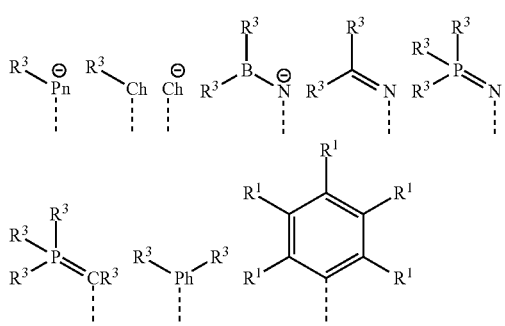

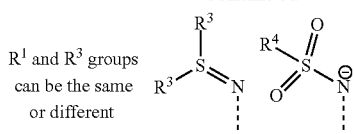

R[1] and R[3] groups can be the same or different wherein Ch is oxygen or sulphur, and Pn is as defined above; each R[1], R[2] and R[3] substituent is independently selected from the group consisting of: (a) a hydrogen atom, (b) a halogen atom, (c) a hydrocarbyl radical, (d) an alkoxy, aryloxy, siloxy, germoxy or stannoxy radical, (e) an amino radical substituted by up to two hydrocarbyl, boryl, silyl, or amino radicals, (f) a silyl, germyl or stannyl radical substituted by up to three hydrocarbyl, silyl, germyl, stannyl, alkoxy, siloxy, germoxy, stannoxy, aryloxy or amino radicals, (g) a thioalkyl or thioaryl radical, (h) a phosphino radical substituted by up to two hydrocarbyl, silyl, alkoxy, siloxy, aryloxy or amino radicals, (i) a boryl radical substituted by up to two hydrocarbyl, silyl, alkoxy, siloxy, aryloxy or amino radicals; each R[4] is a hydrocarbyl or silyl radical; optionally, adjacent R[1] substitutents (R[1] groups attached to carbon atoms that are either: (a) 1,2-disposed, or (b) 1,3-disposed with a quaternary carbon atom between them) may join together to form a substituted or unsubstituted, saturated, partially unsaturated or aromatic cyclic or polycyclic ring; optionally, R[2] substituents may join together to form a substituted or unsubstituted, saturated, partially unsaturated or fully unsaturated cyclic or polycyclic ring; optionally R[3] substituents may join together to form a substituted or unsubstituted, saturated, partially unsaturated or fully unsaturated cyclic or polycyclic ring (including where $CR^3_2$ or $SiR^3_2$=an N-heterocyclic carbene or N-heterocyclic silylene); optionally all three R[3] substituents in an $NPR^3_3$ group may join together to form a cage (e.g. $PR^3_3$=a phosphatrane); optionally, each R[1], R[2], R[3] and R[4] group may join together with an R[1], R[2], R[3] or R[4] group on a second catalyst component to form a substituted or unsubstituted, saturated, partially unsaturated, aromatic or polycyclic bridging group.

R[3] or R[4] groups may also contain a carbanion generated by cyclometallation during or subsequent to ligand attachment.

In some embodiments, the catalyst component is defined by the formula below, where L is a non-cyclopentadienyl "activatable ligand", y is 1, 2 or 3, Q is an "additional ligand" that is monodentate and bears a charge of 0, and z is 0 or 1

(RL)-M-(L)$_y$(Q)$_z$.

In some embodiments the RL ligand is neutral, the metal is a rare earth element, y is 3, and z=0.

In some embodiments the RL ligand is monoanionic, the metal is a rare earth element, y is at least 2, and z=0.

In some embodiments the RL ligand is monoanionic, the metal is group 4 transition metal, y is 3, and z=0.

In some embodiments the RL ligand is dianionic, the metal is a group 4 transition metal, y is at least 2, and z=0.

In some embodiments each R[1], R[2] and R[3] substituent is independently selected from the group consisting of a hydrogen atom, a hydrocarbyl radical, a silyl radical, an alkoxy radical, an aryloxy radical, a siloxy radical, or an amino radical substituted by up to two hydrocarbyl groups. In some embodiments, the R[1] substituents may also be halogen atoms.

In some embodiments the RL ligand has the formula shown below, where E is oxygen or sulphur.

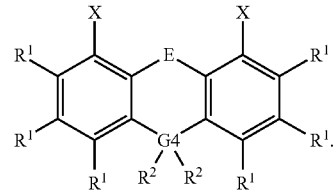

In some embodiments the RL ligand has one of the formulae shown below, where E is oxygen or sulphur.

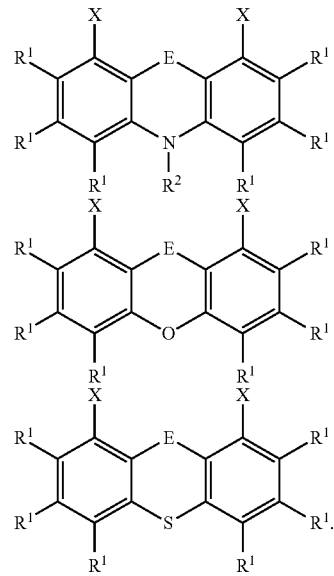

In some embodiments the RL ligand has the formula shown below, and R[2] is an amino group (e.g. NMe$_2$), an aryl group with at least one non-hydrogen substituent in the ortho position, or a tertiary alkyl or silyl group.

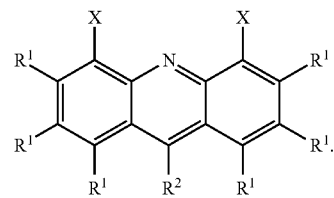

In some embodiments the RL ligand has the formula shown below, where E is nitrogen or phosphorus.

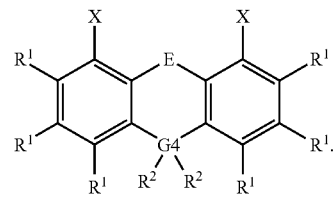

In some embodiments the RL ligand has one of the formulae shown below, where E is nitrogen or phosphorus.

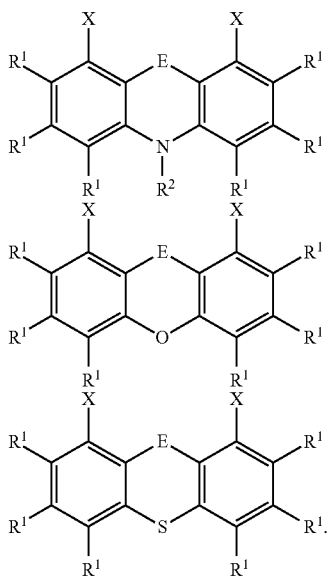

In some embodiments the RL ligand has the formula shown below, where E is oxygen or sulfur.

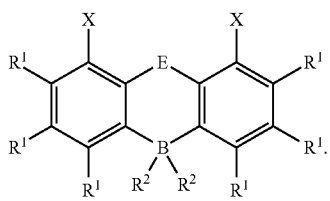

In some embodiments the RL ligand has the formula shown below, where E is nitrogen or phosphorus.

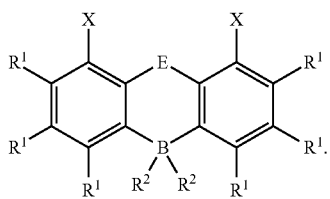

In some embodiments each X group is independently selected from a N=C($R^3$)$_2$ group, N=P($R^3$)$_3$ and N=S($R^3$)$_2$ group.

In some embodiments one X group is selected from a Pn($R^3$)$_2$ group, a Ch($R^3$) group, an N=C($R^3$)$_2$ group, an N=P($R^3$)$_3$ group, an N=S($R^3$)$_2$ group, and an arene ring, and one X group is selected from an N($R^3$), N(SO$_2$$R^4$), NB($R^3$)$_2$ and P($R^3$) substituent or a cyclometallated Pn($R^3$)$_2$, Ch($R^3$), N=C($R^3$)$_2$, N=P($R^3$)$_3$, and N=S($R^3$)$_2$ substituent In some embodiments each X group is independently selected from an N($R^3$), N(SO$_2$$R^4$), NB($R^3$)$_2$ and P($R^3$) substituent and a cyclometallated Pn($R^3$)$_2$, Ch($R^3$), N=C($R^3$)$_2$, N=P($R^3$)$_3$, and N=S($R^3$)$_2$ substituent In some embodiments each X group is independently selected from a Pn($R^3$)$_2$ group, a Ch($R^3$) group, an N=C($R^3$)$_2$ group, an N=P($R^3$)$_3$ group, an N=S($R^3$)$_2$ group, and an arene ring.

In some embodiments one X group is selected from a Pn($R^3$)$_2$ group, a Ch($R^3$) group, an N=C($R^3$)$_2$ group, an N=P($R^3$)$_3$ group, an N=S($R^3$)$_2$ group, and an arene ring, and one X group is selected from an N($R^3$), N(SO$_2$$R^4$), NB($R^3$)$_2$ and P($R^3$) substituent and a cyclometallated Pn($R^3$)$_2$, Ch($R^3$), N=C($R^3$)$_2$, N=P($R^3$)$_3$, and N=S($R^3$)$_2$ substituent (e.g. N=P($R^3$)$_2$(C$_6$H$_4$) in which cyclometallation has taken place at the ortho position of an aryl ring attached to phosphorus).

In some embodiments each X group is independently selected from a Pn($R^3$)$_2$ group, a Ch($R^3$) group, an N=C($R^3$)$_2$ group, an N=P($R^3$)$_3$ group, an N=S($R^3$)$_2$ group, and an arene ring.

In some embodiments the X groups are independently selected from an N=C($R^3$)$_2$, N=P($R^3$)$_3$ and N=S($R^3$)$_2$ group where $R^3$ is an alkyl, aryl or amino substituent.

In some embodiments one X group is selected from an N=C($R^3$)$_2$, N=P($R^3$)$_3$ and N=S($R^3$)$_2$ group where $R^3$ is an alkyl, amino or aryl substituent; and one X is an N($R^3$), N(SO$_2$$R^4$) or NB($R^3$)$_2$ group where $R^3$ is an alkyl, aryl, silyl or amino substituent.

In some embodiments X is an N($R^3$), N(SO$_2$$R^4$) or NB($R^3$)$_2$ group, $R^3$ is an alkyl, aryl, silyl or amino substituent, and $R^4$ is an alkyl or aryl group.

In some embodiments, the catalyst component contains at least one N=C($R^3$)$_2$ substituent, wherein the N=C($R^3$)$_2$ substituent or substituents are independently selected from one of the structures shown below; wherein $R^5$ groups are independently selected from hydrogen, alkyl, aryl, silyl, amino, and alkoxy radicals, and adjacent $R^5$ substituents may join together to form a substituted or unsubstituted, saturated, partially unsaturated or aromatic cyclic or polycyclic ring.

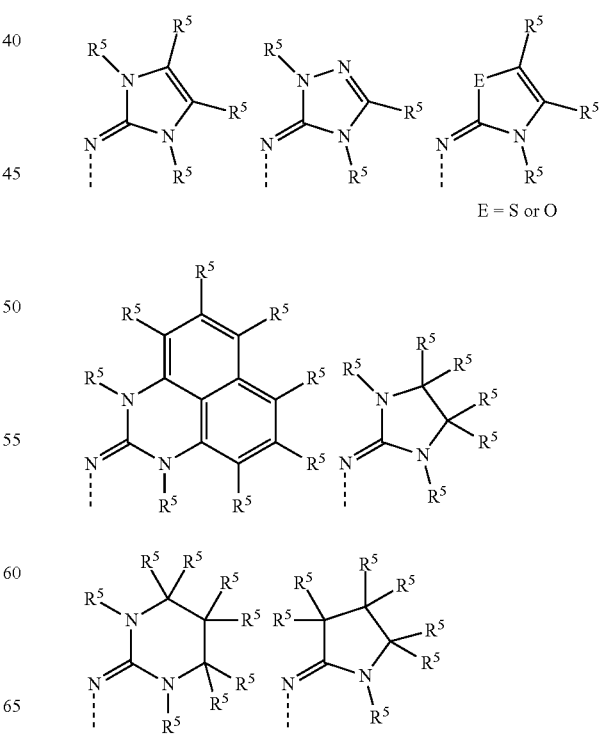

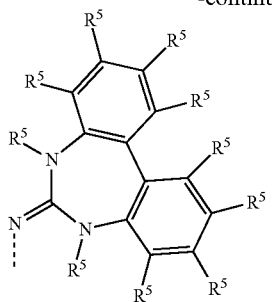
To further illustrate the nature of the rigid polycyclic backbones of the RL ligands, a non-exclusive selection of RL ligand backbones is as follows:
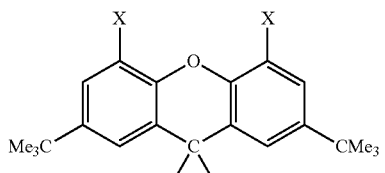
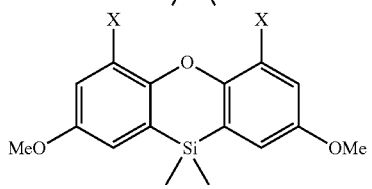
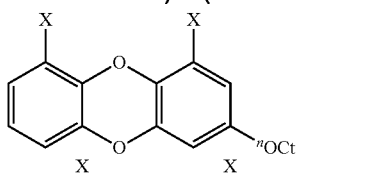
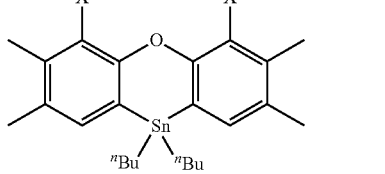
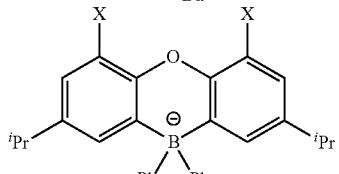
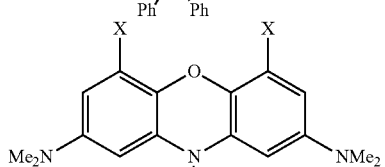
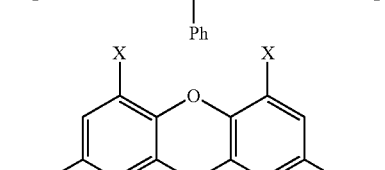
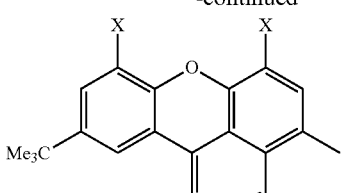
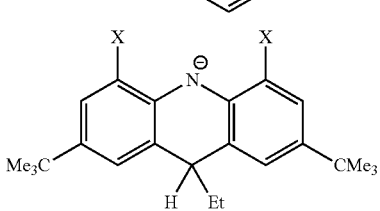
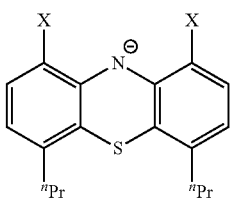
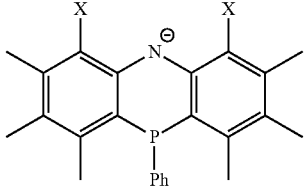
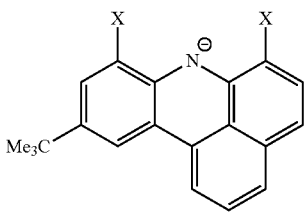
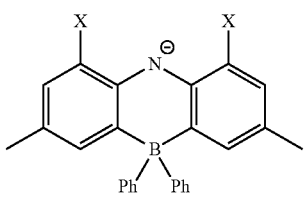
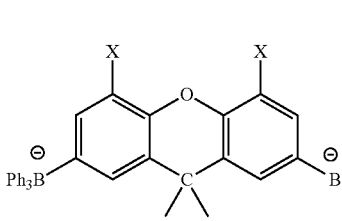
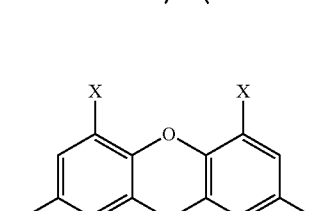

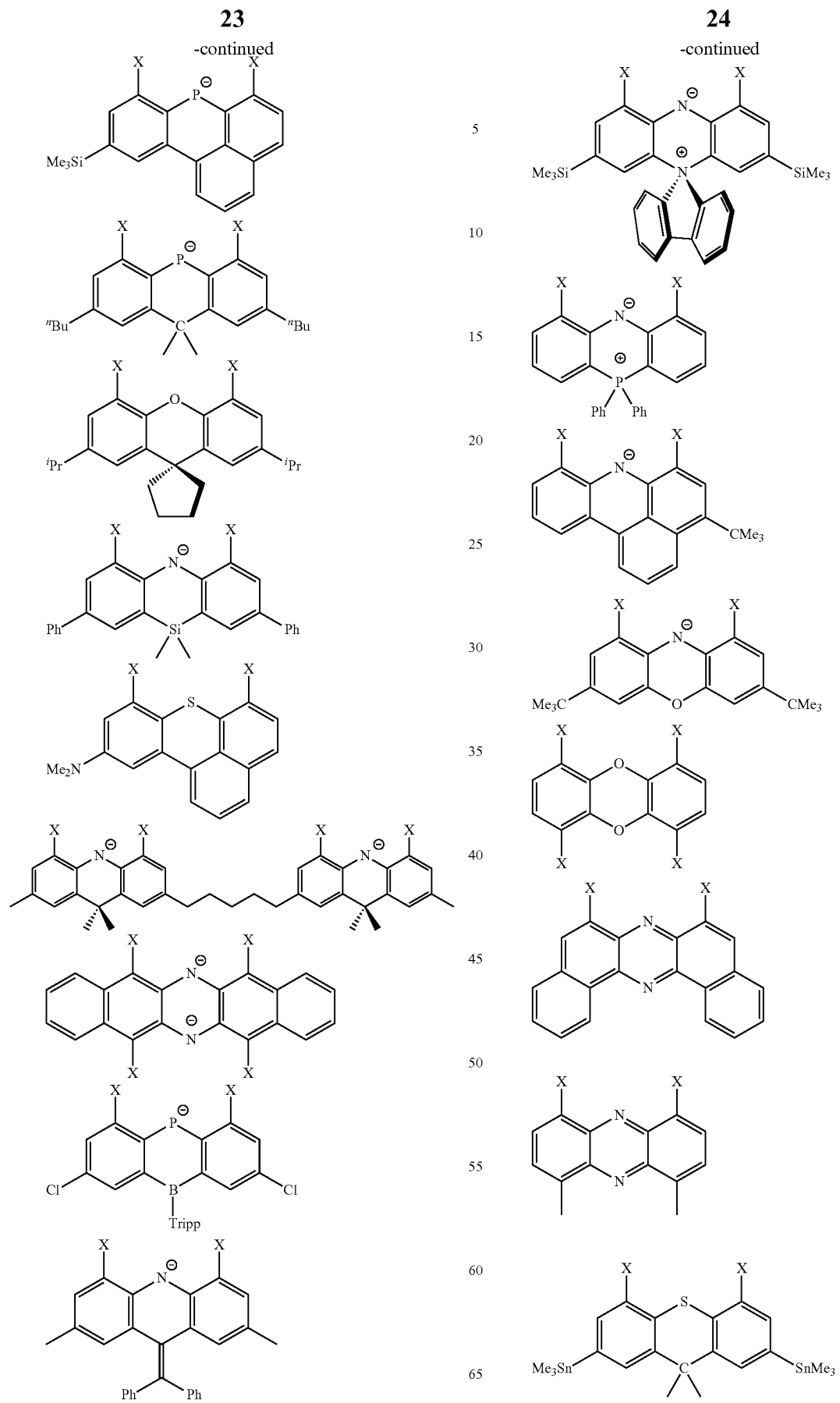

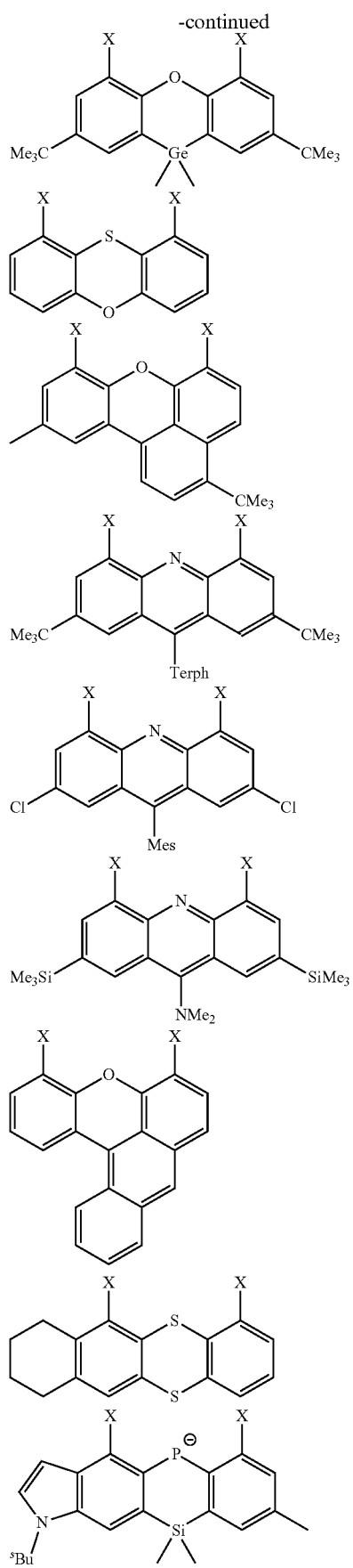
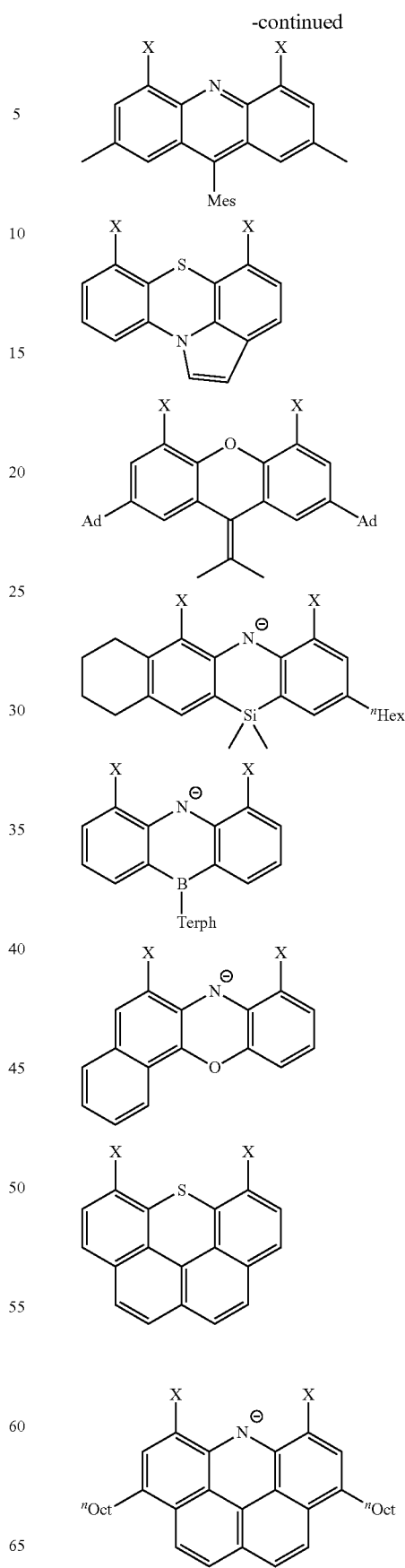

27
-continued
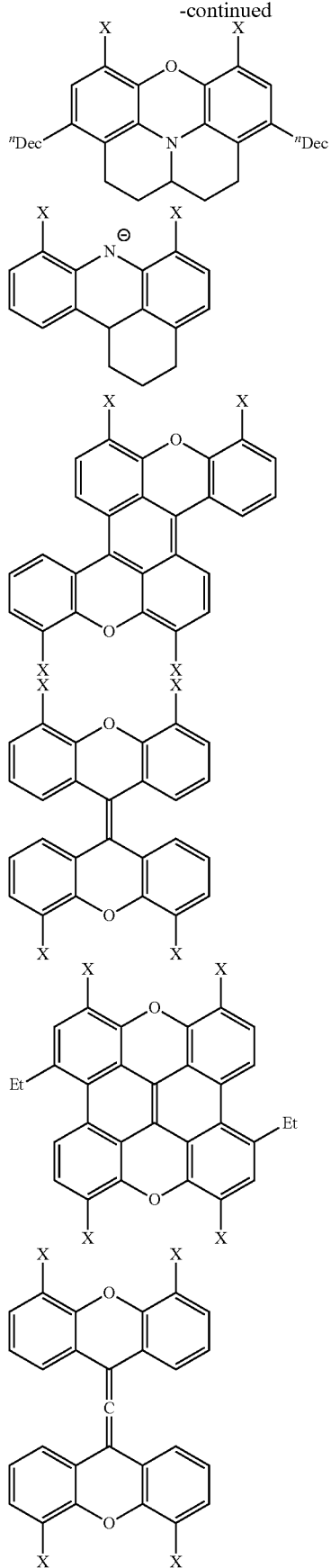
28
-continued
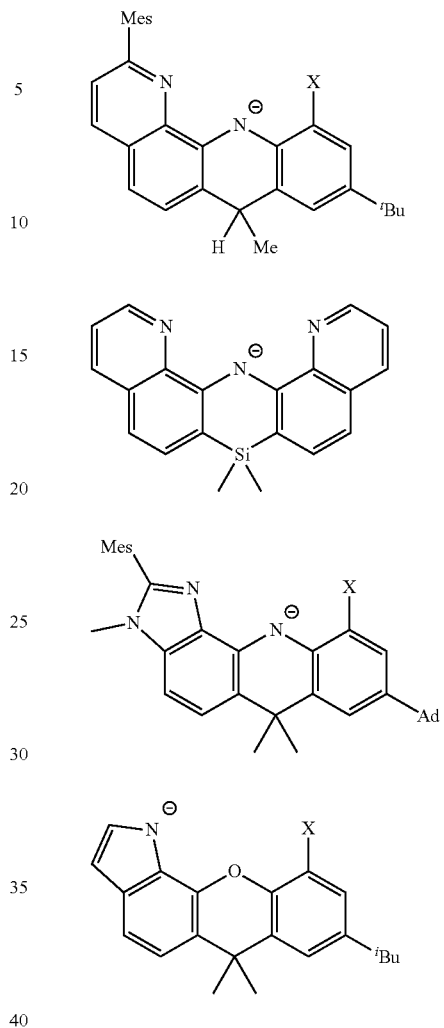
To further illustrate possible choices of X substituents in dianionic, monoanionic and neutral RL ligands, a non exclusive selection of RL ligands is as follows:
Dianionic Ligands
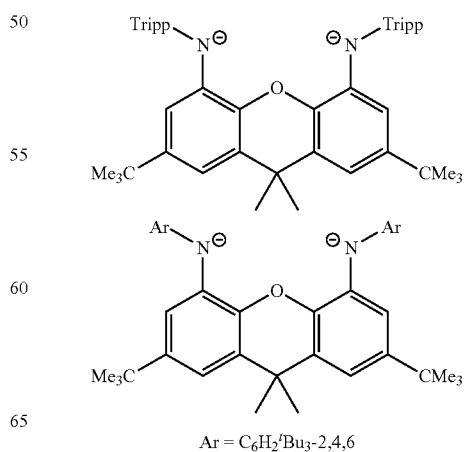
Ar = C₆H₂ᵗBu₃-2,4,6

-continued
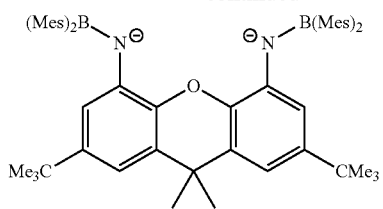
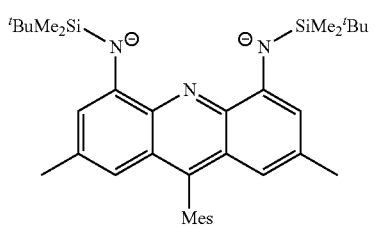
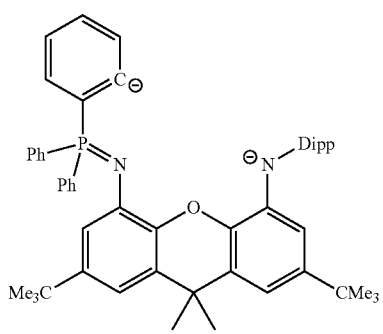
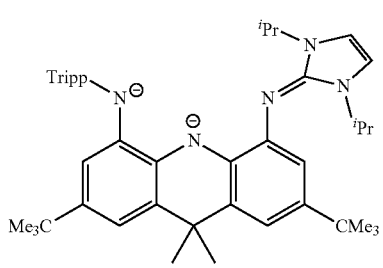
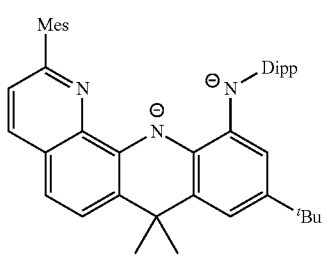
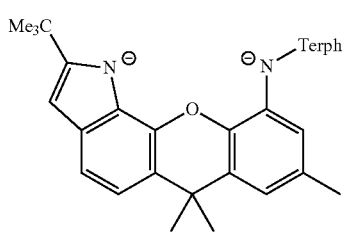
Monoanionic Ligands
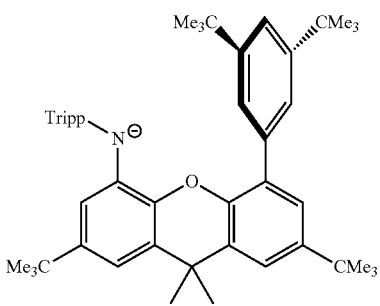
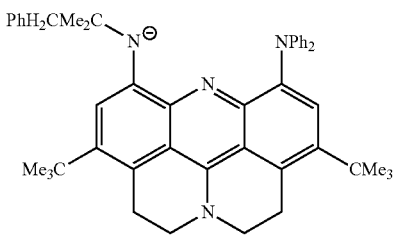
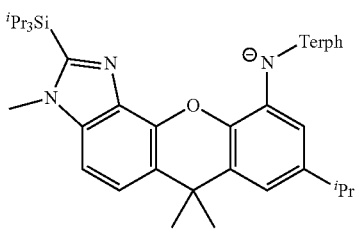
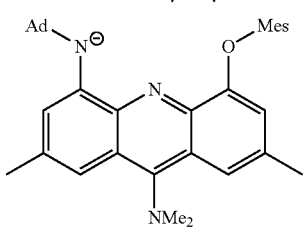
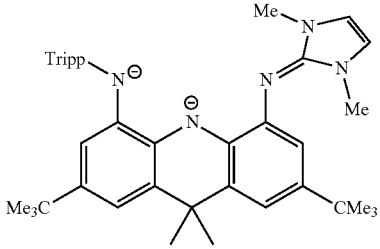
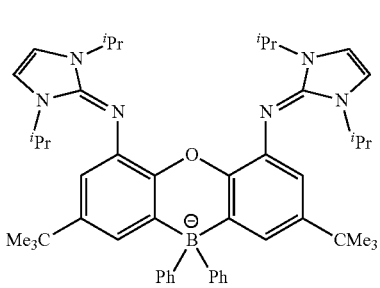

-continued

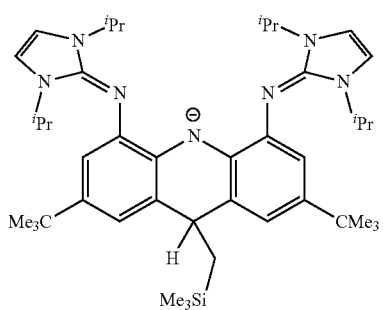

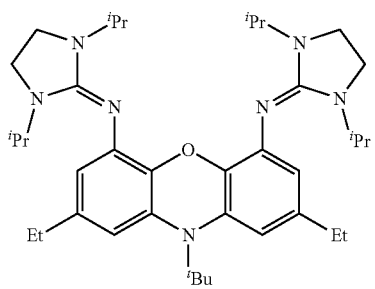

Neutral Ligands

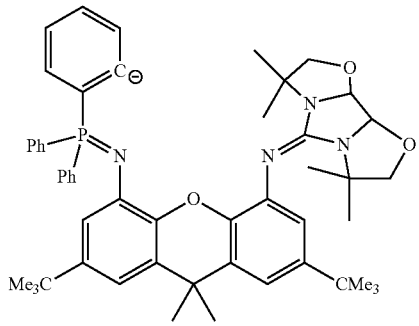

In some embodiments RL is selected from the structures below,

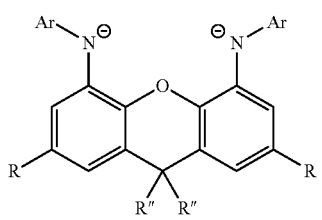

Ar = Mes, Xyl, Duryl, Dipp or Tripp, C₆H₃tBu-3,5, C₆H₃Mes₂-3,5, C₆H₃(C₆H₃tBu₂-3,5)₂-3,5 or C₆H₂tBu₃-2,4,6

R″ = Me, Et, $^{n}$Pr, $^{n}$Bu

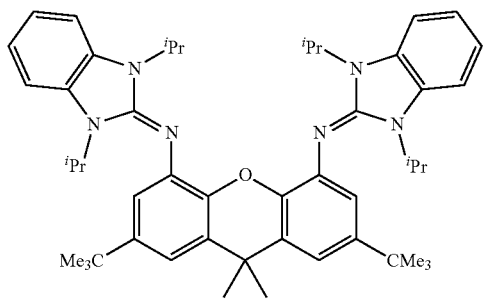

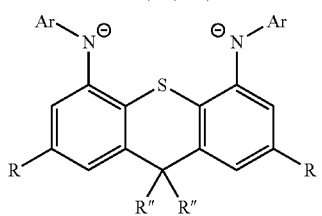

Ar = Mes, Xyl, Duryl, Dipp or Tripp, C₆H₃tBu-3,5, C₆H₃Mes₂-3,5, C₆H₃(C₆H₃tBu₂-3,5)₂-3,5 or C₆H₂tBu₃-2,4,6

R″ = Me, Et, $^{n}$Pr, $^{n}$Bu

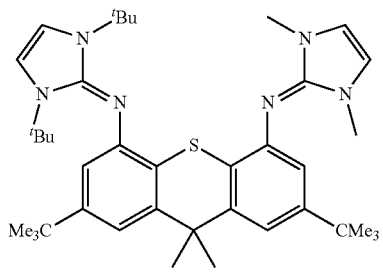

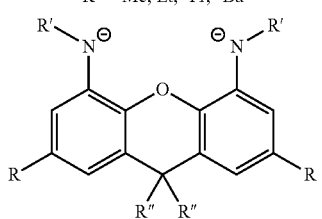

R′ = $^{t}$Bu, Ad, SiMe₃, SiEt₃, SiMe₂$^{t}$Bu, Si$^{i}$Pr₃

R″ = Me, Et, $^{n}$Pr, $^{n}$Bu

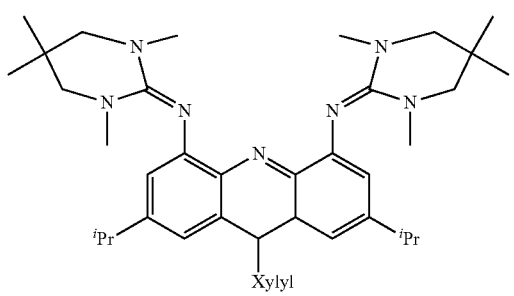

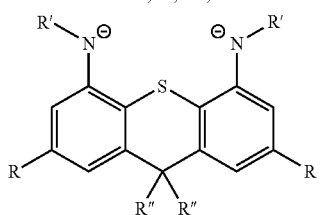

R′ = $^{t}$Bu, Ad, SiMe₃, SiEt₃, SiMe₂$^{t}$Bu, Si$^{i}$Pr₃

R″ = Me, Et, $^{n}$Pr, $^{n}$Bu

33

-continued

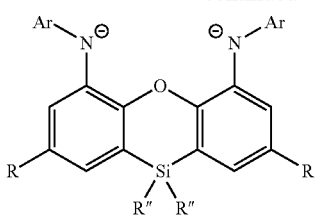

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$Bu$_3$-2,4,6

R″ = Me, Et, $^n$Pr, $^n$Bu, $^i$Pr or $^s$Bu

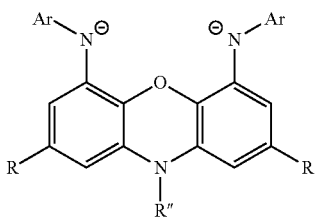

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$Bu$_3$-2,4,6

R″ = Me, CHMe$_2$, CHMeEt, tBu, Ad,
SiMe$_3$, SiEt$_3$, SiMe$^t$Bu, Si$^i$Pr$_3$, Ph

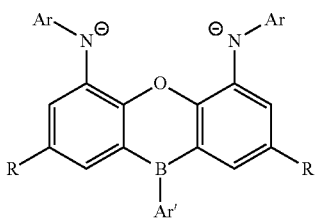

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$Bu$_3$-2,4,6

Ar′ = Mes, Xyl or Duryl, Dipp or
Tripp

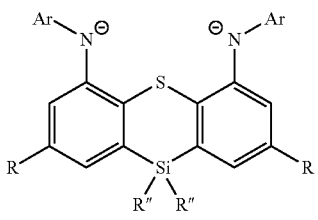

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$Bu$_3$-2,4,6

R″ = Me, Et, $^n$Pr, $^n$Bu, $^i$Pr or $^s$Bu

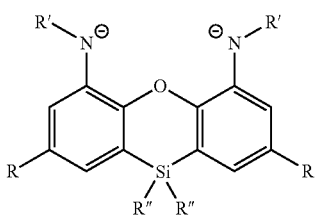

R′ = $^t$Bu, Ad, SiMe$_3$, SiEt$_3$,
SiMe$_2^t$Bu, Si$^i$Pr$_3$

R″ = Me, Et, $^n$Pr,
$^n$Bu, $^i$Pr or $^s$Bu

34

-continued

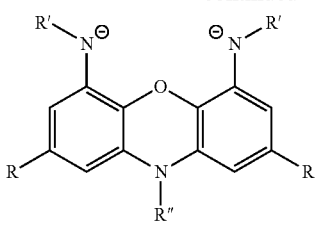

R′ = $^t$Bu, Ad, SiMe$_3$, SiEt$_3$,
SiMe$_2^t$Bu, Si$^i$Pr$_3$

R″ = Me, CHMe$_2$, CHMeEt, tBu, Ad,
SiMe$_3$, SiEt$_3$, SiMe$^t$Bu, Si$^i$Pr$_3$, Ph

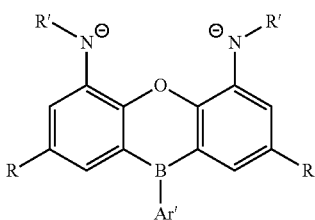

R′ = $^t$Bu, Ad, SiMe$_3$, SiEt$_3$,
SiMe$_2^t$Bu, Si$^i$Pr$_3$

Ar′ = Mes, Xyl or Duryl, Dipp or
Tripp

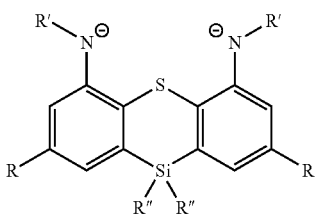

R′ = $^t$Bu, Ad, SiMe$_3$, SiEt$_3$,
SiMe$_2^t$Bu, Si$^i$Pr$_3$

R″ = Me, Et, $^n$Pr, $^n$Bu, $^i$Pr or $^s$Bu

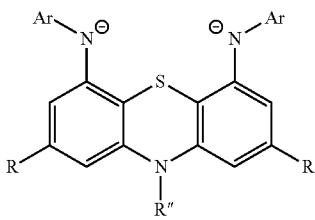

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$Bu$_3$-2,4,6

R″ = Me, CHMe$_2$, CHMeEt, tBu, Ad
SiMe$_3$, SiEt$_3$, $^t$Bu, Si$^i$Pr$_3$, Ph

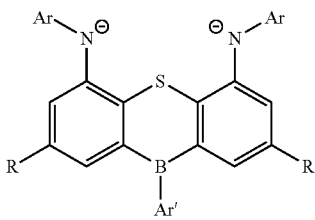

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$Bu$_3$-2,4,6

Ar′ = Mes, Xyl or Duryl, Dipp or
Tripp

35

-continued

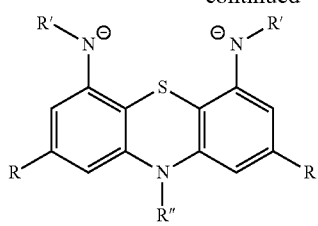

R' = ᵗBu, Ad, SiMe₃, SiEt₃,
SiMe₂ᵗBu, SiⁱPr₃

R'' = Me, CHMe, CHMeEt,
tBu, Ad, SiMe₃, SiEt₃,
SiMe₂ᵗBu, SiⁱPr₃, Ph

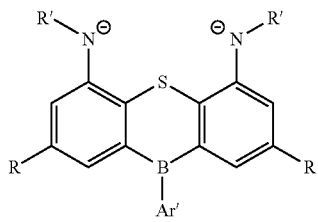

R' = ᵗBu, Ad, SiMe₃, SiEt₃,
SiMe₂ᵗBu, SiⁱPr₃

Ar' = Mes, Xyl or Duryl,
Dipp or Tripp

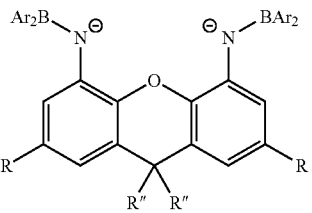

Ar = Mes, Xyl, Duryl, Dipp or Tripp

R'' = Me, Et, ⁿPr, ⁿBu

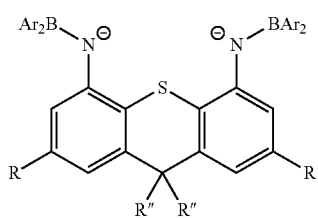

Ar = Mes, Xyl, Duryl, Dipp or Tripp

R'' = Me, Et, ⁿPr, ⁿBu

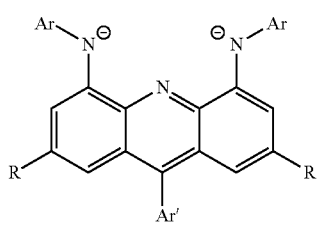

Ar = Mes, Xyl, Duryl, Dipp or Tripp,
C₆H₃tBu-3,5, or C₆H₂tBu₃-2,4,6

Ar' = Mes, Xyl or Duryl

36

-continued

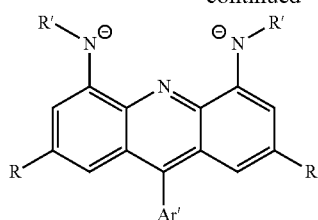

R' = ᵗBu, Ad, SiMe₃, SiEt₃,
SiMe₂ᵗBu, SiⁱPr₃

Ar' = Mes, Xyl or Duryl

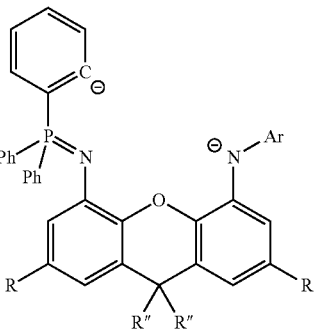

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

R'' = Me, Et, ⁿPr or ⁿBu

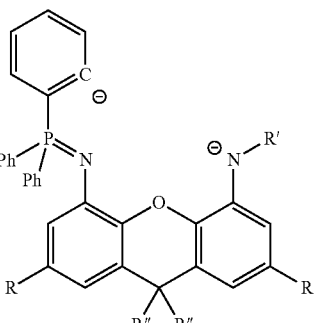

R' = ᵗBu, Ad, SiMe₃, SiEt₃,
SiMe₂ᵗBu, SiⁱPr₃, B(Mes)₂

R'' = Me, Et, ⁿPr or ⁿBu

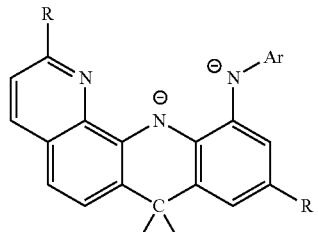

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

CR''X' = CMe₂, CEt₂, CHMe, CH(CH₂Ph)
CH(CH₂SiMe₃) or CH(CH₂CMe₃)

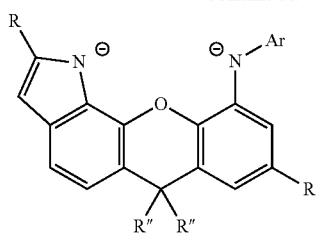

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

R″ = Me, Et, $^n$Pr or $^n$Bu

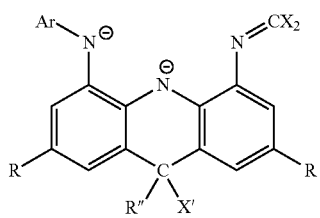

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

CR″X′ = CMe$_2$, CEt$_2$, CHMe, CH(CH$_2$Ph)
CH(CH$_2$SiMe$_3$) or CH(CH$_2$CMe$_3$)

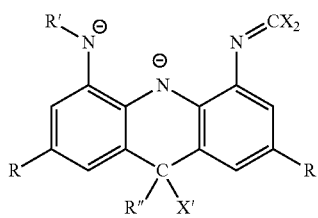

R′ = $^t$Bu, Ad, SiMe$_3$, SiEt$_3$,
SiMe$_2$$^t$Bu, Si$^i$Pr$_3$, B(Mes)$_2$

CR″X′ = CMe$_2$, CEt$_2$, CHMe,
CH(CH$_2$Ph) CH(CH$_2$SiMe$_3$)
or CH(CH$_2$CMe$_3$)

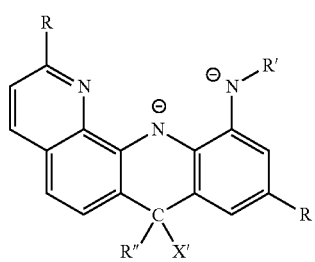

R′ = $^t$Bu, Ad, SiMe$_3$, SiEt$_3$,
SiMe$_2$$^t$Bu, Si$^i$Pr$_3$, B(Mes)$_2$

CR″X′ = CMe$_2$, CEt$_2$, CHMe, CH(CH$_2$Ph)
CH(CH$_2$SiMe$_3$) or CH(CH$_2$CMe$_3$)

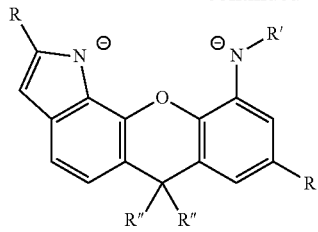

R′ = $^t$Bu, Ad, SiMe$_3$, SiEt$_3$,
SiMe$_2$$^t$Bu, Si$^i$Pr$_3$, B(Mes)$_2$

R″ = Me, Et, $^n$Pr or $^n$Bu

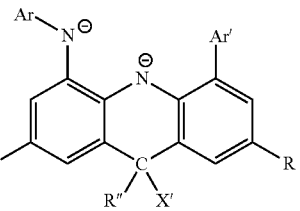

Ar′ = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

Ar = Ph, Mes, Xyl, Duryl,
C$_6$H$_3$tBu-3,5, or C$_6$H$_3$Mes$_2$-3,5,

CR″X′ = CMe$_2$, CEt$_2$, CHMe,
CH(CH$_2$Ph) CH(CH$_2$SiMe$_3$)
or CH(CH$_2$CMe$_3$)

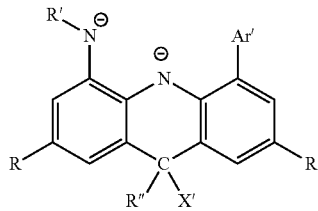

R′ = $^t$Bu, Ad, SiMe$_3$, SiEt$_3$,
SiMe$_2$$^t$Bu, Si$^i$Pr$_3$, B(Mes)$_2$

Ar = Ph, Mes, Xyl, Duryl,
C$_6$H$_3$tBu-3,5, or C$_6$H$_3$Mes$_2$-3,5,

CR″X′ = CMe$_2$, CEt$_2$, CHMe,
CH(CH$_2$Ph) CH(CH$_2$SiMe$_3$)
or CH(CH$_2$CMe$_3$)

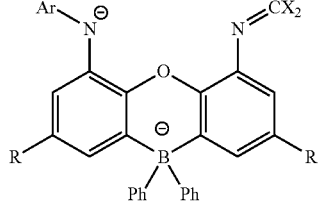

Ar′ = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

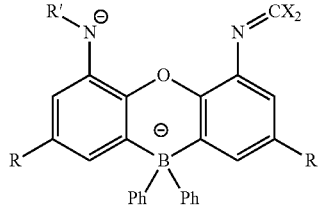

R′ = $^t$Bu, Ad, SiMe$_3$, SiEt$_3$,
SiMe$_2$$^t$Bu, Si$^i$Pr$_3$, B(Mes)$_2$

-continued

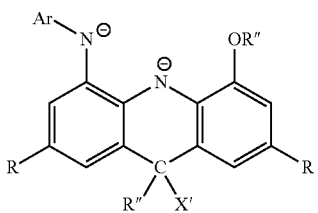

Ar = Mes, Xyl, Duryl, Dipp or Tripp, $C_6H_3tBu$-3,5, $C_6H_3Mes_2$-3,5, $C_6H_3(C_6H_3tBu_2$-3,5$)_2$-3,5 or $C_6H_2tBu_3$-2,4,6

OR″ = OPh, OMes, OXyl, O(Duryl), ODipp, OTrip, OCMe₃, OAd OSiMe₃, OSi$^i$Pr₃ or OSiMe₂$^t$Bu CR″X′ = CMe₂, CEt₂, CHMe, CH(CH₂Ph) CH(CH₂SiMe₃) or CH(CH₂CMe₃)

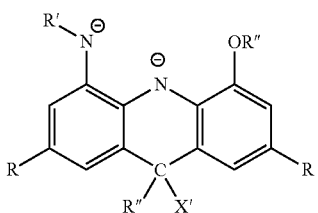

R′ = $^t$Bu, Ad, SiMe₃, SiEt₃, SiMe₂$^t$Bu, Si$^i$Pr₃, B(Mes)₂

OR″ = OPh, OMes, OXyl, O(Duryl), ODipp, OTrip, OCMe₃, OAd OSiMe₃, OSi$^i$Pr₃ or OSiMe₂$^t$Bu CR″X′ = CMe₂, CEt₂, CHMe, CH(CH₂Ph) CH(CH₂SiMe₃) or CH(CH₂CMe₃)

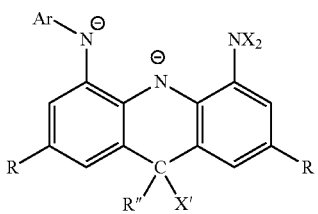

Ar′ = Mes, Xyl, Duryl, Dipp or Tripp, $C_6H_3tBu$-3,5, $C_6H_3Mes_2$-3,5, $C_6H_3(C_6H_3tBu_2$-3,5$)_2$-3,5 or $C_6H_2tBu_3$-2,4,6

NX₂ = NPh₂, N-Carbazolyl, NMePh, NMe₂ or N(SiMe₃)₂

CR″X′ = CMe₂, CEt₂, CHMe, CH(CH₂Ph) CH(CH₂SiMe₃) or CH(CH₂CMe₃)

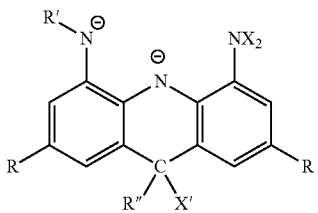

R′ = $^t$Bu, Ad, SiMe₃, SiEt₃, SiMe₂$^t$Bu, Si$^i$Pr₃, B(Mes)₂

NX₂ = NPh₂, N-Carbazolyl, NMePh, NMe₂ or N(SiMe₃)₂

CR″X′ = CMe₂, CEt₂, CHMe, CH(CH₂Ph) CH(CH₂SiMe₃) or CH(CH₂CMe₃)

-continued

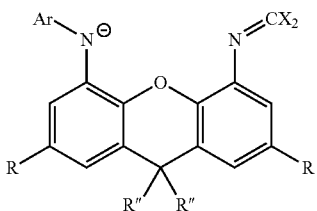

Ar = Mes, Xyl, Duryl, Dipp or Tripp, $C_6H_3tBu$-3,5, $C_6H_3Mes_2$-3,5, $C_6H_3(C_6H_3tBu_2$-3,5$)_2$-3,5 or $C_6H_2tBu_3$-2,4,6

R″ = Me, Et, $^n$Pr, $^n$Bu

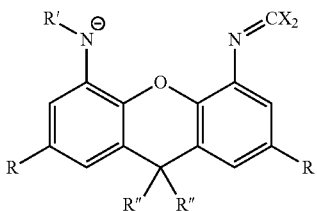

R′ = $^t$Bu, Ad, SiMe₃, SiEt₃, SiMe₂$^t$Bu, Si$^i$Pr₃, B(Mes)₂

R″ = Me, Et, $^n$Pr, $^n$Bu

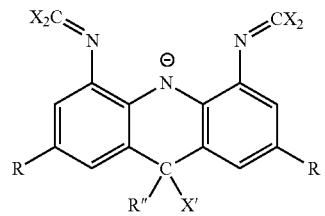

CR″X′ = CMe₂, CEt₂, CHMe, CH(CH₂Ph) CH(CH₂SiMe₃) or CH(CH₂CMe₃)

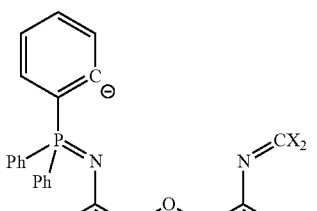

R″ = Me, Et, $^n$Pr, $^n$Bu

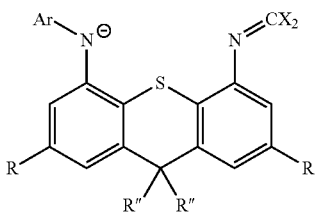

Ar = Mes, Xyl, Duryl, Dipp or Tripp, $C_6H_3tBu$-3,5, $C_6H_3Mes_2$-3,5, $C_6H_3(C_6H_3tBu_2$-3,5$)_2$-3,5 or $C_6H_2tBu_3$-2,4,6

R″ = Me, Et, $^n$Pr, $^n$Bu

-continued

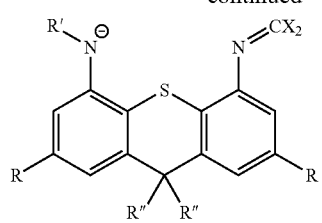

R' = ⁱBu, Ad, SiMe₃, SiEt₃, SiMe₂ᵗBu, Siⁱpr₃, B(Mes)₂
R'' = Me, Et, ⁿPr, ⁿBu

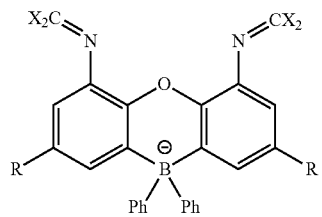

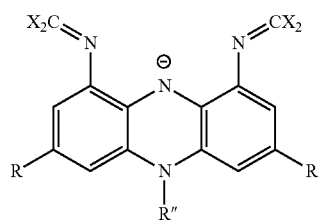

R'' = ᵗBu, Ad, SiMe₃, SiEt₃, SiMe₂ᵗBu, Siⁱpr₃, Ph, Mes, Xyl, Duryl

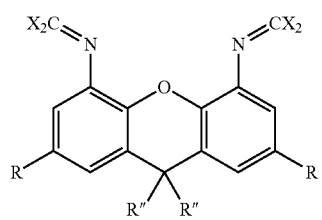

R'' = Me, Et, ⁿPr, ⁿBu

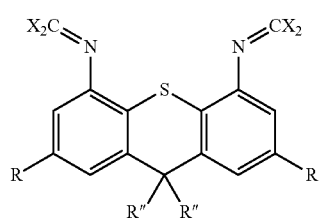

R'' = Me, Et, ⁿPr, ⁿBu

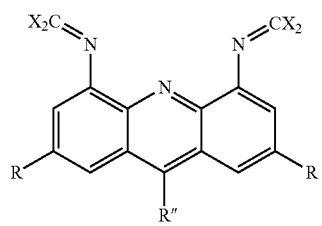

R'' = Mes, Xyl, Duryl, Terph, CMe₃, Ad, SiMe₃, SiMeᵗBu, Siⁱpr₃ or NMe₂

-continued

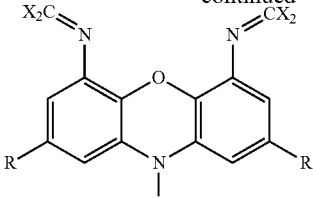

R'' = ᵗBu, Ad, SiMe₃, SiEt₃, SiMe₂ᵗBu, Siⁱpr₃, Ph, Mes, Xyl, Duryl wherein R is independently selected from H, Me, CHMe₂, CHMeEt, CMe₃, 1-adamantyl, or SiMe₃; and N=CX₂ is as defined below:

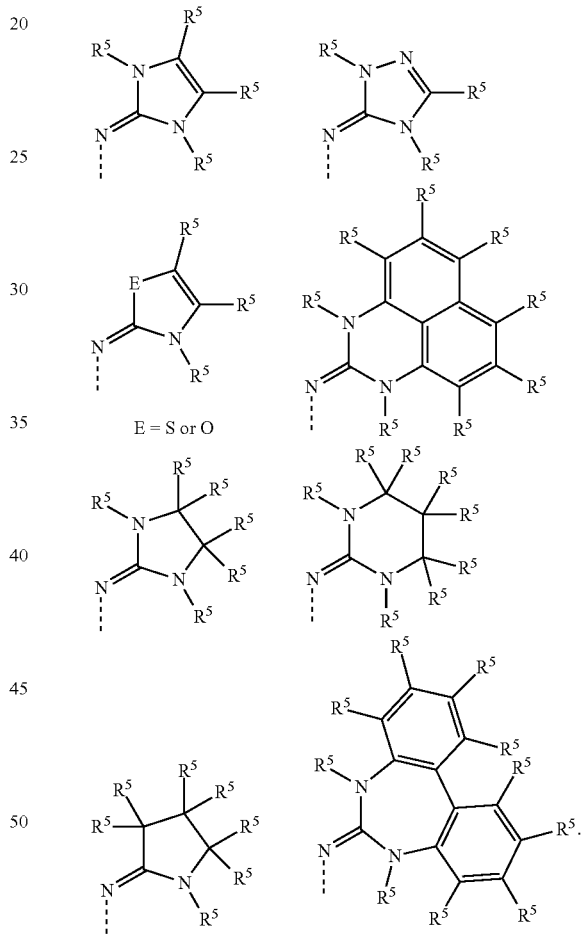

E = S or O

In some embodiments, the N=CX₂ group is as shown below:

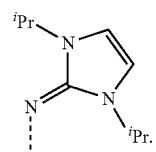

The ligands in this application are based on a rigid tricyclic backbone (with or without additional fused rings) with donor atoms/groups or aryl rings attached directly to both of the bondable carbon atoms adjacent to at least one of the donor atoms within the central ring. While not wishing to be limited by theory, this design endows the RL ligands of this application with high rigidity (although the tricyclic ligand backbone is not necessarily planar), which maximizes the effectiveness of steric bulk in the ligand, thereby providing a mechanism to exert greater control over (a) interactions between the catalyst component(s) and each other, activators, scavengers, anions, substrates and solvents, (b) polymerization reactivity, selectivity and regiochemistry, and (c) thermal stability. Furthermore, the tightly controlled metal binding environment provided by the RL ligands of this application positions coordinated metals in close proximity to the central donor of the tricyclic backbone (E or N) and the donor atoms of both X groups, regardless of the nature of the donor atoms involved, yielding catalyst components featuring unusual or unique metal binding environments.

Furthermore, ligand rigidity is known in many cases to be beneficial for providing highly enantioselective and regioselective catalysts; see for example: (a) W. Tang, X. Zhang, New Chiral Phosphorus Ligands for Enantioselective Hydrogenation, Chem. Rev., 2003, 103, 3029-3069. (b) W. Zhang, Y. Chi, X. Zhang, Developing Chiral Ligands for Asymmetric Hydrogenation, Acc. Chem. Res., 2007, 40, 1278-1290, (c) Y. Zhang, Y. Ning, L. Caporaso, L. Cavallo, E. Y.-X. Chen, Catalyst-Site-Controlled Coordination Polymerization of Polar Vinyl Monomers to Highly Syndiotactic Polymers, J. Am. Chem. Soc., 2010, 132, 2695-2709, (d) G.-J. M. Meppelder, H.-T. Fan, T. P. Spaniol, J. Okuda, Group 4 Metal Complexes Supported by [ONNO]-Type Bis(o-aminophenolato) Ligands: Synthesis, Structure, and α-Olefin Polymerization Activity, Organometallics, 2009, 28, 5159-5165, and (e) R. J. Long, V. C. Gibson, A. J. P. White, Group 4 Metal Olefin Polymerization Catalysts Stabilized by Bidentate O, P Ligands, Organometallics, 2008, 27, 235-245, and references therein.

While not wishing to be limited by theory, the rigidity of the RL ligands of this application stems from their ability (a) to prevent dissociation of one side arm of the rigid non-cyclopentadienyl ligand (an X group), (b) to more inflexibly position the steric bulk of the X-group substituents around the metal binding pocket, relative to analogues without a tricyclic backbone, (c) to limit the range of accessible X-M-X bite angles, and (d) to favor meridional versus facial binding of the ligand to group 4 transition metals [i.e. to favor the formation of complexes in which the metal and the donor groups of the rigid non-cyclopentadienyl ligand (the X groups and E or N) lie approximately in a plane, regardless of whether the ligand backbone is approximately planar]. The RL ligands of this application are considered to be rigid, regardless of whether the backbone adopts a planar or a bent conformation; the former is common in xanthene-based ligands, while the latter is common in thioxanthene complexes. The RL ligands of this application are also considered to be rigid, regardless of whether both planar and bent conformations of the ligand backbone are accessible in solution.

V. Activatable Ligand (L)

In this application, "activatable ligands" are not cyclopentadienyl ligands. Exemplary activatable ligands are selected independently from the group: (a) a hydrogen radical, (b) a halogen radical or a hydrocarbylsulfonate (e.g. triflate or tosylate) radical, (c) a hydrocarbyl radical, (d) an alkoxy, aryloxy, siloxy radical, and (e) an ester enolate radical {e.g. O($^i$PrO)C=CMe$_2$}. For activation with a cocatalyst, suitable activatable ligands are selected from Cl, Br, methyl, neopentyl, neophyl (CH$_2$CMe$_2$Ph), benzyl, 1-norbornyl, allyl, 2-methylallyl, 1-methylallyl, 1-trimethylsilylallyl, vinyl, 2,2-dimethylvinyl, phenyl, trimethylsilylmethyl, phenyldimethylsilylmethyl, and bis(trimethylsilyl) methyl.

In some embodiments the activatable ligands are selected from fluoro, chloro, bromo, iodo, alkyl, aryl, allyl and hydride ligands. In some embodiments, the activatable ligands are selected from chloro, alkyl, aryl, allyl and hydride ligands.

The number of activatable ligands will be two or more if the complex is neutral or anionic, or one or more if the complex is monocationic or dicationic. The number of activatable ligands will depend on the charge on the RL ligand, the oxidation state of the metal centre, and the overall charge on the catalyst component as would be known to a person skilled in the art.

In some embodiments, catalyst components will contain one RL ligand and 2 or 3 activatable ligands. The most preferred catalyst components will be neutral, containing one RL ligand, zero additional Q ligands, and two or three monoanionic activatable ligands. Catalyst components with these attributes are most ideally achieved when: (a) the RL ligand is monoanionic or dianionic and the metal is in the tetravalent (4+) oxidation state, or (b) the RL ligand is neutral or monoanionic and the metal is in the trivalent (3+) oxidation state.

VI. Additional Ligand (Q)

The "additional ligand" (Q) is a neutral ligand with an even number of electrons that is neither the primary ancillary ligand (the rigid non-cyclopentadienyl ligand) or an "activatable ligand". Exemplary Q ligands are selected independently from the non-limiting group: arenes, alkenes, dienes, allenes, internal alkynes, ethers (e.g. OEt$_2$, OMe$^t$Bu, 1,2-dimethoxyethane, THF or 1,4-dioxane), tertiary amines (e.g. NMe$_3$, NEt$_3$ or Me$_2$NPh), pyridines, N-heterocyclic carbenes, tertiary phosphines (e.g. PMe$_3$), thioethers (e.g. SMe$_2$), phosphine oxides, phosphine sulfides, ylides (e.g. CH$_2$PMe$_3$), nitriles, isonitriles, bulky ketones, imines, phosphinimines, imidazoles, or oxazoles. The number of Q ligands on the metal will equal z, where z=0, 1 or 2. In some embodiments z is 0 or 1. In some embodiments, z is zero for neutral catalyst components.

VII. Description of Activators (or "Cocatalysts")

The catalyst components described above may be used in isolation or in combination with one or more activator (also known as a "cocatalyst") in order to form an active catalyst system. For well-defined molecular activators (i.e. not aluminoxanes—see below), one or two equivalents of an activator are typically employed in order to convert a neutral or monoanionic catalyst component to a monocationic or dicationic catalyst species.

In some embodiments, the activators fall into five categories: (a) aluminoxanes, (b) neutral Lewis acids, (c) ionic activators capable of acting as a Bronstead acid, (d) ionic activators containing a Lewis acidic cation, and (e) oxidizing agents. Each of these classes of activator would be well known to a person skilled in the art of polymerization catalysis. In each case, the primary role of the activator is to abstract at least one activatable ligand, yielding a cationic catalyst paired with a weakly coordinating anion (i.e. an anion which does not bind strongly to the cationic catalyst centre, thereby allowing a polymerizable olefin to enter the active site of the catalyst). Aluminoxanes are also capable of exchanging an activatable halogen or hydrocarbylsulfonate for an activatable hydrocarbyl group, so are the most effective class of activator when used in conjunction with catalyst components containing only halogen or hydrocarbylsulfonate ligands.

In some embodiments, when aluminoxanes are used as activators for olefin polymerization catalysts the alumonoxane:catalyst component ratio is between 20:1 and 1000:1. In some embodiments, the alumonixane is methylalumoxane (or "MAO"), which may or may not contain trimethylaluminum.

Well-defined neutral Lewis acid activators are typically of the form $B(C_6R_5)_3$ or $Al(C_6R_5)_3$, where each R group is independently selected from: (a) a hydrogen atom, (b) a halogen atom, (c) a hydrocarbyl radical (alkyl or aryl), (d) a silyl radical, (e) an alkoxy radical, and (f) an aryloxy radical. In some embodiments, the Lewis acid activators are selected from triphenylborane, tris(pentafluorophenyl)borane, tris(perfluoronaphthyl)borane, tris(pentafluorophenyl)alane (with or without associated arene solvent), and tris{para-(trialkylsilyl)tetrafluorophenyl}boranes. For polymerization of substituted or unsubstituted hydrocarbylacrylates, Lewis base adducts of these activators {e.g. $(Et_2O)B(C_6F_5)_3$} may also be suitable.

Exemplary Bronstead acid activators are $[HNR_3][A]$, $[HPR_3][A]$ or $[H(OR_2)_n][A]$ salts wherein R is a $C_{1-20}$ hydrocarbyl group, and A is a tetraarylborate, carborane cluster or borane cluster. In some embodiments, the activators within this group are selected from $[HNMe_2Ph][BPh_4]$, $[HNMe_2Ph][B(C_6F_5)_4]$, $[HN(C_{16}H_{33})_3][B(C_6F_5)_4]$, $[HPPh_3][B(C_6F_5)_4]$, $[H(OEt_2)_2][B(C_6F_5)_4]$, $[H(OEt_2)_2][B(C_6H_3(CF_3)_2-3,5)_4]$, and $[H(OEt_2)_2][CB_{11}RX_{11}]$ (R=H, Me or Et; X=Cl or Br).

Exemplary ionic activators containing a Lewis acidic cation are $[C(C_5R_5)_3][A]$, $[SiR_3][A]$ and [tropylium][A] salts wherein R is selected independently from: (a) a hydrogen atom, (b) a halogen atom, (c) a hydrocarbyl radical, and (d) a silyl radical, and A is a tetraarylborate, carborane cluster or borane cluster. In some embodiments, activators within this group are selected from $[CPh_3][BPh_4]$, $[CPh_3][B(C_6F_5)_4]$, $[CPh_3][B\{C_6H_3(CF_3)_2-3,5\}_4]$, $[CPh_3][B(C_6F_4(Si^iPr_3)-para)_4]$, $[SiEt_3][B(C_6F_5)_4]$, [tropylium]$[B(C_6F_5)_4]$, $[CPh_3][CB_{11}R_5R'X_6]$ (R and R'=H, Me or Et; X=F, Cl or Br), $[CPh_3][CB_{11}RX_{11}]$ (R=H, Me or Et; X=F, Cl or Br), and $[CPh_3]_2[B_{12}X_{12}]$ (X=F, Cl or Br).

Exemplary oxidizing activators are $[Ag(L)_n][A]$, [Fe$(C_5R_5)_2$][A] and $[C_6R_5(N_2)][A]$ salts wherein A is a tetraarylborate, carborane cluster or borane cluster; R is selected independently from: (a) a hydrogen atom, (b) a halogen atom, (c) a hydrocarbyl radical, (d) a silyl radical, and (e) a boryl radical; L is a hydrocarbon ligand (e.g. benzene or ethylene); n is an integer between 0 and 4. In some embodiments, activators within this group are selected from $[FeCp_2][BPh_4]$, $[FeCp_2][B(C_6F_5)_4]$, $[N_2Ph][B(C_6F_5)_4]$, $[N_2C_6H_4F$-para$][B(C_6F_5)_4]$, $[Ag(C_2H_4)_3][B(C_6F_5)_4]$, $[Ag(\eta^2-C_6H_6)_3][B(C_6F_5)_4]$, $Ag[CB_{11}R_5R'X_6]$ (R and R'=H, Me or Et; X=F, Cl or Br), $Ag[CB_{11}RX_{11}]$ (R=H, Me or Et; X=F, Cl or Br), and $Ag_2[B_{12}X_{12}]$ (X=F, Cl or Br).

For catalyst components containing a mixture of alkyl groups and halide or hydrocarbylsulfonate groups on the metal, the following activators may also be employed: lithium, sodium, potassium, rubidium, cesium, thallium, silver, magnesium or calcium cations paired with a weakly-coordinating or non-coordinating anion such as a tetraarylborate, carborane cluster or borane cluster. Examples are $Na[B(C_6F_5)_4]$, $K[B(C_6F_5)_4]$, $Tl[B(C_6F_5)_4]$ and $Mg[B\{C_6H_3(CF_3)_2-3,5\}_4]_2$, $Na[CB_{11}R_5R'X_6]$ (R and R'=H, Me or Et; X=F, Cl or Br), $Na[CB_{11}RX_{11}]$ (R=H, Me or Et; X=F, Cl or Br), $Na_2[B_{12}X_{12}]$ (X=F, Cl or Br), and $Mg[B_{12}X_{12}]$ (X=F, Cl or Br).

VIII. Homogeneous or Heterogeneous Catalyst

The catalyst system of this application may be used in homogeneous or heterogeneous form. Heterogeneous catalysts may be prepared by any number of methods, including: (a) precipitation of the catalyst from a non-polar solvent upon addition of activator to the catalyst component, (b) addition of an aluminoxane activator to a solution of the catalyst component, followed by evaporation of the solution to dryness, (c) deposition of the catalyst on a high surface area support, for example metal oxide or metal halide particles, (d) spray drying of a mixture containing the catalyst, with or without excess activator or scavenger, and very small particles of a filler material.

In all cases, heterogeneous catalyst preparation should be conducted so as to avoid reactor instability and/or fouling. Non-limiting examples of solid support or filler materials are silica, alumina, silica-alumina, silica-titania, magnesia, inorganic oxides such as titania and zirconia, montmorillonite and similar clays, zeolites, talc, hydrotalcite, inorganic chlorides such as magnesium chloride, and resinous support materials such as polystyrene, polyolefin or other organic support materials. The support material may be pretreated by any number of methods. For example, inorganic oxides may be calcined, chemically treated with dehydroxylating agents such as aluminum alkyls and the like, or both.

IX. Polymerization Process

The catalysts of this application are suitable for use in any conventional olefin polymerization process, such as the so-called gas phase, slurry, low pressure, medium pressure, high pressure, or solution polymerisation processes. In some embodiments a homogeneous catalyst is used in a solution process, while a heterogeneous catalyst is used for slurry or gas phase (e.g. fluidized bed in non-condensed or condensed mode) polymerization processes.

The present application may be used to prepare homopolymers, copolymers and terpolymers. Monomers include: (a) ethylene, (b) alpha-olefins such as propylene, 1-butene, 1-hexene, 1-octene, 1-decene, 3-methyl-1-butene, and vinylcyclohexane, (c) aromatic-ring containing monomers such as styrene, alpha-methyl-styrene, para-alkyl-styrenes, vinylnaphthalene, stilbene, allylbenzene, indene and 4-phenyl-1-butene, (d) cyclic olefin monomers such as norbornene, cyclopentene, methylcyclopentene and cyclohexene, (e) di- or tri-substituted acyclic alkenes such as isobutylene, 2-butene, 3-hexene, and 2-methyl-2-butene, (f) dienes such as butadiene, low molecular weight polybutadienes (MW<1000 g mol$^{-1}$), isoprene, 2,3-dimethylbutadiene, 1,4-hexadiene, 1,5-hexadiene, 1,7-octadiene, 1,9-decadiene, cyclopentadiene, cyclohexadiene, dicyclopentadiene, 5-methylene-2-norbornene, 5-ethylidene-2-norbornene, 5-vinyl-2-norbornene, norbornadiene, substituted norbornadienes, and divinylbenzenes, and (g) substituted or unsubstituted hydrocarbylacrylates such as methylmethacrylate, methylacrylate, ethylmethacrylate, phenylacrylate, and phenylmethacrylate.

In some embodiments, the polymerization process of this application comprises the use of the novel catalysts in a low, medium or high pressure process with an operating temperature from 20° C. to 300° C. In some embodiments, temperatures are in the 100 to 250° C. range for solution polymerization reactions forming polymer with high ethylene or alpha-olefin content. While solution polymerizations may be operated at low, medium or high pressure (typically between 1 and 3500 bar), it is an embodiment that gas phase and slurry polymerization reactions are operated at low pressure (typically between 1 and 50 bar).

Slurry and solution polymerization reactions are carried out in a diluent or solvent which may contain a significant amount of liquid monomer. Aliphatic hydrocarbon solvents such as hexane are suitable, and aromatic hydrocarbon solvents such as toluene or xylenes may be suitable, depending on the catalyst, reaction pressure, concentration of monomers, and temperature. Halocarbon solvents such as bromobenzene, chlorobenzene, fluorobenzene, 1,2-dichlorobenzene, 1,2-difluorobenzene, α,α,α-trifluoromethylbenzene, dichloromethane or 1,2-dichloroethane may also be suitable. The non-coordinating solvent hexamethyldisiloxane may also be suitable. Combinations of solvents are acceptable.

In some embodiments, the polymerization processes comprise the use of an inert condensable fluid in fluidized bed gas phase polymerization reactions (referred to as condensed mode operation). Alkanes such as butane, pentanes or hexanes are common, and in some embodiments, the amount of such condensed fluid does not exceed about 20 weight percent of the gas phase.

Hydrogen or a hydrosilane may be used in the polymerization process to reduce the molecular weight of the polymer. A scavenger (e.g. a trialkylaluminum, dialkylchloroaluminum, trialkylboron, dialkylzinc, or dialkylmagnesium compound) may also be added to the reaction mixture as a means to remove polar impurities that are typically introduced in the solvent or monomer. In some cases, the scavenger can also act as a chain transfer (or "shuttling") agent as described in: D. J. Arriola, E. M. Carnahan, P. D. Hustad, R. L. Kuhlman, T. T. Wenzel, Catalytic production of olefin block copolymers via chain shuttling polymerization, Science, 2006, 312, 714-719.

Two or more catalysts or catalyst components may be used in a single reactor or series of reactors, or placed on the same support. At least one of the catalysts or catalyst components will be from this application. The other catalyst(s) or catalyst component(s) may or may not be from the same family as the application catalyst. This approach can yield polymer blends. Alternatively, one catalyst may produce oligomers, macromers or polymers with olefinic end groups, and the second catalyst may incorporate these oligomers, macromers or polymers into a polymer backbone, forming a copolymer, or alternatively a terpolymer if an additional monomer such as propylene, 1-butene, 1-hexene or 1-octene, styrene or isoprene is present. Note that in the presence of a chain transfer (or "shuttling") agent, two or more polymerization or oligomerization catalysts may also yield polymer chains of unique composition (a composition that differs from the compositions attainable using the individual catalysts or catalyst components in the absence of each other), without the requirement for production of oligomers, macromers or polymers containing olefinic end groups.

The following non-limiting examples are illustrative of the present application:

EXAMPLES

For clarity, the Examples have been divided into five sections. Part A (RL Ligand Synthesis), Part B (Transition Metal and Rare Earth Complex Synthesis), Part C (Cationic Alkyl Complex Synthesis), and Part D (Polymerization).

The following abbreviations are used in the Examples:
Ac=acyl=COMe
Acridan=9,10-dihydroacridine
Ad=1-adamantyl
Ar=aryl
app t=apparent triplet
$^n$Bu=n-butyl
$^s$Bu=sec-butyl (CHMeEt)
$^t$Bu=tert-butyl
$CH^1$=equivalent protons in the 1- and 8-positions of the xanthene backbone
$CH^3$=equivalent protons in the 3- and 6-positions of the xanthene backbone
d=doublet
dme=1,2-dimethoxyethane
δ=chemical shift in parts per million
Dipp=2,6-diisopropylphenyl
DPEPhos=bis{2-(diphenylphosphino)phenyl}ether
Duryl=2,3,5,6-tetramethylphenyl
g=grams
$^1$H NMR=proton nuclear magnetic resonance
Hz=hertz
$^1$Pr=isopropyl
$^n$Pr=n-propyl
J=symbol for coupling constant
$^nJ_{X,Y}$=n bond coupling constant between X and Y
m=multiplet
Me=methyl
Mes=mesityl=2,4,6-trimethylphenyl
MHz=megahertz
Mmol=millimoles
mL=millilitres
Mol=moles
ppm=parts per million
s=singlet
sept=septet
t=triplet
Tripp=2,4,6-triisopropylphenyl
Terph=terphenyl=$C_6H_3Ph_2$-2,6
RuPhos=2-Dicyclohexylphosphino-2',6'-diisopropoxybiphenyl
RuPhos Pd G4=[(RuPhos)Pd(OMs)($\kappa^2$-$C_6H_4$$\{C_6H_4$(NHMe)-o$\}$-o)]
$XA_2$=4,5-bis(2,6-diisopropylanilido)-2,7-di-tert-butyl-9,9-dimethylxanthene dianion
$XN_2$=4,5-bis(2,4,6-triisopropylanilido)-2,7-di-tert-butyl-9,9-dimethylxanthene dianion
$TXA_2$=4,5-bis(2,6-diisopropylanilido)-2,7-di-tert-butyl-9,9-dimethylthioxanthene dianion
XAT=4,5-bis(2,6-dimesitylanilido)-2,7-di-tert-butyl-9,9-dimethylxanthene dianion
XAd=4,5-bis(1-adamantylamido)-2,7-di-tert-butyl-9,9-dimethylxanthene dianion
$XP_2$=4,5-bis(2,4,6-triisopropylphosphido)-2,7-di-tert-butyl-9,9-dimethylxanthene dianion
$AIm_2$=4,5-bis{(diphenylmethylene)amino}-2,7,9,9-tetramethylacridanide monoanion XII$_2$=4,5-bis(1,3-diisopropylimidazolin-2-imino))-2,7-di-tert-butyl-9,9-dimethylxanthene AII$_2$=4,5-bis(1,3-diisopropylimidazolin-2-imino))-2,7,9,9-tetramethylacridanide monoanion Part A. RL Ligand Synthesis A.1 Protio Ligands and Alkali Metal Salts The synthesis and characterization of (a) H$_2$[XA$_2$] (4,5-bis(2,6-diisopropylanilido)-2,7-di-tert-butyl-9,9-dimethylxanthene), K$_2$(dme)$_x$[XA$_2$] and Na$_2$[XA$_2$], (b) H$_2$[XN$_2$] (4,5-bis(2,4,6-triisopropylanilido)-2,7-di-tert-butyl-9,9-dimethylxanthene) and K$_2$(dme)$_x$[XN$_2$], (c) H$_2$[XP$_2$] (4,5-bis(2,6-diisopropylphenylphosphido)-2,7-di-tert-butyl-9,9-dimethylxanthene), K$_2$(dme)$_x$[XP$_2$] and {K(THF)}$_4$[XP$_2$]$_2$, (d) H$_2$[TXA$_2$] (4,5-bis(2,6-diisopropylanilido)-2,7-di-tert-butyl-9,9-dimethylthioxanthene) and Li$_2$(dme)$_2$[TXA$_2$], (e) H[AIm$_2$] (4,5-bis{(diphenylmethylene)amino}-2,7,9,9-tetramethylacridan) and Li[AIm$_2$], (f) H$_2$[XAT] (4,5-bis(2,6-dimesitylanilido)-2,7-di-tert-butyl-9,9-dimethylxanthene) and K$_2$(hydrocarbon)[XAT], and (g) H$_2$[XAd] (4,5-bis(1-adamantylamido)-2,7-di-tert-butyl-9,9-dimethylxanthene) have been reported in the following publications: (a) C. A. Cruz and D. J. H. Emslie et al., *Organometallics*, 2007, 26, 692-701; (b) K. S. A. Motolko and D. J. H. Emslie et al., *Organometallics*, 2017, 1601-1608 and K. S. A. Motolko and D. J. H. Emslie et al., *RSC Adv.*, 2017, 7, 27938-27945; (c) K. S. A. Motolko and D. J. H. Emslie et al., *Eur. J. Inorg. Chem.*, 2017, 2920-2927; (d) B. Vidjayacoumar and D. J. H. Emslie et al., *Dalton Trans.*, 2012, 41, 8175-8189; (e) E. W. Y. Wong and D. J. H. Emslie, *Dalton Trans.*, 2015, 44, 11601-11612; (f) N. R. Andreychuk, D. J. H. Emslie, *Angew. Chem. Int. Ed.*, 2013, 52, 1696-1699; (g) N. R. Andreychuk, T. Dickie, D. J. H. Emslie, H. A. Jenkins, *Dalton Trans.*, 2018, 47, 4866-4876.

A.2. Synthesis of the Neutral 4,5-bis(1,3-diisopropylimidazolin-2-imino))-2,7-di-tert-butyl-9,9-dimethylxanthene (XII$_2$) Ligand The catalyst mixture of Pd(OAc)$_2$ (23.3 mg, 0.104 mmmol), DPEPhos (17.9 mg, 0.167 mmol), potassium tert-butoxide (280 mg, 2.49 mmol) along with solid 4,5-dibromo-2,7-di-tert-butyl-9,9-dimethylxanthene (500 mg; 1.04 mmol) were dissolved in approximately 10 mL of toluene and stirred at room temperature for 30 minutes in the glovebox. 1,3-Diisopropyl-2-iminoimidazoline was dissolved in approximately 10 mL of toluene in the glovebox and added to the reaction mixture. The reaction mixture was placed in a sealed 50 mL flask and heated to 95° C. in an oil bath outside the glovebox for 48 h. Volatiles were removed under reduced pressure yielding a brown oil. The product was extracted using approximately 30 mL of CH$_2$Cl$_2$, and was washed with 60 mL of water. The aqueous layer was additionally extracted with 30 mL of DCM and the organic layers were combined. The organic layer was dried with MgSO$_4$ and gravity filtered. Volatiles were removed from the filtrate under reduced pressure yielding a dark brown oil. The brown oil was dissolved in approximately 60 mL of hexane and was passed through a pad of Celite yielding a dark orange filtrate. The filtrate was concentrated to approximately 5 mL and was allowed to re-crystallize at −10° C. overnight. XII was obtained as an off white powder, which was dried for 12 h at 80° C. under reduced pressure. Yield: 157 mg, 23%. $^1$H NMR (C$_6$D$_6$, 600 MHz, 298K): δ 7.13 (s, 2H, CH$^{1,8}$), 7.13 (d, 2H, CH$^{3,6}$), 5.92 (s, 4H, N—CH), 4.45 (sept, $^3J_{H,H}$ 6.0 Hz, 4H, CHMe$_2$), 1.82 (s, 6H, CMe$_2$), 1.38 (s, 18H, CMe$_3$), 1.00 (d, $^3J_{H,H}$ 6.0 Hz, 24H, CHMe$_2$).

A.3. Synthesis of the Protonated 4,5-bis(1,3-diisopropylimidazolin-2-imino))-2,7-di-tert-butyl-9,9-dimethylxanthene Ligand, [HXII$_2$][B(C$_6$F$_5$)$_4$]

Solid XII$_2$ ligand (76.3 mg, 0.116 mmol) was mixed with [H(OEt$_2$)$_2$][B(C$_6$F$_5$)$_4$] (96.7 mg, 0.116 mmol) in approximately 10 mL of C$_6$H$_5$F in a 25 mL round bottom flask for 30 minutes. Volatiles were removed under reduced pressure to yield a brownish orange solid. Yield: 142.3, 92.3%. $^1$H NMR (d$^8$-THF, 600 MHz, 298K): δ 7.18 (br s, 2H, CH$^{1,8}$), 7.06 (br s, 4H, N—CH), 6.47 (br s, 2H, CH$^{3,6}$), 4.66 (br s, 1H, N—H), 4.45 (br s, 4H, CHMe$_2$), 1.66 (br s, 6H, CMe$_2$), 1.31 (br s, 24H, CHMe$_2$), 1.27 (br s, 18H, CMe$_3$). Related [HXII$_2$][B{C$_6$H$_3$(CF$_3$)$_2$-3,5}$_4$] (with an identical $^1$H NMR spectrum for the HXII2 cation) was prepared analogously, using [H(OEt$_2$)$_2$][B{C$_6$H$_3$(CF$_3$)$_2$-3,5}$_4$] in place of [H(OEt$_2$)$_2$][B(C$_6$F$_5$)$_4$].

A.4. Synthesis of 4,5-bis(1,3-diisopropylimidazolin-2-imino))-2,7,9,9-tetramethylacridan, H[AII$_2$]

A mixture of "RuPhos Pd G4" (92.05 mg, 0.1083 mmol), RuPhos (50.54 mg, 0.1083) and sodium tert-butoxide (0.2495 g, 2.4 mmol) was dissolved in approximately 10 mL of 1,4-dioxane and stirred for 5 minutes in a 50 mL sealed flask. This was followed by the addition of 1,3-diisopropyl-2-iminoimidazoline (0.3804 g, 2.275 mmol) and 1,8-Dibromo-3,6,9,9-tetramethyl-9,10-acridan (0.4286 g, 1.137 mmol) in approximately 30 mL of 1,4-dioxane. The sealed reaction flask was heated at 100° C. in an oil bath for 36 h yielding a dark brown solution. The reaction solution was passed through a pad of Celite and volatiles were removed under reduced pressure to yield a dark brown oil. The product was extracted using approximately 30 mL of DCM and was washed with 60 mL of water. The aqueous layer was additionally extracted with 30 mL of DCM and the organic layers were combined. The organic layer was dried with MgSO$_4$ and gravity filtered. Volatiles were removed from the filtrate under reduced pressure yielding a dark brown sticky solid. The brown solid was dissolved in approximately 60 mL of hexane and was passed through a pad of celite yielding a dark orange filtrate. The filtrate was concentrated to 20 mL and was allowed to re-crystallize at −10° C. overnight. H[AII$_2$] was obtained as an off white powder, and dried for 12 h at 80° C. under reduced pressure. Yield: 221 mg, 34%. $^1$H NMR (C$_6$D$_6$, 600 MHz, 298K): δ 8.39 (s, 1H, NH), 6.98 (s, 2H, CH$^{1,8}$), 6.72 (s, 2H, CH$^{3,6}$), 5.90 (s. 4H, N—CH), 4.50 (sept, $^3J_{H,H}$ 6.0 Hz, 4H, CHMe$_2$), 2.39 (s, 6H, ArMe), 1.82 (s, 6H, CMe$_2$), 0.92 (d, $^3J_{H,H}$ 6.0 Hz, 24H, CHMe$_2$).

Part B. Transition Metal and Rare Earth Complex Synthesis

B.1. Synthesis of [(XN$_2$)Zr(NMe$_2$)$_2$].(O(SiMe$_3$)$_2$)$_{0.5}$

H$_2$XN$_2$ (1.5 g, 1.98 mmol) was dissolved in 14 mL of toluene and added to [Zr(NMe$_2$)$_4$] (1.58 g, 5.94 mmol) which was then stirred at 110° C. in a sealed Schlenk flask for 14 days. The solvent was removed in vacuo and the brown solid was heated at 90° C. to remove excess [Zr(NMe$_2$)$_4$] by sublimation. The remaining product was recrystalized from O(SiMe$_3$)$_2$ at −30° C. yielding [(XN$_2$)Zr(NMe$_2$)$_2$].(O(SiMe$_3$)$_2$)$_{0.5}$ as a brown solid (1.46 g, 73%). $^1$H NMR (C$_6$D$_6$, 600 MHz): δ 7.28 (s, 4H, Ar—H), 6.82 (d, 2H, $^4J_{H,H}$ 1.96 Hz, Xanth-CH$^1$), 6.25 (d, $_2$H, $^4J_{H,H}$ 1.96 Hz, Xanth-CH$^3$), 3.57 (sept, 4H, $^3J_{H,H}$ 6.86 Hz, ortho-CHMe$_2$), 2.88 (sept, 2H, $^3J_{H,H}$ 6.86 Hz, para-CHMe$_2$), 2.62 (br. s, 12H, Zr(NMe$_2$)$_2$), 1.60 (s, 6H, CMe$_2$), 1.30 (d, 12H, $^3J_{H,H}$ 6.86 Hz, A-ortho-CHMe$_2$), 1.26 (d, 12H, $^3J_{H,H}$ 6.86 Hz, para-CHMe$_2$), 1.25 (d, 12H, $^3J_{H,H}$ 6.86 Hz, B-ortho-CHMe$_2$), 1.24 (s, 18H, CMe$_3$). $^{13}$C{$^1$H} NMR (C$_6$D$_6$, 126 MHz): δ 148.13 (Xanth-C$^2$), 147.17 (Xanth-C$^4$), 146.36 (para-CCHMe$_2$), 146.26 (ortho-CCHMe$_2$), 140.86 (Ar—C$_{ipso}$), 139.66 (Xanth-C$^{11}$), 130.11 (Xanth-C$^{10}$), 122.09 (Ar—CH), 109.81 (Xanth-C$^3$H), 108.53 (Xanth-C$^1$H), 42.37 (Zr(NMe$_2$)$_2$), 35.56 (Xanth-C$^9$Me$_2$), 35.10 (CMe$_3$), 34.57 (para-CHMe$_2$), 31.87 (CMe$_3$), 30.23 (CMe$_2$), 28.55 (ortho-CHMe$_2$), 26.01 (B-ortho-CHMe$_2$), 24.79 (A-ortho-CHMe$_2$), 24.41 (para-CHMe$_2$). Anal. Calcd. For C$_{60}$H$_{95}$N$_4$O$_{1.5}$SiZr: C, 70.95; H, 9.42; N, 5.51%. Found: C, 70.99; H, 9.23; N, 5.47%. X-ray crystal structure for [(XN$_2$)Zr(NMe$_2$)$_2$] is shown in FIG. 1.

B2. Synthesis of [(XN$_2$)ZrCl$_2$]

[(XN$_2$)Zr(NMe$_2$)$_2$].(O(SiMe$_3$)$_2$)$_{0.5}$ (0.15 g, 0.147 mmol) was dissolved in 6 mL of benzene, to which Me$_3$SiCl (0.04 g, 0.369 mmol) was added and the solution was stirred at 24° C. in a sealed Schlenk flask for 14 days. The solvent was removed in vacuo and the yellow solid was recrystalized from a concentrated pentane solution cooled to −30° C. yielding [(XN$_2$)ZrCl$_2$] as a bright yellow powder (0.086 g, 64%). $^1$H NMR (C$_6$D$_6$, 600 MHz): δ7.29 (s, 4H, Ar—H), 6.89 (d, 2H, $^4J_{H,H}$ 1.96 Hz, Xanth-CH'), 6.22 (d, 2H, $^4J_{H,H}$ 1.96 Hz, Xanth-CH''), 3.67 (sept, 4H, $^3J_{H,H}$ 6.68 Hz, ortho-CHMe$_2$), 2.79 (sept, 2H, $^3J_{H,H}$ 6.86 Hz, para-CHMe$_2$), 1.56 (d, 12H, $^3J_{H,H}$ 6.80 Hz, A-ortho-CHMe$_2$), 1.35 (s, 6H, CMe$_2$), 1.18 (s, 18H, CMe$_3$), 1.17 (d, 12H, $^3J_{H,H}$ 6.86 Hz, para-CHMe$_2$), 1.14 (d, 12H, $^3J_{H,H}$ 6.72 Hz, B-ortho-CHMe$_2$). $^{13}$C{$^1$H} NMR (C$_6$D$_6$, 126 MHz): δ 149.46 (Xanth-C$^2$), 149.07 (para-CCHMe$_2$), 146.08 (ortho-CCHMe$_2$), 136.75 (Ar—C$_{ipso}$), 130.21 (Xanth-C$^{10}$), 123.15 (Ar—CH), 112.43 (Xanth-CH'), 109.77 (Xanth-CH''), 35.58 (Xanth-C$^9$Me$_2$), 35.17 (CMe$_3$), 34.43 (para-CHMe$_2$), 31.64 (CMe$_3$), 30.09 (CMe$_2$), 29.24 (ortho-CHMe$_2$), 26.58 (B-ortho-CHMe$_2$), 24.90 (A-ortho-CHMe$_2$), 24.11 (para-CHMe$_2$). Anal. Calcd. For C$_{63}$H$_{74}$N$_2$OZrCl$_2$: C, 69.39; H, 8.13; N, 3.05%. Found: C, 68.89; H, 8.02; N, 3.44%.

B.3. Synthesis of [(XN$_2$)ZrMe$_2$]

Method A. [(XN$_2$)Zr(NMe$_2$)$_2$].(O(SiMe$_3$)$_2$)$_{0.5}$ (0.095 g, 0.093 mmol) was dissolved in $_2$ mL of benzene, to which AlMe$_3$ (0.067 g, 0.935 mmol) was added and the solution was stirred at 24° C. in a sealed Schlenk flask for 7 days. The solvent was removed in vacuo and the yellow solid was recrystalized from a concentrated pentane solution cooled to −30° C., yielding yellow crystals of [(XN$_2$)ZrMe$_2$] (0.051 g, 62%). $^1$H NMR (C$_6$D$_6$, 600 MHz): δ 7.33 (s, 4H, Ar—H), 6.84 (d, 2H, $^4J_{H,H}$ 1.84 Hz, Xanth-CH$^1$), 6.24 (d, 2H, $^4J_{H,H}$ 1.87 Hz, Xanth-CH$^3$), 3.72 (sept, 4H, $^3J_{H,H}$ 6.72 Hz, ortho-CHMe$_2$), 2.85 (sept, 2H, $^3J_{H,H}$ 6.89 Hz, para-CHMe$_2$), 1.47 (s, 6H, CMe$_2$), 1.43 (d, 12H, $^3J_{H,H}$ 6.88 Hz, A-ortho-CHMe$_2$), 1.23 (d, 12H, $^3J_{H,H}$ 6.87 Hz, para-CHMe$_2$), 1.22 (s, 18H, CMe$_3$), 1.20 (d, 12H, $^3J_{H,H}$ 6.70 Hz, B-ortho-CHMe$_2$), 0.78 (s, 6H, ZrMe$_2$). $^{13}$C{$^1$H} NMR (C$_6$D$_6$, 126 MHz): δ 148.48 (Xanth-C$^2$), 148.02 (para-CCHMe$_2$), 146.88 (ortho-CCHMe$_2$), 145.86 (Xanth-C$^4$), 140.28 (Xanth-C$^{11}$), 137.01 (Ar—C$_{ipso}$), 128.94 (Xanth-C$^{10}$), 122.84 (Ar—CH), 110.90 (Xanth-C$^1$H), 109.79 (Xanth-C$^3$H), 50.02 (ZrMe$_2$), 35.10 (CMe$_3$), 35.09 (Xanth-C$^9$Me$_2$), 34.50 (para-CHMe$_2$), 31.70 (CMe$_3$), 31.42 (CMe$_2$), 29.01 (ortho-CHMe$_2$), 26.86 (B-ortho-CHMe$_2$), 24.68 (A-ortho-CHMe$_2$), 24.24 (para-CHMe$_2$). Anal. Calcd. For C$_{55}$H$_{80}$N$_2$OZr: C, 75.37; H, 9.20; N, 3.19%. Found: C, 75.03; H, 8.88; N, 3.08%.

Method B. [(XN$_2$)ZrCl$_2$] was reacted with excess methyl lithium in C$_6$D$_6$ and the $^1$H NMR spectrum revealed a clean reaction to the [(XN$_2$)ZrMe$_2$] product. However, method A was chosen as the preferred route for the isolation of [(XN$_2$)ZrMe$_2$] on a preparative scale as it is more direct.

Figure 2:
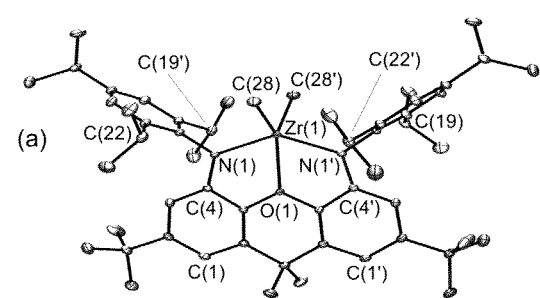
FIG. 2 shows the X-ray crystal structure for the exemplary catalyst component [(XN$_2$)ZrMe$_2$]. Ellipsoids are set to 50%. Hydrogen atoms are omitted for clarity. In view b, the 2,4,6-triisopropylphenyl groups are depicted in wire-frame format for clarity.
Figure 2:
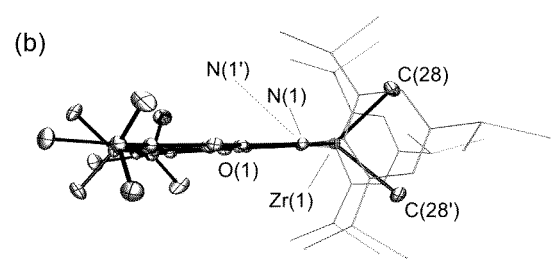

The X-ray crystal structure for compound [(XN$_2$)ZrMe$_2$] is shown in FIG. 2.

B.4. Synthesis of [(XN$_2$)Hf(NMe$_2$)$_2$]

H$_2$XN$_2$ (0.1 g, 0.132 mmol) was dissolved in 3 mL of toluene and added to [Hf(NMe$_2$)$_4$] (0.14 g, 0.396 mmol) which was then stirred at 110° C. in a sealed Schlenk ask for 14 days. The solvent was removed in vacuo and the brown solid was heated at 90° C. to remove excess [Hf(NMe$_2$)$_4$] by sublimation. The remaining product was recrystallized from O(SiMe$_3$)$_2$ at −30° C. yielding [(XN$_2$)Hf(NMe$_2$)$_2$].(O(SiMe$_3$)$_2$)$_{0:5}$ as a brown solid (0.058 g, 40%). $^1$H NMR (C$_6$D$_6$, 600 MHz): δ 7.29 (s, 4H, Ar—H), 6.80 (d, 2H, $^4J_{H,H}$ 1.93 Hz, Xanth-CH$^1$), 6.27 (d, 2H, $^4J_{H,H}$ 1.93 Hz, Xanth-CH$^3$), 3.61 (sept, 4H, $^3J_{H,H}$ 6.62 Hz, ortho-CHMe$_2$), 2.88 (sept, 2H, $^3J_{H,H}$ 6.86 Hz, para-CHMe$_2$), 2.69 (br. s, 12H, NMe$_2$), 1.58 (s, 6H, CMe$_2$), 1.33 (d, 12H, $^3J_{H,H}$ 6.8 Hz, A-ortho-CHMe$_2$), 1.26 (d, 12H, $^3J_{H,H}$ 6.8 Hz, para-CHMe$_2$), 1.25 (d, 12H, $^3J_{H,H}$ 6.8 Hz, B-ortho-CHMe$_2$), 1.24 (s, 18H, CMe$_3$). $^{13}$C{$^1$H} NMR (C$_6$D$_6$, 126 MHz): δ 148.37 (Xanth-C$^2$), 147.62 (Xanth-C$^4$), 146.39 (para-C$^i$Pr), 146.39 (ortho-C$^i$Pr), 141.08 (Ar—C$_{ipso}$), 139.88 (Xanth-C$^{11}$), 130.24 (Xanth-C$^{10}$), 122.07 (Ar—CH), 110.67 (Xanth-CH$^3$), 108.55 (Xanth-CH$^1$), 42.14 (NMe$_2$), 35.58 (Xanth-C$^9$Me$_2$), 35.13 (CMe$_3$), 34.55 (para-CHMe$_2$), 31.86 (CMe$_3$), 30.16 (CMe$_2$), 28.54 (ortho-CHMe$_2$), 26.07 (B-ortho-CHMe$_2$), 24.79 (A-ortho-CHMe$_2$), 24.42 (para-CHMe$_2$). Anal. Calcd. For C$_{60}$H$_{95}$N$_4$O$_{1.5}$SiHf: C, 65.33; H, 8.68; N, 5.07%. Found: C, 65.30; H, 8.71; N, 5.05%.

B.5. Synthesis of [(XII$_2$)YCl$_3$]

The XII$_2$ ligand (34 mg, 0.0521 mmol) and YCl$_3$(thf)$_{3.5}$ (21.4 mg, 0.0521 mmol) were stirred in approximately 5 mL of THF in a 25 mL round bottom flask. Volatiles were removed in vacuo resulting in a quantitative yield of [(XII$_2$)YCl$_3$]. $^1$H NMR (C$_6$D$_6$, 600 MHz, 298K): δ 7.27 (s, 4H, N—CH), 6.64 (s, $_2$H, CH$^{1,8}$), 5.50 (sept, $^3J_{H,H}$ 6.0 Hz, 4H, CHMe$_2$), 5.30 (s, 2H, CH$^{3,6}$), 1.66 (s, 6H, CMe$_2$), 1.49 (d, $^3J_{H,H}$ 6.0 Hz, 12H, CHMe$_2$), 1.23 (d, $^3J_{H,H}$ 6.0 Hz, 12H, CHMe$_2$), 1.17 (s, 18H, CMe$_3$).

B.6. Synthesis of [(AII$_2$)Y(CH$_2$SiMe$_3$)$_2$]

H[AII$_2$] (31 mg, 0.0546 mmol) and [Y(CH$_2$SiMe$_3$)$_3$(thf)$_2$] (27 mg, 0.0546 mmol) was stirred in approximately 5 mL of benzene in a 25 mL round bottom flask. Volatiles were removed under reduced pressure resulting in a quantitative yield of [AII$_2$)Y(CH$_2$SiMe$_3$)$_2$]. $^1$H NMR (C$_6$D$_6$, 600 MHz, 298K): δ 6.91 (s, 2H, CH$^{1,8}$), 6.07 (s, 4H, N—CH), 5.56 (s, 2H, CH$^{3,6}$), 4.88 (sept, $^3J_{H,H}$ 6.0 Hz, 4H, CHMe$_2$), 2.27 (s, 6H, ArMe), 1.95 (s, 6H, CMe$_2$), 1.19 (d, $^3J_{H,H}$ 6.0 Hz, 12H, CHMe$_2$), 0.99 (d, $^3J_{H,H}$ 6.0 Hz, 12H, CHMe$_2$), 0.18 (s, 18H, CH$_2$SiMe$_3$), −0.81 (d, $^3J_{H,Y}$ 6.0 Hz, 4H, CH$_2$SiMe$_3$).

Part C. Cationic Alkyl Complex Synthesis

C1. Synthesis of [(XN$_2$)ZrMe][MeB(C$_6$F$_5$)$_3$]

Figure 3:
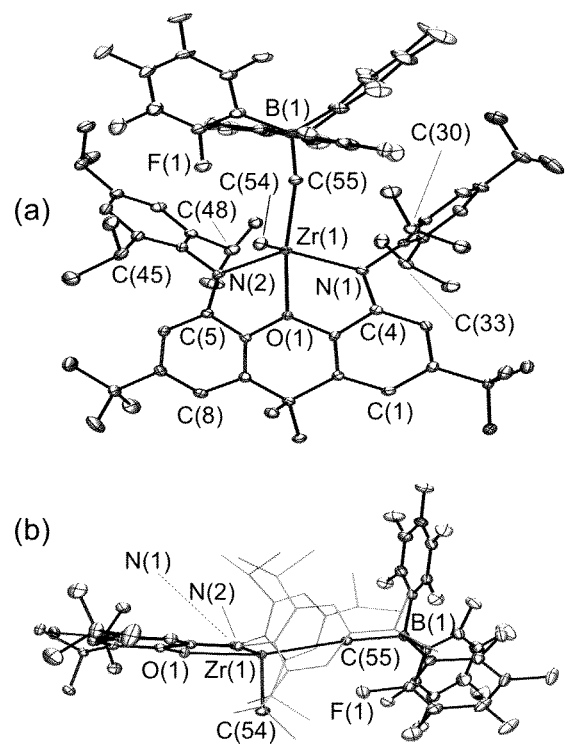
FIG. 3 shows the X-ray crystal structure for the exemplary catalyst [(XN$_2$)ZrMe][MeB(C$_6$F$_5$)$_3$]. Ellipsoids are set to 50%. Hydrogen atoms and lattice solvent are omitted. In view a, the methyl ligand points out of the page. In view b, N(1) is located behind N(2), and the 2,4,6-triisopropylphenyl groups are depicted in wire-frame format for clarity.

[(XN$_2$)ZrMe$_2$] (0.075 g, 0.085 mmol) was dissolved in 1.5 mL of toluene, to which B(C$_6$F$_5$)$_3$ (0.044 g, 0.085 mmol) was added and the solution was stirred at 24° C. for 5 min. The toluene solution was then layered with pentane (5 mL) and cooled to −30° C., which yielded bright yellow crystals of [(XN$_2$)ZrMe][MeB(C$_6$F$_5$)$_3$] (0.091 g, 77%). $^1$H NMR (C$_6$D$_6$, 600 MHz): δ 7.24 (d, $_2$H, $^4J_{H,H}$ 1.8 Hz, Ar—H'), 7.20 (d, 2H, $^4J_{H,H}$ 1.7 Hz, Ar—H"), 6.92 (d, 2H, $^4J_{H,H}$ 1.8 Hz, Xanth-CH'), 6.15 (br. s, 2H, Xanth-CH"), 3.48 (br. sept, 2H, A-ortho-CHMe$_2$), 2.71 (sept, 2H, $^3J_{H,H}$ 6.8 Hz, para-CHMe$_2$), 2.67 (sept, 2H, $^3J_{H,H}$ 6.8 Hz, B-ortho-CHMe$_2$), 1.87 (br. s, 3H, Zr-Me), 1.80 (br. s, 3H, B-Me), 1.55 (d, 6H, $^3J_{H,H}$ 6.1 Hz, A-ortho-CHMe$_2$'), 1.35 (s, 3H, CMe$_2$'), 1.30 (s, 3H, CMe$_2$"), 1.11 (s, 18H, CMe$_3$), 1.09 (d, 12H, $^3J_{H,H}$ 6.8 Hz, para-CHMe$_2$), 1.06 (d, 6H, $^3J_{H,H}$ 6.6 Hz, A-ortho-CHMe$_2$"), 0.91 (d, 6H, $^3J_{H,H}$ 6.5 Hz, B-ortho-CHMe$_2$'), 0.68 (br. d, 6H, B-ortho-CHMe$_2$"). $^{13}$C{$^1$H} NMR (C$_6$D$_6$, 126 MHz): δ 151.45 (Xanth-C$^2$), 150.03 (para-CCHMe$_2$), 148.38 (A-ortho-CCHMe$_2$), 144.60 (B-ortho-CCHMe$_2$), 141.74 (Xanth-C$^{11}$), 130.96 (Ar—C$_{ipso}$), 130.15 (Xanth-C$^{10}$), 125.15 (Ar—CH'), 123.64 (Ar—CH"), 113.86 (Xanth-CH'), 110.08 (Xanth-C'H"), 55.56 (Zr-Me), 35.50 (Xanth-C$^9$Me$_2$), 35.34 (CMe$_3$), 35.20 (br., B-Me), 35.18 (CMe$_2$"), 34.28 (para-CHMe$_2$), 31.49 (CMe$_3$), 30.59 (B-ortho-CHMe$_2$), 28.64 (A-ortho-CHMe$_2$), 26.98 (A-ortho-CHMe$_2$"), 26.40 (B-ortho-CHMe$_2$'), 24.82 (CMe$_2$'), 24.13 (A-ortho-CHMe$_2$'), 23.51 (para-CHMe$_2$), 23.05 (B-ortho-CHMe$_2$"). $^{19}$F NMR (C$_6$D$_6$, 188 MHz): δ −129.1 (d, $^3J_{F,F}$ 21.8 Hz, o-C$_6$F$_5$), −158.67 (t, $^3J_{F,F}$ 20.6 Hz, p-C$_6$F$_5$), −162.26 (br. t, m-C$_6$F$_5$). Anal. Calcd. For C$_{73}$H$_{80}$N$_2$OZrBF$_{15}$: C, 63.15; H, 5.80; N, 2.02%. Found: C, 63.67; H, 6.00; N, 2.12%. The X-ray crystal structure for [(XN$_2$)ZrMe][MeB(C$_6$F$_5$)$_3$] is shown in FIG. 3.

C2. Synthesis of [(XN$_2$)ZrMe(η$^6$-toluene)][B(C$_6$F$_5$)$_4$]

Figure 4:
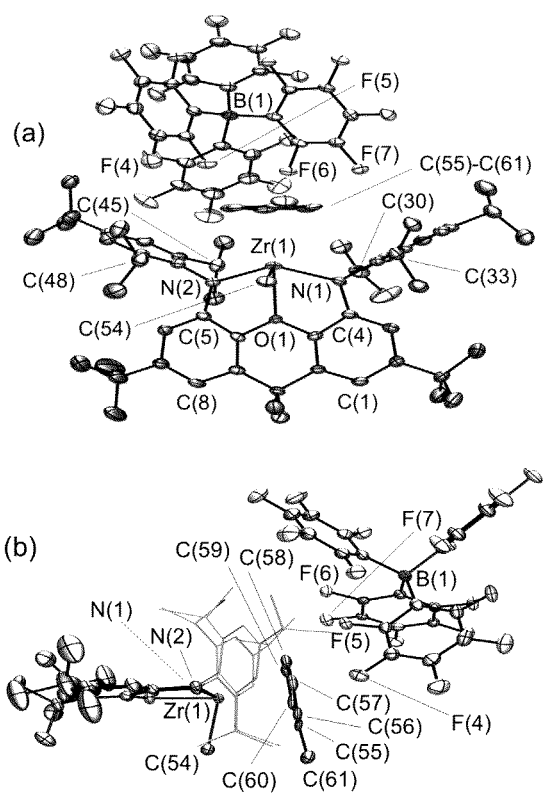
FIG. 4 shows the X-ray crystal structure for the exemplary catalyst [(XN$_2$)ZrMe($\eta^6$-toluene)][B(C$_6$F$_5$)$_4$].(Toluene)$_{0.62}$.(Pentane)$_{1.38}$. Ellipsoids are set to 50%. Hydrogen atoms and lattice solvent are omitted. In view a, the methyl ligand points out of the page. In view b, N(1) is located behind N(2), and the 2,4,6-triisopropylphenyl groups are depicted in wire-frame format for clarity.

[(XN$_2$)ZrMe$_2$] (0.075 g, 0.085 mmol) was dissolved in 1.5 mL of toluene, to which [CPh$_3$][B(C$_6$F$_5$)$_4$] (0.080 g, 0.085 mmol) was added and the solution was stirred at 24° C. for 5 min. The toluene solution was then layered with pentane (5 mL) and cooled to −30° C., which yielded bright red crystals of [(XN$_2$)ZrMe(η$^6$-toluene)][B(C$_6$F$_5$)$_4$] (0.118 g, 84%). $^1$H NMR (C$_6$D$_6$, 600 MHz, 300K): identical to that of [(XN$_2$)ZrMe(η$^6$-benzene)][B(C$_6$F$_5$)$_4$] in C$_6$D$_6$, but containing free toluene. Selected additional NMR data: $^1$H NMR (d$_8$-Tol, 600 MHz, 300K): δ 0.84 (s, 3H, Zr-Me). $^1$H NMR (C$_6$D$_5$Br, 500 MHz, 248 K) δ 7.26 (m, 1H, Coord. Toluene CH-p), 6.97 (s, 2H, Xanth-CH"), 6.80 (d, 2H, $^3J_{H,H}$ 7 Hz, Coord. Toluene CH-o), 6.21 (t, 2H, $^3J_{H,H}$ 7 Hz, Coord. Toluene CH-m), 5.71 (s, 2H, Xanth-CH'), 2.23 (s, 3H, Coord. Toluene CH$_3$). Anal. Calcd. For C$_{85}$H$_{85}$N$_2$OZrBF$_{20}$: C, 62.53; H, 5.25; N, 1.71%. Found: C, 59.29; H, 5.10; N, 1.77%. Although [(XN$_2$)ZrMe(η$^6$-toluene)][B(C$_6$F$_5$)$_4$] in toluene is only approx. 50% decomposed after 18 hours at 80° C., crystals of this compound decomposed rapidly at room temperature after removal of the supernatant, and consequently, a successful elemental analysis could not be obtained. The X-ray crystal structure for compound [(XN$_2$)ZrMe(η$^6$-toluene)][B(C$_6$F$_5$)$_4$].(Toluene)$_{0.62}$.(Pentane)$_{1.38}$ is shown in FIG. 4.

C3. In-situ Generated [(XN$_2$)ZrMe(arene)][B(C$_6$F$_5$)$_4$] {arene=η$^6$-benzene or bromobenzene}

[(XN$_2$)ZrMe$_2$] (0.075 g, 0.085 mmol) was dissolved in 1.5 mL of benzene or bromobenzene, to which [CPh$_3$][B(C$_6$F$_5$)$_4$] (0.080 g, 0.085 mmol) was added and the solution was stirred at 24° C. for 5 min. (the bromobenzene compound exists as a mixture of two isomers in solution, perhaps an η$^6$- and a κ$^1$Br-coordinated isomer). $^1$H NMR for [(XN$_2$)ZrMe(η$^6$-benzene)][B(C$_6$F$_5$)$_4$] (C$_6$D$_6$, 600 MHz)): δ 7.28 (br. s, 2H, Ar—H'), 7.27 (br. s, 2H, Ar—H"), 6.90 (d, 2H, $^4J_{H,H}$ 1.7 Hz, Xanth-CH'), 5.84 (d, 2H, $^4J_{H,H}$ 1.9 Hz, Xanth-CH"), 2.93 (sept, 2H, $^3J_{H,H}$ 6.8 Hz, para-CHMe$_2$), 2.85 (sept, 2H, $^3J_{H,H}$ 6.9 Hz, A-ortho-CHMe$_2$), 2.80 (sept, 2H, $^3J_{H,H}$ 6.8 Hz, B-ortho-CHMe$_2$), 1.34 (s, 3H, CMe$_2$'), 1.32 (s, 3H, CMe$_2$"), 1.31 (d, 6H, $^3J_{H,H}$ 6.9 Hz, A-ortho-CHMe$_2$'), 1.30 (d, 12H, $^3J_{H,H}$ 6.9 Hz, para-CHMe$_2$), 1.28 (d, 6H, $^3J_{H,H}$ 6.9 Hz, B-ortho-CHMe$_2$'), 1.09 (s, 18H, CMe$_3$), 0.99 (d, 6H, $^3J_{H,H}$ 6.8 Hz, A-ortho-CHMe$_2$"), 0.91 (s, 3H, Zr-Me), 0.81 (d, 6H, $^3J_{H,H}$ 6.8 Hz, B-ortho-CHMe$_2$"). $^{13}$C{$^1$H} NMR for [(XN$_2$)ZrMe(η$^6$-benzene)][B(C$_6$F$_6$)$_4$] (C$_6$D$_6$, 126 MHz): δ 150.57 (para-CCHMe$_2$), 149.30 (Xanth-C$^2$), 145.79 (Ar—C$_{ipso}$), 145.12 (A-ortho-CCHMe$_2$), 142.78 (B-ortho-CCHMe$_2$), 141.15 (Xanth-C$^{11}$), 130.17 (Xanth-C$^{10}$), 123.61 (Ar—CH'), 122.98 (Ar—CH"), 114.13 (Xanth-CH'), 111.53 (Xanth-CH"), 43.53 (Zr-Me), 36.36 (CMe$_2$"), 35.07 (CMe$_3$), 35.01 (Xanth-C$^9$Me$_2$), 34.57 (para-CHMe$_2$), 31.29 (CMe$_3$), 30.05 (B-ortho-CHMe$_2$), 28.23 (A-ortho-CHMe$_2$), 26.53 (B-ortho-CHMe$_2$"), 26.43 (A-ortho-CHMe$_2$"), 24.37 (CMe$_2$'), 23.98 (para-CHMe$_2$), 23.66 (A-ortho-CHMe$_2$'), 23.32 (B-ortho-CHMe$_2$). $^{19}$F NMR for [(XN$_2$)ZrMe(η$^6$-benzene)][B(C$_6$F$_6$)$_4$] (C$_6$D$_6$, 188 MHz): δ −130.02 (br. d, o-C$_6$F$_6$), −160.67 (t, $^3J_{F,F}$ 22.2 Hz, p-C$_6$F$_6$), −164.46 (br. t, $^3J_{F,F}$ 18.8 Hz, m-C$_6$F$_5$). Selected NMR data for [(XN$_2$)ZrMe(bromobenzene)][B(C$_6$F$_6$)$_4$]: $^1$H NMR (C$_6$D$_5$Br, 500 MHz, 300 K): δ 6.13 (br. s, 2H, Xanth-CH'). $^1$H NMR (C$_6$D$_5$Br, 500 MHz, 248 K): δ 7.06 (br. s, 1.3H, Isomer A Xanth-CH"), 6.98 (br. s, 0.7H, Isomer B Xanth-CH"), 6.23 (s, 1.3H, Isomer A Xanth-CH'), 5.80 (s, 0.7H, Isomer B Xanth-CH').

B.5. Synthesis of [(XII$_2$)Y(CH$_2$SiMe$_3$)$_2$][B(C$_6$H$_3${CF$_3$}$_2$-3,5)$_4$]

[HXII$_2$][B(C$_6$H$_3${CF$_3$}$_2$-3,5)$_4$] (50 mg, 0.0458 mmol) and (22.7 mg, 0.0458 mmol) of [Y(CH$_2$SiMe$_3$)$_3$(thf)$_2$] was stirred in approximately 5 mL of benzene in a 25 mL round bottom flask. Volatiles were removed under reduced pressure resulting in a quantitative yield of [(XII$_2$)Y(CH$_2$SiMe$_3$)$_2$][B(C$_6$H$_3${CF$_3$}$_2$-3,5)$_4$]. $^1$H NMR (C$_6$D$_6$Br, 600 MHz, 298K): δ 8.19 (s, 8H, o-B[C$_6$H$_3${CF$_3$}$_2$]$_4$), δ 7.58 (s, 4H, p-B[C$_6$H$_3${CF$_3$}$_2$]$_4$), 6.95 (s, 2H, CH$^{1,8}$), 6.64 (s, 4H, N—CH), 5.61 (s, $_2$H, CH$^{3,6}$), 4.60 (sept, $^3J_{H,H}$ 6.0 Hz, 4H, CHMe$_2$), 1.67 (s, 6H, CMe$_2$), 1.28 (d, $^3J_{H,H}$ 6.0 Hz, 12H, CHMe$_2$), 1.14 (s, 18H, CMe$_3$), 1.05 (d, $^3J_{H,H}$ 6.0 Hz, 12H, CHMe$_2$), 0.21 (s, 18H, CH$_2$SiMe$_3$), −0.79 (d, $^3J_{H,Y}$ 6.0 Hz, 4H, CH$_2$SiMe$_3$).

Part D. Polymerization

D.1. Ethylene Polymerization with [(XN$_2$)ZrMe$_2$] Activated Using B(C$_6$F$_5$)$_3$ Method A. In the glove box 5 mg (0.0057~mmol) of [(XN$_2$)ZrMe$_2$] was dissolved in approx. 4.75 mL (approx. 1.2~mM) of toluene and 1 equivalent of B(C$_6$F$_6$)$_3$ (2.9 mg, 0.0057 mmol) was added and the solution was allowed to react for 5 min at 24° C. The solution was briefly evacuated before placing the flask under dynamic ethylene (1 atm) and the solution was allowed to react for 30 minutes, at which point the solution was opened to air and acidified methanol (10% HCl) was added. The polyethylene solid was filtered, washed with methanol and acetone and then dried in a 40° C. oven and weighed to obtain the yield (0.067 g), providing an activity of 23.5 kg PE mol$^{-1}$ atm$^{-1}$ h$^{-1}$.

Method B. In the glove box 5 mg (0.0057~mmol) of [(XN$_2$)ZrMe$_2$] was dissolved in approx. 4.75 mL (approx. 1.2~mM) of toluene and 1 equivalent of B(C$_6$F$_5$)$_3$ (2.9 mg, 0.0057 mmol) was added and the solution was allowed to react for 5 min at 24° C. The solution was briefly evacuated before placing the flask in a preheated oil bath (80° C.) followed by opening to dynamic ethylene (1 atm) and the solution was allowed to react for 30 minutes, at which point the solution was opened to air and acidified methanol (10% HCl) was added. The polyethylene solid was filtered, washed with methanol and acetone and then dried in a 40° C. oven and weighed to obtain the yield (0.338 g), corresponding to an activity of 118 kg PE mol$^{-1}$ atm$^{-1}$ h$^{-1}$.

D.2. Ethylene Polymerization with [(XN$_2$)ZrMe$_2$] Activated Using [CPh$_3$][B(C$_6$F$_5$)$_4$]

Method A. In the glove box 5 mg (0.0057~mmol) of [(XN$_2$)ZrMe$_2$] was dissolved in approx. 4.75 mL (approx. 1.2~mM) of toluene and 1 equivalent of [CPh$_3$][B(C$_6$F$_5$)$_4$] (5.3 mg, 0.0057 mmol) was added and the solution was allowed to react for 5 min at 24° C. The solution was briefly evacuated before placing the flask under dynamic ethylene (1 atm) and the solution was allowed to react for 30 minutes, at which point the solution was opened to air and acidified methanol (10% HCl) was added. The polyethylene solid was filtered, washed with methanol and acetone and then dried in a 40° C. oven and weighed to obtain the yield (0.778 g), corresponding to an activity of 273 kg PE mol$^{-1}$ atm$^{-1}$ h$^{-1}$.

Method B. In the glove box 5 mg (0.0057~mmol) of [(XN$_2$)ZrMe$_2$] was dissolved in approx. 4.75 mL (approx. 1.2~mM) of toluene and 1 equivalent of [CPh$_3$][B(C$_6$F$_5$)$_4$] (5.3 mg, 0.0057 mmol) was added and the solution was allowed to react for 5 min at 24° C. The solution was briefly evacuated before placing the flask under dynamic ethylene (1 atm) and the solution was allowed to react for 5 minutes, at which point the solution was opened to air and acidified methanol (10% HCl) was added. The polyethylene solid was filtered, washed with methanol and acetone and then dried in a 40° C. oven and weighed to obtain the yield (0.418 g), corresponding to an activity of 883 kg PE mol$^{-1}$ atm$^{-1}$ h$^{-1}$.

Method C. In the glove box 5 mg (0.0057~mmol) of [(XN$_2$)ZrMe$_2$] was dissolved in approx. 4.75 mL (approx. 1.2~mM) of toluene and 1 equivalent of [CPh$_3$][B(C$_6$F$_5$)$_4$] (5.3 mg, 0.0057 mmol) was added and the solution was allowed to react for 5 min at 24° C. The solution was briefly evacuated before placing the flask in a preheated oil bath (80° C.) followed by opening to dynamic ethylene (1 atm) and the solution was allowed to react for 30 minutes, at which point the solution was opened to air and acidified methanol (10% HCl) was added. The polyethylene solid was filtered, washed with methanol and acetone and then dried in a 40° C. oven and weighed to obtain the yield (0.322 g), corresponding to an activity of 113 kg PE mol$^{-1}$ atm$^{-1}$ h$^{-1}$.

Method D. In the glove box 5 mg (0.0057~mmol) of [(XN$_2$)ZrMe$_2$] was dissolved in approx. 4.75 mL (approx. 1.2~mM) of bromobenzene and 1 equivalent of [CPh$_3$][B(C$_6$F$_5$)$_4$] (5.3 mg, 0.0057 mmol) was added and the solution was allowed to react for 5 min at 24° C. The solution was briefly evacuated before placing the flask under dynamic ethylene (1 atm) and the solution was allowed to react for 2 minutes, at which point the solution was opened to air and acidified methanol (10% HCl) was added. The polyethylene solid was filtered, washed with methanol and acetone and then dried in a 40° C. oven and weighed to obtain the yield (0.057 g), corresponding to an activity of 300 kg PE mol$^{-1}$ atm$^{-1}$ h$^{-1}$.

Table of Ethylene polymerization data for [(XN$_2$)ZrMe$_2$] activated with B(C$_6$F$_5$)$_3$ or [CPh$_3$][B(C$_6$F$_5$)$_4$] (1.2 mM concentration) under 1 atm of ethylene. The catalyst is generated in situ by reaction of [(XN$_2$)ZrMe$_2$] (2) with 1 equiv. of activator in arene solvent (toluene unless otherwise specified).

| Activator[a] | Temp. (° C.) | Time (min) | Yield (g) | Activity (kg/ (mol · atm · h) | $M_w$ (g/mol)[b] | $M_w/M_n$[b] | $T_m$ (° C.)[c] |
|---|---|---|---|---|---|---|---|
| BAr$_3$ | 24 | 30 | 0.067 | 23.5 | —[e] | —[e] | 125.9 |
| BAr$_3$ | 80 | 30 | 0.338 | 118 | 70 750 | 3.94 | 120.2 |
| CPh$_3^+$ | 24 | 30 | 0.778 | 273 | 78 300 | 4.66 | 123.9 |
| CPh$_3^+$ | 24 | 5 | 0.418 | 883 | 88 050 | 4.65 | 122.4 |
| CPh$_3^+$ | 80 | 30 | 0.322 | 113 | 81 850 | 4.67 | 123.0 |
| CPh$_3^+$ | 24[d] | 2[d] | 0.057[d] | 300 | 52 150 | 3.30 | 124.2 |

[a]BAr$_3$ = B(C$_6$F$_5$)$_3$; [CPh$_3$]$^+$ = [CPh$_3$][B(C$_6$F$_5$)$_4$].
[b]GPC is relative to polystyrene standards, and $M_w$ and $M_w/M_n$ values are averages from two duplicate GPC runs.
[c]Peak melting temperature, $T_m$, from DSC.
[d]In-situ catalyst generation and polymerization was carried out in bromobenzene.
[e]The polymer was insoluble in 1,2,4-trichlorobenzene at 140° C., and therefore was not amenable to analysis by GPC.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

What is claimed is:

1. A catalyst system for alkene polymerization wherein a catalyst component is combined with at least one activator, wherein the catalyst component comprises:
   a central metal which is a group 4 transition metal or a rare earth metal; two or more activatable ligands attached to the central metal if the complex is neutral or anionic, or one or more activatable ligand attached to the central metal if the complex is monocationic or dicationic; and a rigid non-cyclopentadienyl ligand (RL) with a tricyclic backbone comprised of three ortho-fused 6-membered rings in a linear arrangement, with or without additional fused rings; the tricyclic backbone comprising at least two outer carbocyclic rings fused to a central ring, the central ring comprises at least one donor atom, and further donor atoms, donor groups or aryl rings are directly attached to both carbon atoms in the two outer carbocyclic rings that are adjacent to at least one of the donor atoms within the central ring; and the at least one activator is:

(a) an aluminoxane, (b) a neutral Lewis acid, (c) an ionic activator comprising a Bronstead acid, (d) an ionic activator comprising a Lewis acid cation, or (e) an oxidizing agent.

2. A polymerization process characterized by contacting one or more monomers polymerizable by coordination polymerization under suitable coordination polymerization conditions with a catalyst system of claim 1.

3. The catalyst system of claim 1, wherein the RL ligand is defined by one of the following four structures in which the X groups are the same or different, and the $R^1$ groups are the same or different:

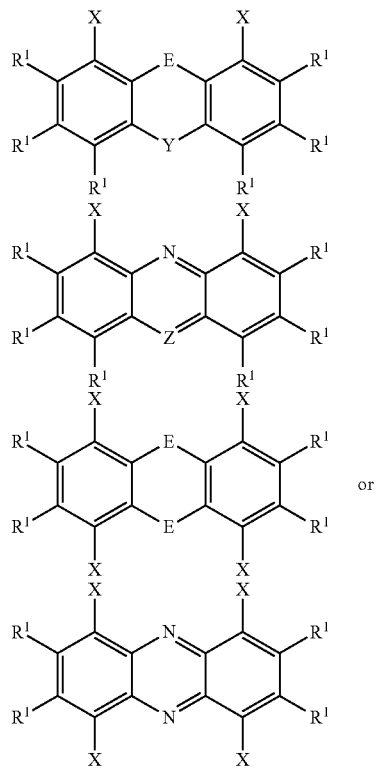

wherein E is nitrogen, phosphorus, oxygen or sulphur; Z is nitrogen or a $CR^2$ group; Y is oxygen or sulphur, or is one of the following formulae:

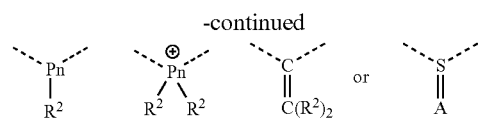

wherein dashed lines indicate the point of attachment to the remainder of the ligand, G3 is boron, aluminum or gallium, G4 is carbon, silicon, germanium or tin, A is oxygen or an $NR^2$ group, and Pn is nitrogen or phosphorus; each X is independently one of the following formulae:

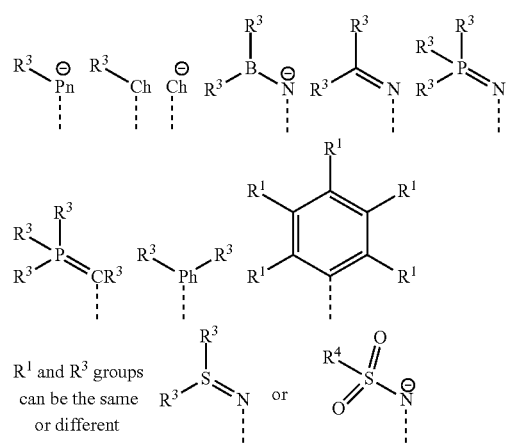

wherein dashed lines indicate the point of attachment to the remainder of the ligand, Ch is oxygen or sulphur, and Pn is as defined above; each $R^1$, $R^2$ and $R^3$ substituent is independently (a) a hydrogen atom, (b) a halogen atom, (c) a hydrocarbyl radical, (d) an alkoxy, aryloxy, siloxy, germoxy or stannoxy radical, (e) an amino radical substituted by up to two hydrocarbyl, boryl, silyl, or amino radicals, (f) a silyl, germyl or stannyl radical substituted by up to three hydrocarbyl, silyl, germyl, stannyl, alkoxy, siloxy, germoxy, stannoxy, aryloxy or amino radicals, (g) a thioalkyl or thioaryl radical, (h) a phosphino radical substituted by up to two hydrocarbyl, silyl, alkoxy, siloxy, aryloxy or amino radicals, or (i) a boryl radical substituted by up to two hydrocarbyl, silyl, alkoxy, siloxy, aryloxy or amino radicals; each $R^4$ is a hydrocarbyl or silyl radical; wherein $R^1$ groups attached to carbon atoms that are either (a) 1,2-disposed, or (b) 1,3-disposed with a quaternary carbon atom between them, may join together to form a substituted or unsubstituted, saturated, partially unsaturated or aromatic cyclic or polycyclic ring; optionally, $R^2$ substituents may join together to form a substituted or unsubstituted, saturated, partially unsaturated or fully unsaturated cyclic or polycyclic ring; optionally $R^3$ substituents may join together to form a substituted or unsubstituted, saturated, partially unsaturated or fully unsaturated cyclic or polycyclic ring; optionally all three $R^3$ substituents in an $NPR^3_3$ group may join together to form a cage; and optionally, each $R^1$, $R^2$, $R^3$ and $R^4$ group may join together with an $R^1$, $R^2$, $R^3$ or $R^4$ group on a second catalyst component to form a substituted or unsubstituted, saturated, partially unsaturated, aromatic or polycyclic bridging group.

4. The catalyst system of claim 3, wherein the catalyst component is defined by the formula below, where L is a non-cyclopentadienyl activatable ligand, y is 1, 2 or 3, Q is an additional ligand that is monodentate and bears a charge of 0, and z is 0 or 1:

(RL)-M-(L)$_y$(Q)$_z$.

5. The catalyst system of claim 4, wherein the RL ligand is neutral, the central metal is a rare earth element, y is 3, and z=0.

6. The catalyst system of claim 4, wherein the RL ligand is monoanionic, the central metal is a rare earth element, y is at least 2, and z=0.

7. The catalyst system of claim 4, wherein the RL ligand is monoanionic, the central metal is group 4 transition metal, y is 3, and z=0.

8. The catalyst system of claim 4, wherein the RL ligand is dianionic, the central metal is a group 4 transition metal, y is at least 2, and z=0.

9. The catalyst system of claim 4, wherein each $R^1$, $R^2$ and $R^3$ substituent is independently a hydrogen atom, a hydrocarbyl radical, a silyl radical, an alkyloxy radical, an aryloxy radical, a siloxy radical, or an amino radical substituted by up to two hydrocarbyl and/or a silyl radical; and the $R^1$ substituents are also optionally halogen atoms.

10. The catalyst system of claim 9, wherein the RL ligand has the formula shown below, where E is oxygen or sulphur:

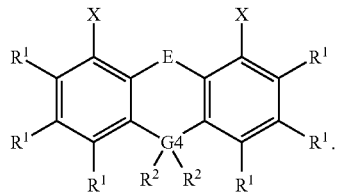

11. The catalyst system of claim 9, wherein the RL ligand has the formula shown below, where E is nitrogen or phosphorus:

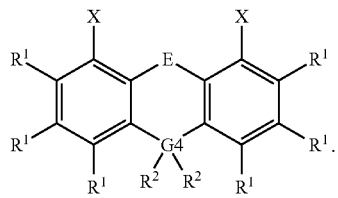

12. The catalyst system of claim 3, wherein each X group is independently a N=C($R^3$)$_2$ group, a N=P($R^3$)$_3$ group or a N=S($R^3$)$_2$ group.

13. The catalyst system of claim 3, wherein one X group is a Pn($R^3$)$_2$ group, a Ch($R^3$) group, an N=C($R^3$)$_2$ group, an N=P($R^3$)$_3$ group, an N=S($R^3$)$_2$ group, or an arene ring, and one X group is an N($R^3$), N(SO$_2$$R^4$), NB($R^3$)$_2$ or P($R^3$) substituent or a cyclometallated Pn($R^3$)$_2$, Ch($R^3$), N=C($R^3$)$_2$, N=P($R^3$)$_3$, or N=S($R^3$)$_2$ substituent.

14. The catalyst system of claim 3, wherein each X group is independently an N($R^3$), N(SO$_2$$R^4$), NB($R^3$)$_2$ or P($R^3$) substituent or a cyclometallated Pn($R^3$)$_2$, Ch($R^3$), N=C($R^3$)$_2$, N=P($R^3$)$_3$, or N=S($R^3$)$_2$ substituent.

15. The catalyst system of claim 3, wherein each X group is independently a Pn($R^3$)$_2$ group, a Ch($R^3$) group, an N=C($R^3$)$_2$ group, an N=P($R^3$)$_3$ group, an N=S($R^3$)$_2$ group, or an arene ring.

16. The catalyst system of claim 3, wherein one X group is a Pn($R^3$)$_2$ group, a Ch($R^3$) group, an N=C($R^3$)$_2$ group, an N=P($R^3$)$_3$ group, an N=S($R^3$)$_2$ group, or an arene ring, and one X group is an N($R^3$), N(SO$_2$$R^4$), NB($R^3$)$_2$ or P($R^3$) substituent or a cyclometallated Pn($R^3$)$_2$, Ch($R^3$), N=C($R^3$)$_2$, N=P($R^3$)$_3$, or N=S($R^3$)$_2$ substituent in which cyclometallation has taken place at the ortho position of an aryl ring attached to phosphorus.

17. The catalyst system of claim 9, where RL is one of the structures below,

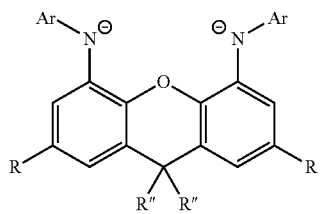

Ar = Mes, Xyl, Duryl, Dipp or Tripp, C$_6$H$_3$tBu-3,5, C$_6$H$_3$Mes$_2$-3,5, C$_6$H$_3$(C$_6$H$_3$tBu$_2$-3,5)$_2$-3,5 or C$_6$H$_2$tBu$_3$-2,4,6

R″ = Me, Et, $^n$Pr, $^n$Bu

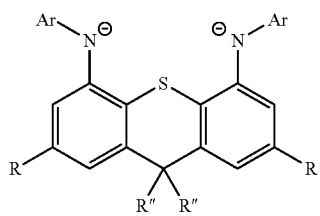

Ar = Mes, Xyl, Duryl, Dipp or Tripp, C$_6$H$_3$tBu-3,5, C$_6$H$_3$Mes$_2$-3,5, C$_6$H$_3$(C$_6$H$_3$tBu$_2$-3,5)$_2$-3,5 or C$_6$H$_2$tBu$_3$-2,4,6

R″ = Me, Et, $^n$Pr, $^n$Bu

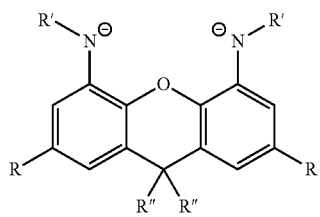

R′ = $^t$Bu, Ad, SiMe$_3$, SiEt$_3$, SiMe$_2$$^t$Bu, Si$^i$Pr$_3$

R″ = Me, Et, $^n$Pr, $^n$Bu

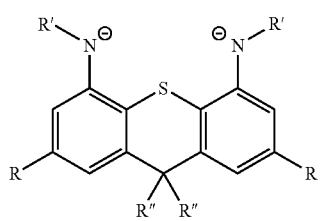

R′ = $^t$Bu, Ad, SiMe$_3$, SiEt$_3$, SiMe$_2$$^t$Bu, Si$^i$Pr$_3$

R″ = Me, Et, $^n$Pr, $^n$Bu

-continued

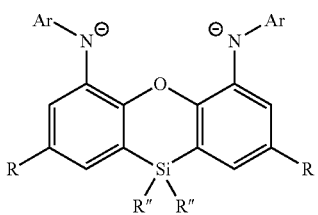

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

R″ = Me, Et, ⁿPr, ⁿBu, ⁱPr or ˢBu

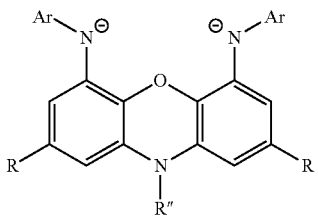

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

R″ = Me, CHMe₂, CHMeEt, tBu, Ad,
SiMe₃, SiEt₃, SiMe²Bu, Siⁱ Pr₃, Ph

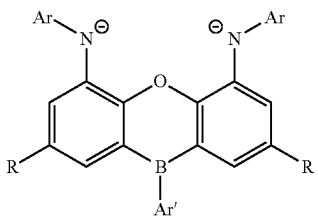

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

Ar′ = Mes, Xyl or Duryl, Dipp or
Tripp

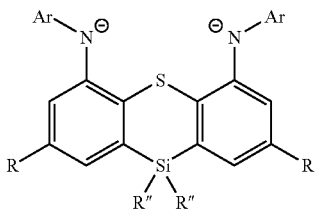

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

R″ = Me, Et, ⁿPr, ⁿBu, ⁱPr or ˢBu

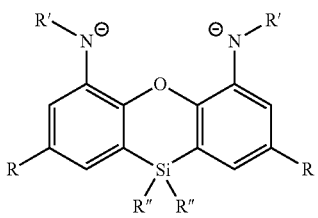

R′ = ᵗBu, Ad, SiMe₃, SiEt₃,
SiMe²Bu, Siⁱ Pr₃

R″ = Me, Et, ⁿPr,
ⁿBu, ⁱPr or ˢBu

-continued

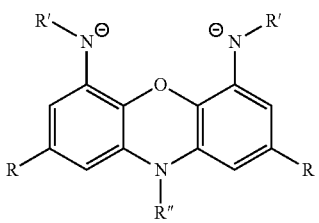

R′ = ᵗBu, Ad, SiMe₃, SiEt₃,
SiMe²Bu, Siⁱ Pr₃

R″ = Me, CHMe₂, CHMeEt, tBu, Ad,
SiMe₃, SiEt₃, SiMe²Bu, Siⁱ Pr₃, Ph

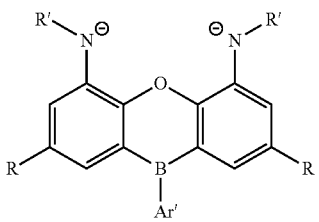

R′ = ᵗBu, Ad, SiMe₃, SiEt₃,
SiMe²Bu, Siⁱ Pr₃

Ar′ = Mes, Xyl or Duryl, Dipp or
Tripp

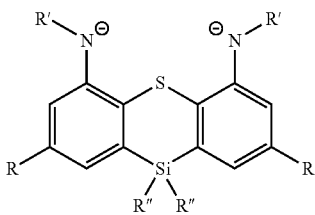

R′ = ᵗBu, Ad, SiMe₃, SiEt₃,
SiMe²Bu, Siⁱ Pr₃

R″ = Me, Et, ⁿPr, ⁿBu, ⁱPr or ˢBu

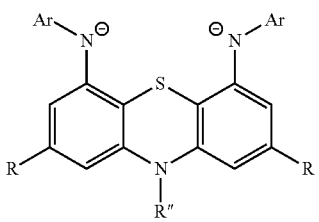

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

R″ = Me, CHMe₂, CHMeEt, tBu, Ad
SiMe₃, SiEt₃, ᵗBu, Siⁱ Pr₃, Ph

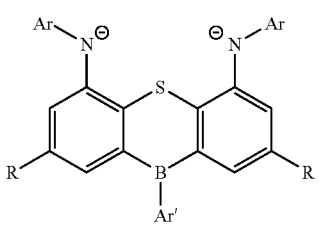

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

R″ = Mes, Xyl or Duryl, Dipp or
Tripp

-continued

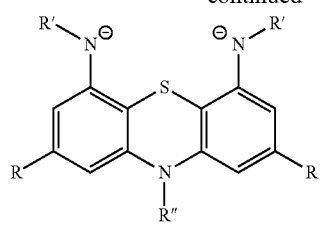

R' = tBu, Ad, SiMe₃, SiEt₃,
SiMe₂tBu, SiiPr₃

R" = Me, CHMe, CHMeEt,
tBu, Ad, SiMe₃, SiEt₃,
SiMe₂tBu, SiiPr₃, Ph

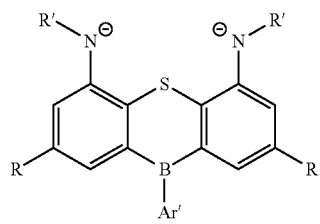

R' = tBu, Ad, SiMe₃, SiEt₃,
SiMe₂tBu, SiiPr₃

Ar' = Mes, Xyl or Duryl,
Dipp or Tripp

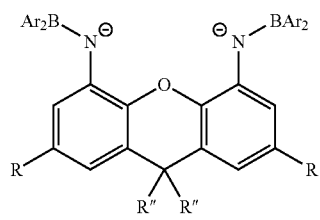

Ar = Mes, Xyl, Duryl, Dipp or Tripp

R" = Me, Et, nPr, nBu

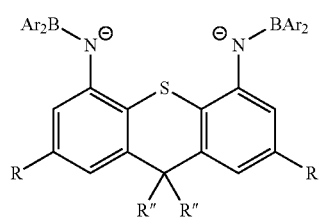

Ar = Mes, Xyl, Duryl, Dipp or Tripp

R" = Me, Et, nPr, nBu

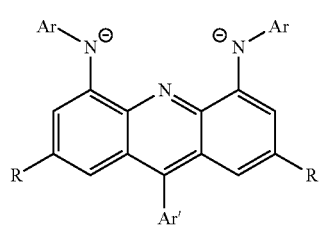

Ar = Mes, Xyl, Duryl, Dipp or Tripp,
C₆H₃tBu-3,5, or C₆H₂tBu₃-2,4,6

Ar' = Mes, Xyl or Duryl

-continued

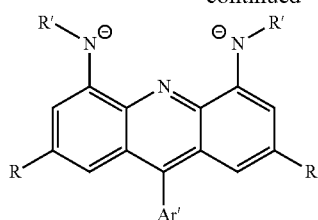

R' = tBu, Ad, SiMe₃, SiEt₃,
SiMe₂tBu, SiiPr₃

Ar' = Mes, Xyl or Duryl

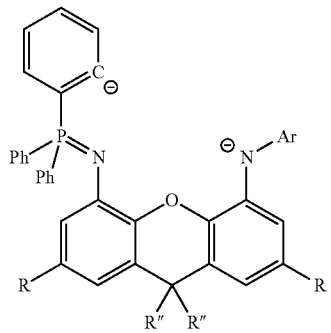

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

R" = Me, Et, nPr or nBu

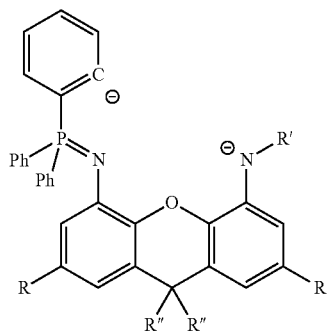

R' = tBu, Ad, SiMe₃, SiEt₃,
SiMe₂tBu, SiiPr₃, B(Mes)₂

R" = Me, Et, nPr or nBu

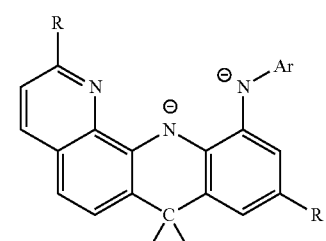

Ar = Mes, Xyl, Duryl, Dipp or
Tripp, C₆H₃tBu-3,5, C₆H₃Mes₂-
3,5, C₆H₃(C₆H₃tBu₂-3,5)₂-3,5 or
C₆H₂tBu₃-2,4,6

CR"X' = CMe₂, CEt₂, CHMe, CH(CH₂Ph)
CH(CH₂SiMe₃) or CH(CH₂CMe₃)

-continued

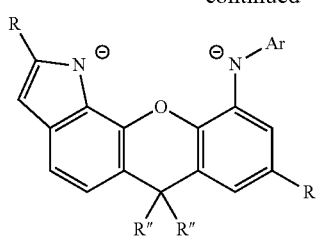

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

R″ = Me, Et, $^n$Pr or $^n$Bu

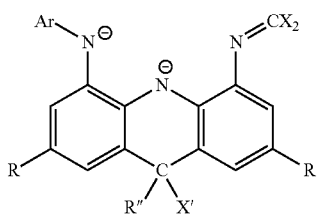

Ar = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

CR″X′ = CMe$_2$, CEt$_2$, CHMe,
CH(CH$_2$Ph) CH(CH$_2$SiMe$_3$)
or CH(CH$_2$CMe$_3$)

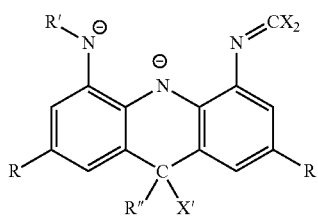

R′ = $^t$Bu, Ad, SiMe$_3$, SiEt$_3$,
SiMe$_2$$^t$Bu, Si$^i$Pr$_3$, B(Mes)$_2$

CR″X′ = CMe$_2$, CEt$_2$, CHMe,
CH(CH$_2$Ph) CH(CH$_2$SiMe$_3$)
or CH(CH$_2$CMe$_3$)

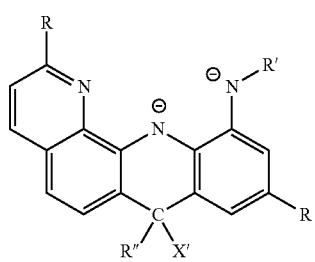

R′ = $^t$Bu, Ad, SiMe$_3$, SiEt$_3$,
SiMe$_2$$^t$Bu, Si$^i$Pr$_3$, B(Mes)$_2$

CR″X′ = CMe$_2$, CEt$_2$, CHMe, CH(CH$_2$Ph)
CH(CH$_2$SiMe$_3$) or CH(CH$_2$CMe$_3$)

-continued

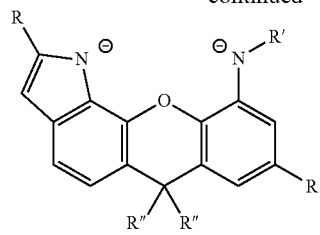

R′ = $^t$Bu, Ad, SiMe$_3$, SiEt$_3$,
SiMe$_2$$^t$Bu, Si$^i$Pr$_3$, B(Mes)$_2$

R″ = Me, Et, $^n$Pr or $^n$Bu

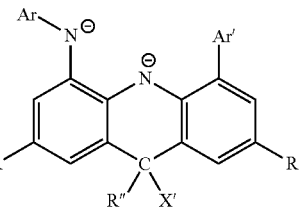

Ar′ = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

Ar = Ph, Mes, Xyl, Duryl,
C$_6$H$_3$tBu-3,5, or C$_6$H$_3$Mes$_2$-3,5,

CR″X′ = CMe$_2$, CEt$_2$, CHMe,
CH(CH$_2$Ph) CH(CH$_2$SiMe$_3$)
or CH(CH$_2$CMe$_3$)

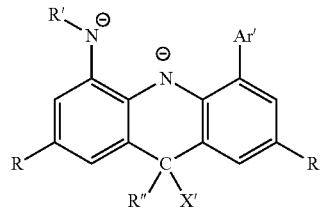

R′ = $^t$Bu, Ad, SiMe$_3$, SiEt$_3$,
SiMe$_2$$^t$Bu, Si$^i$Pr$_3$, B(Mes)$_2$

Ar = Ph, Mes, Xyl, Duryl,
C$_6$H$_3$tBu-3,5, or C$_6$H$_3$Mes$_2$-3,5,

CR″X′ = CMe$_2$, CEt$_2$, CHMe,
CH(CH$_2$Ph) CH(CH$_2$SiMe$_3$)
or CH(CH$_2$CMe$_3$)

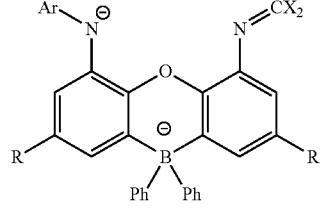

Ar′ = Mes, Xyl, Duryl, Dipp or
Tripp, C$_6$H$_3$tBu-3,5, C$_6$H$_3$Mes$_2$-
3,5, C$_6$H$_3$(C$_6$H$_3$tBu$_2$-3,5)$_2$-3,5 or
C$_6$H$_2$tBu$_3$-2,4,6

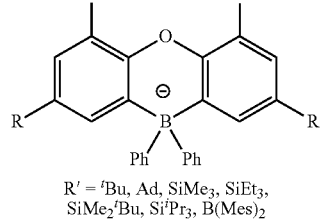

R′ = $^t$Bu, Ad, SiMe$_3$, SiEt$_3$,
SiMe$_2$$^t$Bu, Si$^i$Pr$_3$, B(Mes)$_2$

-continued

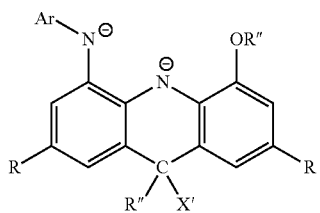

Ar = Mes, Xyl, Duryl, Dipp or Tripp, $C_6H_3tBu\text{-}3,5$, $C_6H_3Mes_2\text{-}3,5$, $C_6H_3(C_6H_3tBu_2\text{-}3,5)_2\text{-}3,5$ or $C_6H_2tBu_3\text{-}2,4,6$ OR″ = OPh, OMes, OXyl, O(Duryl), ODipp, OTrip, OCMe₃, OAd OSiMe₃, OSi$^i$Pr₃ or OSiMe₂$^t$Bu CR″X′ = CMe₂, CEt₂, CHMe, CH(CH₂Ph) CH(CH₂SiMe₃) or CH(CH₂CMe₃)

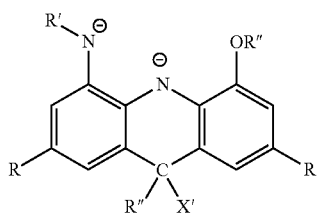

R′ = $^t$Bu, Ad, SiMe₃, SiEt₃, SiMe₂$^t$Bu, Si$^i$Pr₃, B(Mes)₂

OR″ = OPh, OMes, OXyl, O(Duryl), ODipp, OTrip, OCMe₃, OAd OSiMe₃, OSi$^i$Pr₃ or OSiMe₂$^t$Bu CR″X′ = CMe₂, CEt₂, CHMe, CH(CH₂Ph) CH(CH₂SiMe₃) or CH(CH₂CMe₃)

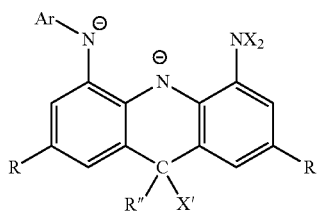

Ar′ = Mes, Xyl, Duryl, Dipp or Tripp, $C_6H_3tBu\text{-}3,5$, $C_6H_3Mes_2\text{-}3,5$, $C_6H_3(C_6H_3tBu_2\text{-}3,5)_2\text{-}3,5$ or $C_6H_2tBu_3\text{-}2,4,6$ NX₂ = NPh₂, N-Carbazolyl, NMePh, NMe₂ or N(SiMe₃)₂

CR″X′ = CMe₂, CEt₂, CHMe, CH(CH₂Ph) CH(CH₂SiMe₃) or CH(CH₂CMe₃)

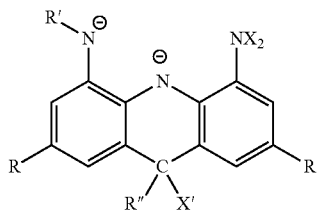

R′ = $^t$Bu, Ad, SiMe₃, SiEt₃, SiMe₂$^t$Bu, Si$^i$Pr₃, B(Mes)₂

NX₂ = NPh₂, N-Carbazolyl, NMePh, NMe₂ or N(SiMe₃)₂

CR″X′ = CMe₂, CEt₂, CHMe, CH(CH₂Ph) CH(CH₂SiMe₃) or CH(CH₂CMe₃)

-continued

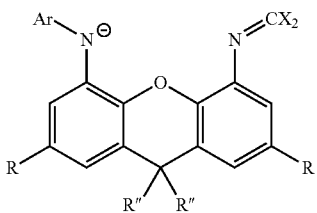

Ar = Mes, Xyl, Duryl, Dipp or Tripp, $C_6H_3tBu\text{-}3,5$, $C_6H_3Mes_2\text{-}3,5$, $C_6H_3(C_6H_3tBu_2\text{-}3,5)_2\text{-}3,5$ or $C_6H_2tBu_3\text{-}2,4,6$ R″ = Me, Et, $^n$Pr, $^n$Bu

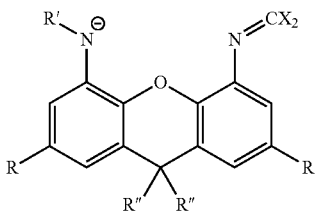

R′ = $^t$Bu, Ad, SiMe₃, SiEt₃, SiMe₂$^t$Bu, Si$^i$Pr₃, B(Mes)₂

R″ = Me, Et, $^n$Pr, $^n$Bu

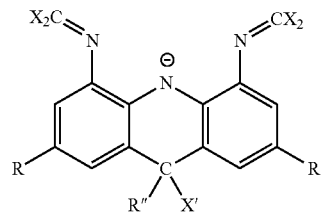

CR″X′ = CMe₂, CEt₂, CHMe, CH(CH₂Ph) CH(CH₂SiMe₃) or CH(CH₂CMe₃)

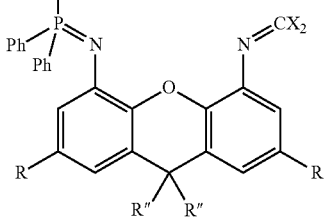

R″ = Me, Et, $^n$Pr, $^n$Bu

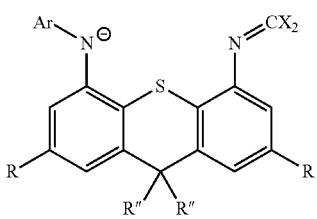

Ar = Mes, Xyl, Duryl, Dipp or Tripp, $C_6H_3tBu\text{-}3,5$, $C_6H_3Mes_2\text{-}3,5$, $C_6H_3(C_6H_3tBu_2\text{-}3,5)_2\text{-}3,5$ or $C_6H_2tBu_3\text{-}2,4,6$ R″ = Me, Et, $^n$Pr, $^n$Bu -continued

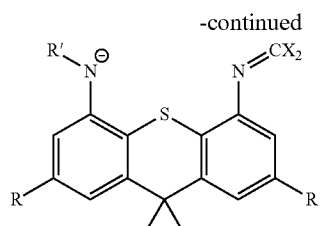

R' = ᵗBu, Ad, SiMe₃, SiEt₃,
SiMe₂ᵗBu, SiⁱPr₃, B(Mes)₂
R'' = Me, Et, ⁿPr, ⁿBu

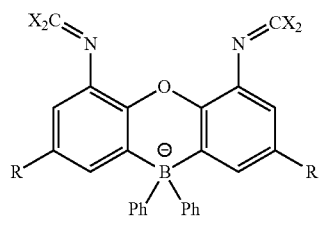

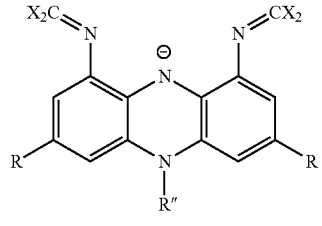

R'' = ᵗBu, Ad, SiMe₃,
SiEt₃, SiMe₂ᵗBu, SiⁱPr₃,
Ph, Mes, Xyl, Duryl

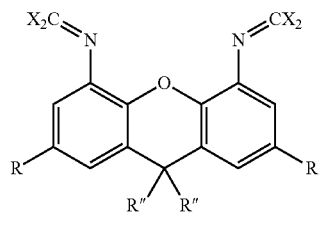

R'' = Me, Et, ⁿPr, ⁿBu

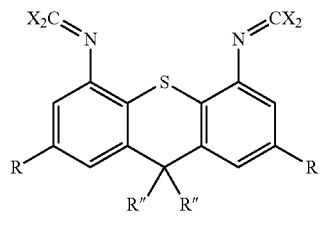

R'' = Me, Et, ⁿPr, ⁿBu

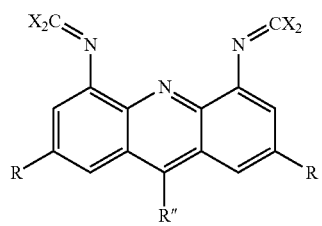 or

R'' = Mes, Xyl, Duryl, Terph, CMe₃, Ad,
SiMe₃, SiMetBu, SiiPr₃ or NMe₂

-continued

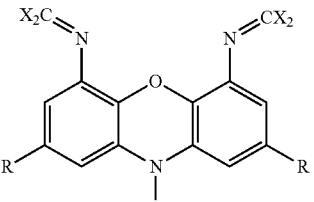

R'' = ᵗBu, Ad, SiMe₃,
SiEt₃, SiMe₂ᵗBu, SiⁱPr₃,
Ph, Mes, Xyl, Duryl wherein R is H, Me, CHMe₂, CHMeEt, CMe₃, 1-adamantyl, or SiMe₃; and N=CX₂ is as defined below:

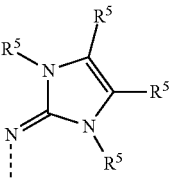 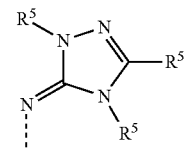

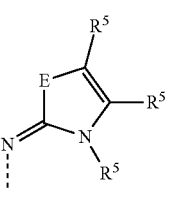 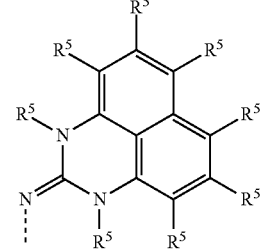

E = S or O

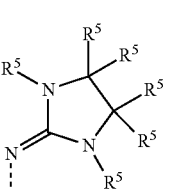 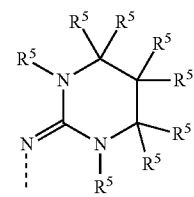

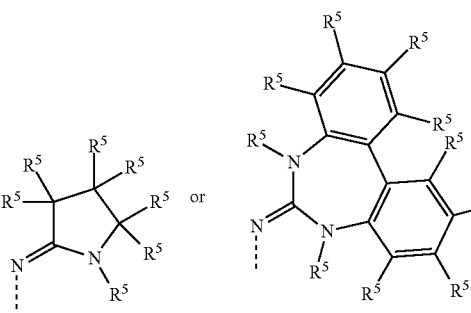

18. The catalyst system of claim 1, wherein the activatable ligands are fluoro, chloro, bromo, iodo, alkyl, aryl, allyl or hydride ligands.

19. The catalyst system of claim 1, wherein the group 4 transition metal is Ti, Zr or Hf or the rare earth metals is Sc, Y, Lu, La, Ce, Pr, Nd, Sm, Eu, Gd, Tb, Dy, Ho, Er, Tm or Yb.

20. The catalyst system of claim 1, wherein the at least one activator is $B(C_6R_5)_3$ or $Al(C_6R_5)_3$, where each R is independently (a) hydrogen, (b) halogen, (c) alkyl, (d) aryl, (e) a silyl group, (f) alkoxy, or (g) aryloxyl;

and/or the at least one activator is $[C(C_5R_5)_3][A]$, $[SiR_3][A]$ or [tropylium][A] salts, wherein each R is independently (a) hydrogen, (b) halogen, (c) alkyl, (d) aryl, or (e) a silyl group, and A is a tetraarylborate, carborane cluster or borane cluster.

\* \* \* \* \*